(12) United States Patent
Rice et al.

(10) Patent No.: US 9,970,842 B2
(45) Date of Patent: *May 15, 2018

(54) HIGH SENSITIVITY ENVIRONMENTAL SENSOR NETWORK AND NETWORK SERVICES FOR STRUCTURAL HEALTH MONITORING

(71) Applicant: The Board of Trustees of the University of Illinois, Urbana, IL (US)

(72) Inventors: Jennifer Rice, Lubbock, TX (US); Gul Agha, Urbana, IL (US); B. F. Spencer, Jr., Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/344,992

(22) Filed: Nov. 7, 2016

(65) Prior Publication Data

US 2017/0184470 A1    Jun. 29, 2017

Related U.S. Application Data

(63) Continuation of application No. 14/801,219, filed on Jul. 16, 2015, now Pat. No. 9,488,545, which is a
(Continued)

(51) Int. Cl.
*H04W 24/00*    (2009.01)
*G01M 5/00*    (2006.01)
*H04W 84/18*    (2009.01)

(52) U.S. Cl.
CPC ......... *G01M 5/0066* (2013.01); *H04W 24/00* (2013.01); *H04W 84/18* (2013.01)

(58) Field of Classification Search
CPC .......................... G01M 5/0066; H04W 24/00
(Continued)

(56) References Cited

U.S. PATENT DOCUMENTS

| 5,324,933 A | * | 6/1994 | Berkcan | G01N 21/774 250/227.18 |
| 6,434,512 B1 | * | 8/2002 | Discenzo | F16C 19/52 702/184 |

(Continued)

OTHER PUBLICATIONS

Crossbow, "ITS400 Sensor Board Data Sheet"; www.xbow.com; Document Part No. 6020-0119-01; May 4, 2010, (1 page).
(Continued)

*Primary Examiner* — John J Lee
(74) *Attorney, Agent, or Firm* — Greer, Burns & Crain, Ltd.; Steven P. Fallon

(57) ABSTRACT

A high sensitivity structural health monitoring network includes a plurality of sensor nodes disposed apart from each other and communicating through one or more sensor channels. The nodes include smart sensor circuit boards with an interface to a wireless smart sensor board platform, a multi-axis accelerometer having a measurement range and resolution set to provide sensitivity to measure ambient structural vibrations an analog to digital converter for converting signals that includes a plurality of individual channels being individually programmable for signal conditioning for providing data to the interface. A network framework provides network services including a time synchronization service with network-wide global timestamps for sensor data and a unified sensing service that supports collection of data for all sensor channels from all nodes together with a single set of associated time stamps.

19 Claims, 38 Drawing Sheets

Related U.S. Application Data continuation of application No. 13/696,747, filed as application No. PCT/US2011/037787 on May 24, 2011, now Pat. No. 9,086,430.

(60) Provisional application No. 61/347,592, filed on May 24, 2010.

(58) Field of Classification Search
USPC ........ 455/67.11, 517, 85, 341, 231, 254, 68, 455/115.1, 226.1; 356/502, 432; 250/227.23, 227.18
See application file for complete search history.

(56) References Cited

U.S. PATENT DOCUMENTS

| | | |
|---|---|---|
| 2005/0023434 A1 | 2/2005 | Yacoubian |
| 2007/0150021 A1 | 6/2007 | Babala et al. |
| 2007/0150221 A1* | 6/2007 | Babala .................. G01C 21/16 702/85 |
| 2008/0013879 A1 | 1/2008 | Mossman |
| 2010/0271199 A1* | 10/2010 | Belov ..................... G01M 5/00 340/539.3 |
| 2011/0269478 A1 | 11/2011 | Das et al. |
| 2013/0217979 A1* | 8/2013 | Blackadar ............ A61B 5/0024 600/301 |
| 2014/0354973 A1* | 12/2014 | Shan ........................ G01L 1/26 356/32 |

OTHER PUBLICATIONS

Rice, Jennifer, et. al., "Flexible Smart Sensor Framework for Autonomous Full-Scale Structural Health Monitoring" NSEL Report Series, Aug. 2009, https://www.ideals.illinois.edu/bitstream/handle/2142/13635/NSEL.Report.0818.pdf?sequence=4.

* cited by examiner

HIGH SENSITIVITY ENVIRONMENTAL SENSOR NETWORK AND NETWORK SERVICES FOR STRUCTURAL HEALTH MONITORING

PRIORITY CLAIM

This application is a continuation of and claims priority under 35 U.S.C. § 120 from prior co-pending application Ser. No. 14/801,219, filed Jul. 16, 2015, U.S. Pat. No. 9,488,545, which also claims priority under 35 U.S.C. § 120 from prior co-pending application Ser. No. 13/696,747, filed Feb. 6, 2013, U.S. Pat. No. 9,086,430, which is the national stage under 35 USC § 371 to Patent Cooperation Treaty Application Number PCT/US2011/037787 filed on May 24, 2011, which claims priority under 35 U.S.C. § 119 and § 365 from prior provisional application Ser. No. 61/347,592, filed May 24, 2010. All applications and patents listed in this priority claim are incorporated by reference herein.

TECHNICAL FIELD

A field of the invention is sensors. A more particular field of the invention is devices and systems for structural health monitoring.

BACKGROUND ART

The demands of aging infrastructure, e.g., bridges, buildings, etc., require effective methods for structural monitoring and maintenance. Such monitoring is useful for intelligent safety, lifetime, and replacement/repair issues, and is critical to improving maintenance practices, minimizing the cost associated with repair, and ultimately improving public safety. Structural health monitoring (SHM) provides devices and systems for capturing structural response and assessing structural condition for a variety of purposes. For example, the information from an SHM system can be used to fine-tune computational structural models, thereby allowing more accurate prediction of the response due to extreme loading conditions, such as severe earthquakes and strong winds. SHM also can be used to characterize loads in situ, which can allow the detection of unusual loading conditions as well as validate the structure's design. In addition, real-time monitoring systems can measure the response of a structure before, during, and after a natural or man-made disaster. Such measured responses can be used in damage detection algorithms to assess the post-event condition of a structure.

While sensors and data acquisition systems for structural response are generally known, more of an effort in recent years has been directed toward use of this data to assess the current state of a structure. These algorithms take the measured structural response along with varying degrees of information regarding the structural model and the input excitation, and attempt to determine if the structure has sustained measurable changes in its condition. Analyzing the measured data in this way is useful for both periodic structural monitoring to track the state of a structure over time as well as for the assessment of a structure following a strong loading event such as an earthquake. In both cases, the result is the ability to implement evacuation, repair, and retrofit strategies that ultimately improve public safety and reduce the life-cycle cost of the structure.

Gaining a clear understanding of structural behavior to allow a reasonable assessment of its as-built condition requires high-fidelity sensor data to build accurate models. In addition, potentially problematic structural changes, such as corrosion, cracking, buckling, fracture, etc., all occur locally within a structure. Sensors should be in close proximity to the damage to capture the resulting change in response; sensors further from the damage are unlikely to observe measurable changes. To achieve an effective monitoring system that is capable of generating informative structural models and detecting critical structural changes, a dense array of sensors should be deployed. Due to the cost of deployment and the potential for data inundation, such dense instrumentation is not practically realized with traditional wired network monitoring technology.

Traditional wired structural monitoring systems are comprised of a network of sensors distributed throughout a structure. These networks typically rely on a central source of power and data acquisition, and therefore require cables to link the sensors with the power and acquisition hardware hub. Implementing modal analysis or damage detection algorithms with wired systems requires all of the sensed data to be collected at the data acquisition center where it is then processed. For a dense array of sensors sampling at the relatively high rates required for SHM, the result is that an enormous amount of data must be communicated and processed at a single location.

Such an approach is scalable to the large number of sensor nodes required for high-fidelity modal analysis and damage detection. However, full-scale implementation of wireless smart sensor networks has proven difficult due to the lack of sensor boards that can meet the difficult combined demands of sensitivity, accuracy, synchronization, communications, and power management.

SHM research is turning to wireless smart sensor networks (WSSN), which include on-board computation capacity to reduce the amount of communication while providing comparable data. State-of-the-art sensor technology provides wireless smart sensors having wireless communication, onboard computation, relatively low cost, and small size. These features enable the deployment of a dense array of sensors on structures, which can provide useful information and increase the potential of a structural health monitoring system.

Advances in wireless communications and embedded sensing have resulted in updates to traditional wired SHM networks. The majority of the work using wireless sensors for structural monitoring has focused on using the sensors to emulate traditional wired sensor systems. As such systems have required that all data be sent back to a central processing center, the amount of wireless communication needed in the network becomes prohibitive in terms of excessive communication times and the associated power it consumes. For example, a wireless sensor network implemented on the Golden Gate Bridge that generated 20 MB of data (80 seconds of data, sampling at 1000 Hz from 64 sensor nodes) took over 12 hours to complete data communication back to a central location.

Several factors determine the level of success that may be achieved by vibration-based SHM using smart sensors. A stable and reliable smart sensor network is required, which may be obtained through advanced hardware and advanced networking software. Effective data processing techniques should be available to process the data using the onboard computation capabilities of a smart sensor. Nonlimiting example hardware to meet such goals includes the Imote2 Sensor Platform [e.g., as described in MEMSIC, Inc., "IPR2400, Imote2 Wireless Sensor Node," Andover, Mass. (2010)], which has been shown to be well-suited for such high-data throughput application of a range of data aggregation and SHM algorithms. Another type of sensor system is the Mica2 [MEMSIC, Inc., "MICA2, Wireless Measurement System," Andover, Mass. (2010)], which is specially focused on lower power, low data throughput applications.

The Imote2 exemplifies state-of-the-art smart sensor platforms. The Imote2 (IPR2400) is a wireless sensor node platform using a low-power PXA271 XScale processor operating at 13-416 MHz and an 802.15.4 radio with a 2.4 GHz antenna. It is a modular stackable platform that can be interfaced to other boards for specific applications, and example boards provide battery and sensor functions.

FIG. 1 shows the top and bottom of an Imote2 board 40, and FIG. 2 shows the combination of an Imote2 with a battery board 44, and antenna 46. A separate sensor board interfaces with the Imote2 because it lacks its own sensing capabilities. A popular conventional sensor board for interfacing with the Imote2 40 is the ITS400 [MEMSIC, Inc., "ITS400, Imote2 Basic Sensor Board," Andover, Mass. (2010)]. For example, the ITS 400 board 42 includes a three-axes digital output linear accelerometer with a 12-bit ADC, a temperature/humidity sensor, a light sensor, and a four-channel 12-bit ADC.

However, the present inventors have discovered a number of serious drawbacks with the ITS400 sensor board for use in SHM methods, including the fact that the sensor board has only four possible sampling rates and cut-off frequencies, unstable sampling rates that can hinder synchronized sensing, non-stationary fluctuations in the sampling rate, lack of anti-aliasing filters, and the low resolution of the accelerometer with the built-in ADC (about 0.98 mg), which is too coarse for ambient measurements of vibration. These deficiencies make this sensor board ill-suited for SHM.

For example, strong structural excitations, such as (but not limited to) earthquakes and hurricanes, can result in high levels of structural response and are readily captured by sensors with limited measurement resolution. The signal-to-noise (SNR) of such structural responses is high and easily provides unambiguous data because the measurement noise becomes negligible. However, most structural responses that can be measured during routine monitoring are low-level ambient vibration responses. Ambient vibration is generated due to a variety of random excitation sources such as nearby traffic, normal wind-loading, machinery inside the structures, etc. Such ambient vibration data can provide important vibration-based for structural health monitoring. Unfortunately, usually the vibration level resulting from such ambient vibration responses is typically too small to capture with commercially available sensor boards for wireless sensors.

Generally, the Imote2 and other structural health monitoring sensor boards are too limited in the information that they provide. Their sensitivity and reliability are not sufficient to provide warning of typical events that can lead to catastrophic failure. Moreover, known sensor boards do not provide high enough levels of sensitivity and accuracy for ambient measures of infrastructure that are important to define baseline conditions. Also, board-to-board variations in conventionally manufactured sensor boards must be accounted for in networked sensor monitoring, and this further limits the sensitivity and accuracy of structural health monitoring sensors.

SUMMARY OF THE INVENTION

Embodiments of the invention provide, among other things, a network of a plurality of smart sensor circuit boards and network services to provide for high sensitivity structural health monitoring. Within a preferred network, there are a plurality of sensor nodes disposed apart from each other and communicating through one or more sensor channels. Each sensor node includes a smart sensor circuit board with an interface to a wireless smart sensor board platform, a multi-axis accelerometer having a sensitivity that can measure ambient structural vibrations resulting from non-catastrophic routine environmental factors, and an analog to digital converter (ADC) for converting signals from the multi-axis accelerometer, the ADC having a plurality of individual channels, each channel including being individually programmable for signal conditioning for providing data to the interface. The network also includes a network framework providing network services for the plurality of sensor nodes through the one or more sensor channels, the network framework including a time synchronization service with network-wide global timestamps for sensor data and a unified sensing service that supports collection of data for all sensor channels from all nodes together with a single set of associated time stamp.

DETAILED DESCRIPTION OF THE PREFERRED EMBODIMENTS

Figure 1:
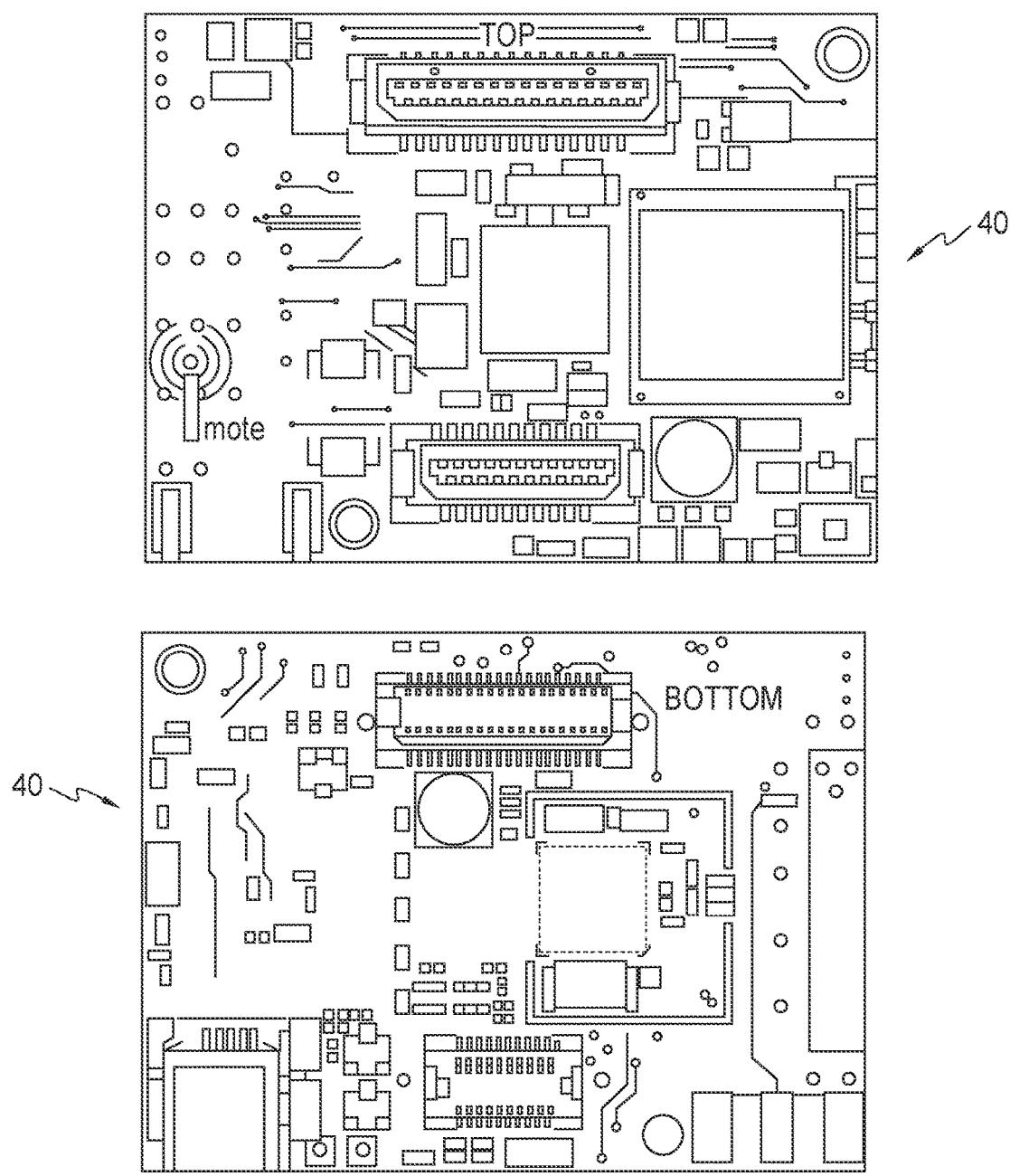
FIG. 1 shows top and bottom views, respectively, of an example sensor platform.
Figure 2:
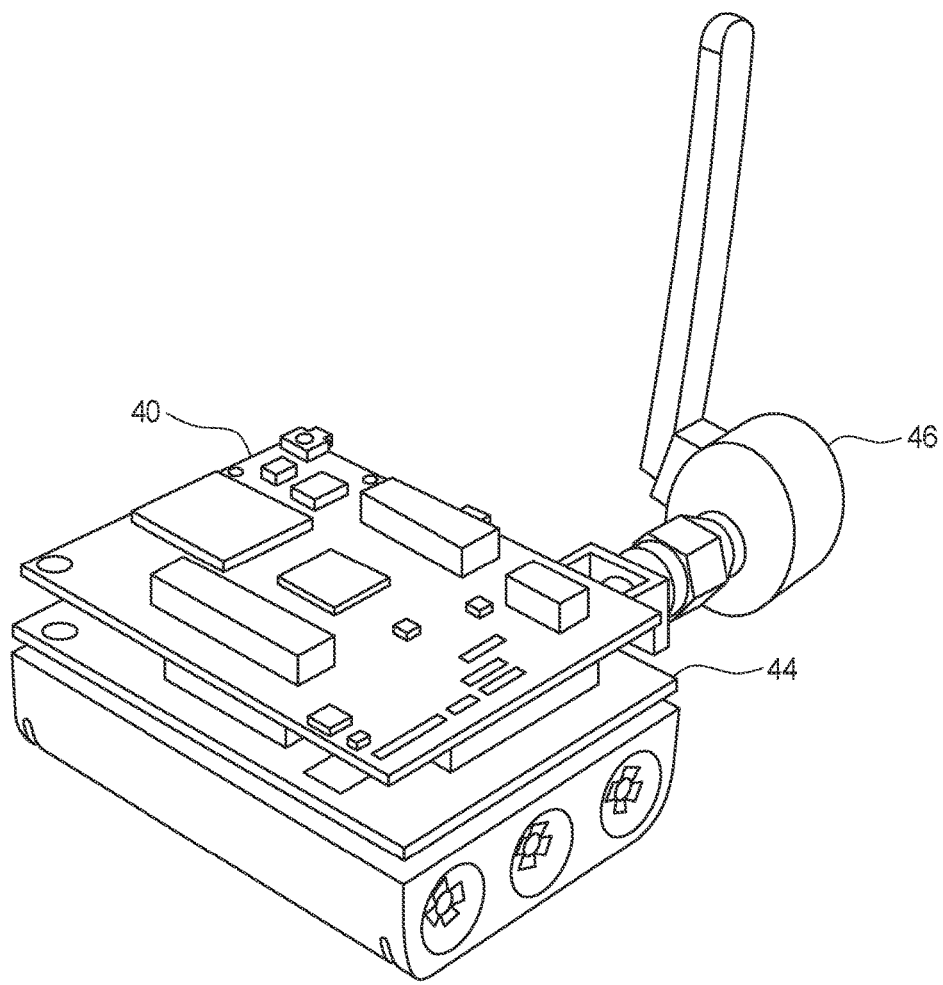
FIG. 2 shows the example sensor platform of FIG. 1 coupled to a battery board and an antenna.

The growing decline of civil infrastructure in industrialized nations has caused increased interest and research in the area of structural health monitoring (SHM). Current inspection and maintenance practices are not adequate to ensure that structural damage is identified prior to catastrophic failure. The ability to gain real-time and pertinent information about the condition of a structure has the potential to increase public safety while decreasing the cost associated with the repair of extreme damage. The evolution of SHM research has seen a shift away from traditional wired monitoring schemes, which rely on a centralized data acquisition and processing, towards the use of wireless smart sensor networks. Such smart sensors allow much of the computational burden involved in effective SHM to be carried out by the sensor nodes themselves, thereby optimizing network resources by limiting the amount of RF communication that is required.

This shift of SHM research toward the use of WSSN has been motivated by the many attractive features of a smart sensor. Recent sensor technology enables wireless smart sensors having wireless communication, on-board computation, relatively low cost, and small size. These features enable the deployment of a dense array of sensors on structures, which can provide useful information and increase the potential of the SHM.

An example smart sensor is defined by several features which set it apart from traditional sensors. One significant feature is that a smart sensor possesses onboard computational ability by means of a microprocessor. This feature allows the smart sensor to act in a somewhat autonomous manner and to process data and implement SHM algorithms. Another distinguishing feature is that the smart sensor has the ability to store sensed data prior to processing and store process instructions and numerical algorithms in onboard memory. Additionally, a smart sensor is wireless from both a data-acquisition perspective and from a power supply perspective. This wireless feature of a smart sensor requires that the node is either self-powered or battery powered, and that it has an onboard radio. A preferred smart sensor should be relatively low-cost so that a network of sensor nodes does not become prohibitively expensive as the node number increases. Each of these features helps to ensure that a network of such sensors is scalable to a large number of nodes to allay deployment of SHM systems for large civil structures.

Selection of an appropriate smart sensor platform takes into consideration the specific and demanding requirements of structural monitoring. There are many challenges associated with SHM that can be managed or eliminated when appropriate measures are taken in the design of the network, the sensor node, and/or the algorithms. SHM requires high sample rates and the use of computationally intense algorithms. Also, vibration-based SHM schemes call for signals from the sensors within the network to be carefully synchronized to accurately assess the structural condition.

Intel's Imote2, as a nonlimiting example, provides a commercially available wireless sensor platform that possesses elements required for data intensive applications such as SHM. The onboard memory of the Imote2 distinguishes it from other wireless sensor platforms and allows its use for high-frequency sampling and computationally intense data processing for dynamic structural monitoring. As the Imote2 platform does not have inherent sensing capabilities, sensor boards can be provided for interfacing with the sensor platform.

Several important factors determine the efficiency of vibration-based SHM using smart sensors. First, a stable and reliable smart sensor network is required, which may be obtained through suitable hardware and networking software. Second, effective data processing techniques should be available to process data using the on-board computation capabilities of a smart sensor. These goals can be achieved, for instance, by the Imote2, which is well-suited for the application of a range of data aggregation and SHM algorithms. Although the Imote2 power consumption is higher than some other smart sensor platforms, such as the Mica2, which is specially focused on low power applications, careful power management according to embodiments of the present invention can utilize a deep sleep mode and energy harvesting efforts for smart sensors.

Another factor for successful vibration-based SHM is that high quality data should be obtained. If the measured data is contaminated with noise, the results from the SHM system will be unreliable, therefore undermining efforts to achieve successful SHM. Embodiments of the invention provide high-sensitivity boards for smart sensor systems, including but not limited to those for interfacing with the Imote2 platform to measure ambient conditions. A preferred sensor board enables collection of high fidelity acceleration data, specifically focusing on low-level accelerations.

Example sensor hardware, such as example sensor boards of the present invention, is suitable for a broad range of SHM applications. Nonlimiting example sensor boards interface with a smart sensor platform that is well-suited to the demands of SHM applications. By contrast, conventional vibration monitoring sensors for interfacing with smart sensor platforms have lacked user-selectable anti-aliasing filters, flexibility in the choice of sensing parameters, sample rate accuracy, and/or temperature correction. Nonlimiting example embodiments of the present invention provide multimetric sensor boards that can address these issues.

Sensor boards according to embodiments of the present invention can enable sensor networks to provide important structural ambient conditions over time and to detect small changes in ambient conditions. Early warnings of events or sequences of events that can potentially lead to structural harm can be catalogued and monitored with sensor networks that include sensor nodes having improved sensor boards. Embodiments of the present invention provide, among other things, smart sensor boards, sensor nodes, and network systems for full-scale autonomous SHM. Preferred sensor boards and systems of the present invention interface with wireless smart sensor platforms.

Example inventive sensor boards account for the challenge of a large number of sensors accounting for limited resources of smart sensors, time synchronization, limitations in the types and quality of sensors available, data loss associated with RF communication, network fault tolerance, and other concerns. A true representation of the structural response can be provided, both in amplitude and phase, over a wide bandwidth, while eliminating aliased signals. Communication hardware and protocols used by example sensor boards and networks of the invention ensure insignificant data losses to preserve the quality of the sensed data and the robust performance of the network.

Preferred example embodiments include versatile, multimetric sensor hardware that can interface to commercially available smart sensor platforms. Preferred embodiment sensor boards can be designed specifically for vibration-based SHM with flexible sampling rate, gain, and signal conditioning options, including user-selectable anti-aliasing filters. Preferred embodiments effectively utilize communication hardware and careful power management. An optimal configuration can be provided for board components as well as radio and antenna hardware, which improves communication performance. Preferred board layouts account for surprising implications of selected hardware and application parameters and structural arrangements on overall performance as well as overall power consumption. Example embodiments minimize the effect of network events that have the greatest effect on power consumption, sensitivity, and overall performance.

Preferred sensor boards include flexible network management software that combines a sleep/wake cycle for enhanced power efficiency with threshold detection for triggering network-wide operations such as synchronized sensing or decentralized modal analysis.

Preferred embodiment sensor boards and networks use a service-oriented software framework providing modular components that may be linked together to build fully integrated SHM systems. Example software components provide inventive methods for autonomous, full-scale network operation. Preferred embodiments include flexible network management software that combines a sleep/wake cycle for enhanced power management with threshold detection for triggering network-wide operations, such as synchronized sensing or decentralized modal analysis.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

FIG. 1 shows a nonlimiting example sensor platform embodied in the Imote2 platform 40 from Intel, that can be used in a sensor node according to an embodiment of the present invention. It is to be understood that embodiments of the present invention are not to be limited to sensor boards and methods that interface with the Imote2 platform 40.

Figure 3:
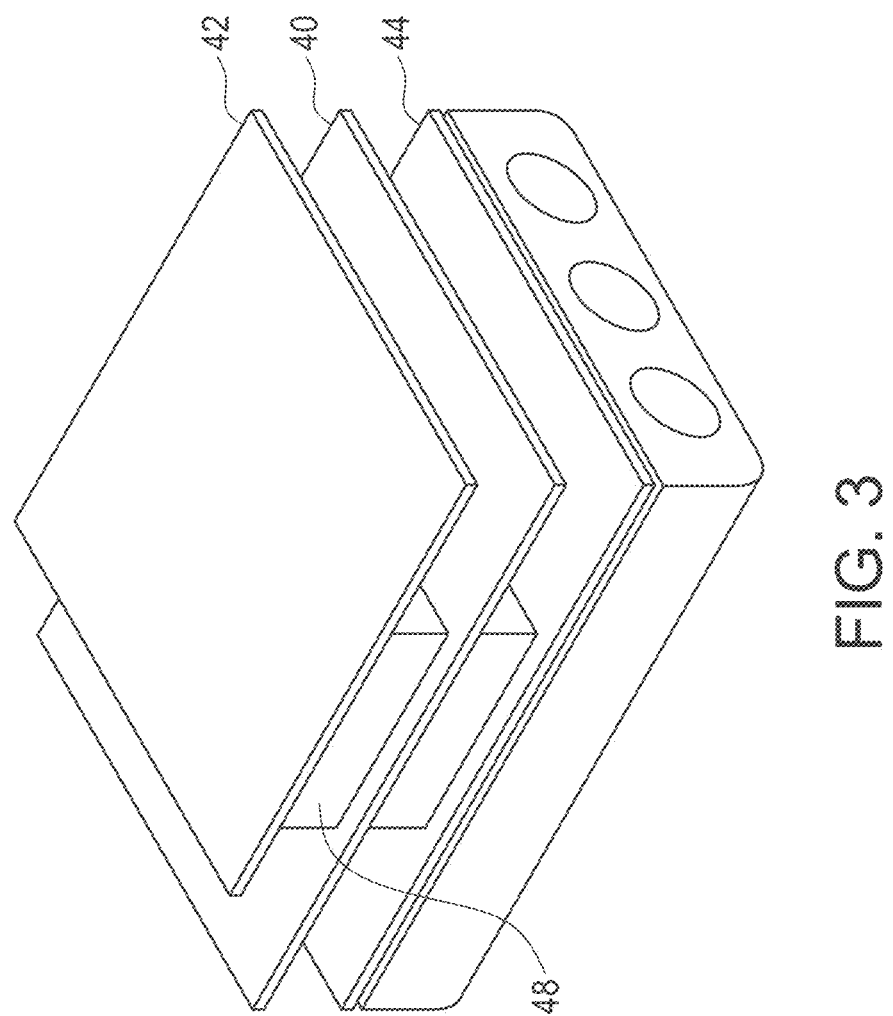
FIG. 3 shows an example stacked configuration of a sensor node including a smart sensor board, a sensor platform; and a battery board.
Figure 4:
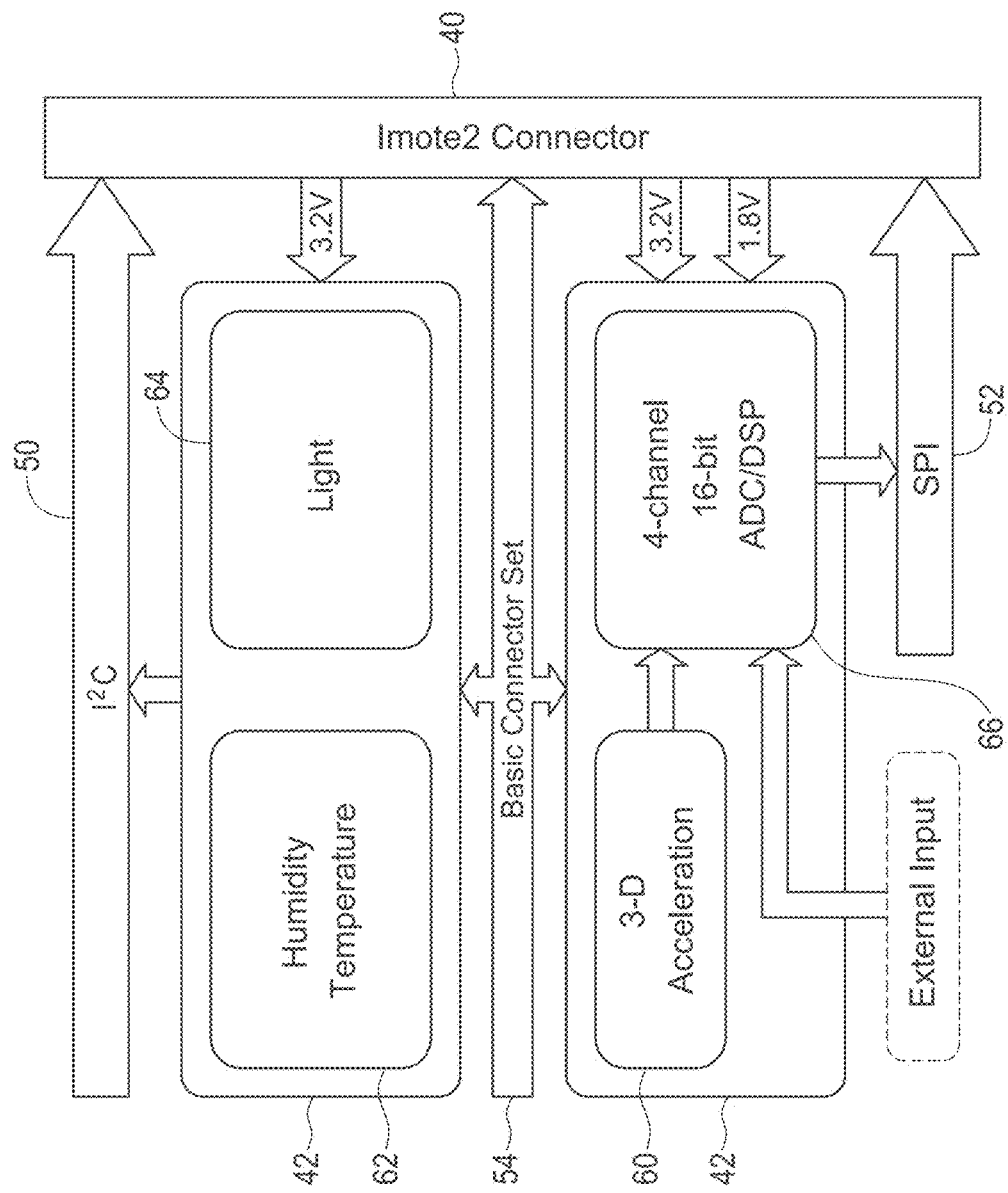
FIG. 4 shows connected components of a sensor node.

The Imote2 platform 40 does not possess intrinsic sensing capabilities, but instead provides a flexible platform for a range of sensing applications. The sensors 41 used for the sensing platform are interfaced to the main board 40 via connectors 48 (e.g., two) in a stackable configuration, as shown in FIGS. 3-4. The Imote2 40 does not have an onboard ADC, and therefore is only compatible with digital sensor output. I/O options includes an inter-integrated circuit (I2C) 50 (which allows interface to an unlimited number of channels), 3 serial peripheral interface (SPI) ports (serial data ports, limited to one channel per port) 52, and multiple GPIO (general purpose I/O) pins 54. The flexible sensor interface on the Imote2 allows its users to tailor sensor boards to their application.

The operating system used on the Imote2 is 40 TinyOS. Its small memory footprint is suited to the limited resources of smart sensors. TinyOS has many successful smart sensor applications, but some features of TinyOS pose limitations for SHM applications. Primarily, it does not support real time operations and thus has only two types of execution threads: 1) tasks and 2) hardware event handlers. This concurrency model leaves only a small amount of control to the user in the assignment of priority to commands; execution timing cannot be arbitrarily controlled. This limitation of TinyOS should be considered when providing an example SHM implementation.

The example Imote2 sensor platform 40 is an advanced sensor platform that is built around a low-power processor (PXA271 Xscale processor, from Intel), which has a software selectable CPU speed that ranges from 13 MHz for low-power operation, up to 416 MHz for calculation-intensive tasks. The example platform 40 integrates 256 KB of SRAM, 32 MB external SDRAM, and 32 MB of flash memory. The onboard memory allows the example sensor platform to be used for the high-frequency sampling required for dynamic structural monitoring. The sensor platform 40 also integrates an 802.15.4 TI CC2420 radio transceiver, which supports a 250 KB/s data rate, with an onboard 2.4 GHz antenna. A Power Management IC (PMIC) supplies nine different voltage domains and includes a battery charging option, which is useful for long-term SHM applications. The example sensor platform 40 is a modular stackable platform and can be extended with diverse boards, such as extension boards, to customize the sensor system for specific applications. Nonlimiting example extension boards include the Interface board (e.g., IIB2400) for code debugging through JTAG interface and USB port programming, and a battery board 44 (e.g., IBB2400CA) to supply system power. A summary of specifications for the Imote2 as used in a nonlimiting example embodiment is provided in the table below:

| Feature | Value |
| --- | --- |
| Clock speed (MHz) | 13-416 |
| Active Power (mW) | 44 @ 13 MHz, 570 @ 416 MHz |
| Program flash (bytes) | 32M |
| Data Rate (kbps) | 250 |
| RAM (bytes) | 256K + 32M external |
| Nonvolatile storage (bytes) | 32M (Program flash) |
| Size (mm) | 48 × 36 × 7 |

Because the example sensor platform 40 has no intrinsic sensing capabilities, a separate sensor board 42 is employed to collect data. A conventional basic sensor board 40, the ITS400 sensor board by Intel provides a digital accelerometer (LIS3L02DQ) 60, a temperature/humidity sensor 62, a light sensor 64, and a 4-channel 12-bit analog-to-digital converter (ADC). The accelerometer 60 is a 3-axes digital output linear accelerometer having a built-in 12-bit ADC, which is followed by digital filters. Because there is no need for a separate ADC, the LIS3L02DQ accelerometer 60 is a low-power sensor, contributing to the power-efficiency of the sensor board.

However, the LIS3L02DQ 60 includes several limitations for SHM applications. One limitation is that the accelerometer 60 lacks flexibility in selecting the sample size. The ITS400 sensor board 42 has only four sampling rates and corresponding cutoff frequencies. The lowest sampling rate is 280 Hz (with a corresponding 70 Hz cutoff frequency), which is too high for many SHM applications. Also, the sampling rates are not stable, which can significantly hinder synchronized sensing that is significant for SHM application. Further, a non-stationary fluctuation in the sampling rate on the basic sensor board is present. Still further, the resolution of the digital accelerometer 60 with the built-in ADC 66 is 0.98 mg, which is too coarse for ambient vibration measurements. Though the synchronization problem can be addressed via a resampling algorithm, this requires additional computational cost, and the limited resolution issue remains an issue.

Vibration-based SHM requires sensed data that well represents the physical response of the structure both in amplitude and phase. The measurements should have ample resolution to characterize the structural response and should be recorded with a consistent sample rate that is synchronized with other sensed data from the structure. Whether the data is used to perform modal analysis, system identification, or vibration-based damage detection, these aspects of the data quality should be met so that reasonable results may be achieved. To be used in SHM applications, the sensor hardware that interfaces with the smart sensor platform should provide such high-fidelity data.

A sensor board according to an embodiment of the present invention provides flexible and accurate user-selectable sampling rates and anti-aliasing filtering capabilities. Because of the local nature of structural damage, higher mode responses of the structure are often required (e.g., up to 500 Hz) in addition to low-frequency signals (e.g., DC to 20 Hz). To avoid potential signal errors, especially in the higher frequency range, avoiding sample-rate fluctuation (jitter) is useful. In a nonlimiting example sensor board, a programmable signal conditioner provides flexibility for the user in terms of anti-aliasing and signal processing.

As stated above, vibration-based SHM requires the ability to measure small-amplitude structural vibration. Accordingly, sensors employed in such applications should possess appropriate sensitivity and noise characteristics. Several factors contribute to the quality of the measured digital signal that the sensor board outputs. One is the sensitivity of the sensor, which is defined by the relationship between the physical phenomena that is sensed and the output of the sensor. Another significant factor is the noise floor of the sensor and other electrical components. Yet another factor is the resolution at which the analog signal is digitized by the ADC, which dictates the smallest measurable increment which can be quantified.

The majority of SHM applications are based on measured ambient vibration response and require high-fidelity data to ensure that modal analysis and damage detection algorithms, among other processing techniques, provide reasonable results. To encompass a wide range of potential applications the example sensor hardware should allow flexibility in the sample rate as well as provide user-selectable anti-aliasing filters.

A nonlimiting example sensor board incorporates three axes of high-sensitivity accelerometer measurements with a high-resolution ADC that provides user-selectable sampling rate and anti-aliasing filters. Temperature, humidity, and/or light sensors can also be provided in example sensor boards. Temperature sensors allow the signals from the sensors to be calibrated to account for temperature changes, and also provide additional insight to the structural response under varying environmental conditions.

Figure 5:
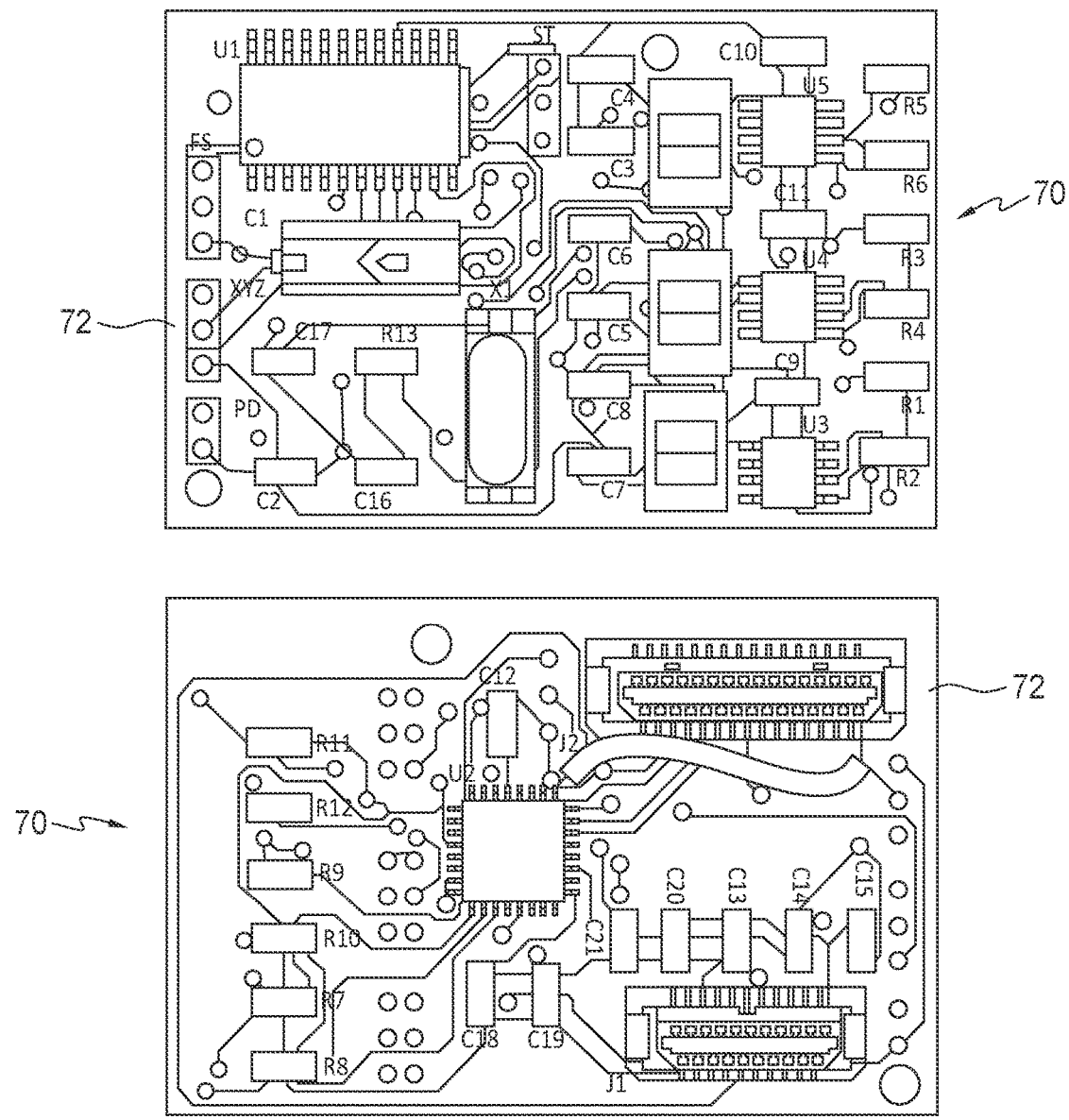
FIG. 5 shows top and bottom views, respectively, of a sensor board according to an embodiment of the present invention.
Figure 6:
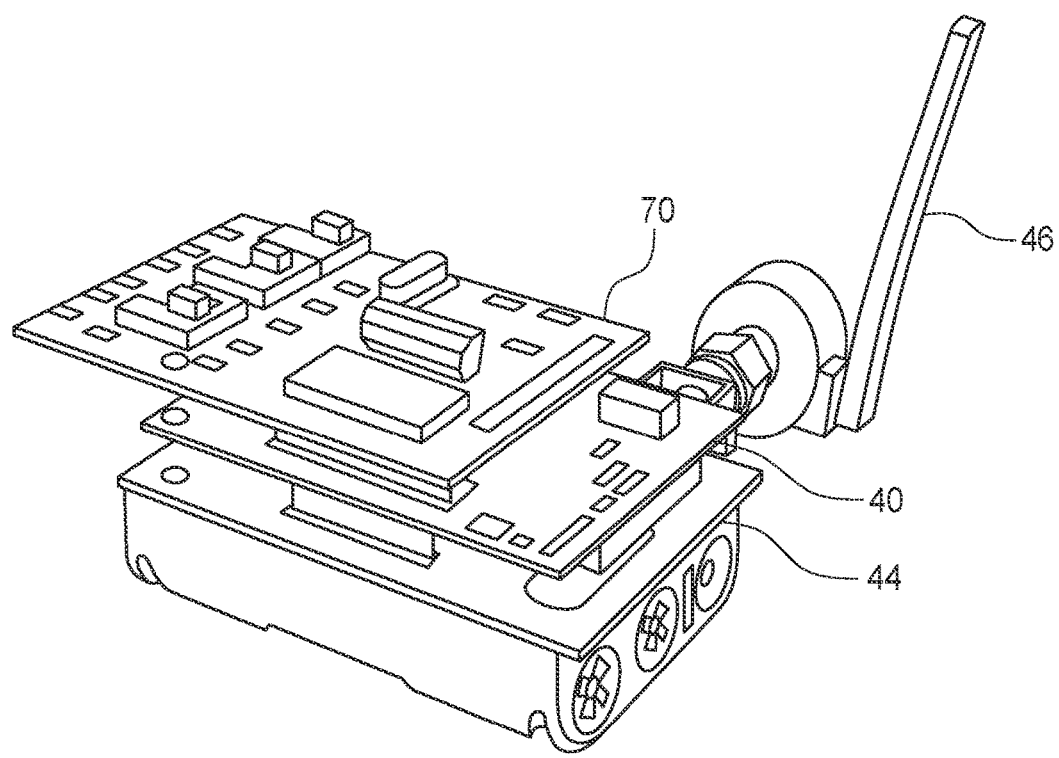
FIG. 6 shows the example sensor board of FIG. 5 in a stacked configuration with a sensor platform, a battery board, and an antenna to provide a sensor node, according to an embodiment of the present invention.

FIG. 5 shows top and bottom views, respectively, of a sensor board 70 according to an embodiment of the present invention, referred to herein for convenience as SHM-A. The example SHM-A sensor board 70 provides flexible and highly accurate user-selectable sampling rates through the use of a multi-channel ADC with programmable digital filters. Combining an analog accelerometer with the ADC resolves sampling rate related problems. The example SHM-A sensor board 70 includes a printed circuit board 72 having a 3-axes analog MEMS accelerometer. The circuit board interfaces with the sensor platform (e.g., Imote2) in a nonlimiting example for vibration measurement. FIG. 6 shows the example sensor board stacked on the example sensor platform, along with a battery board.

Figure 7:
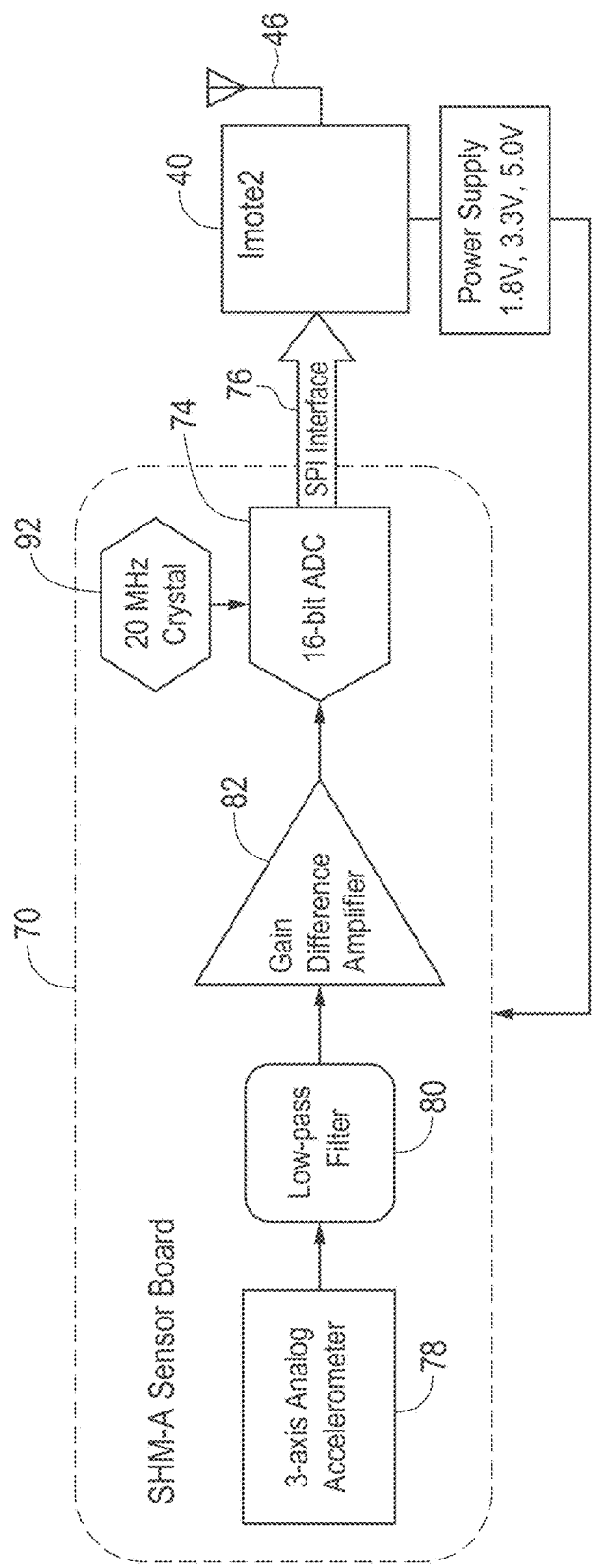
FIG. 7 shows components of the example sensor board of FIGS. 5-6.

FIG. 7 shows particular components of the example SHM-A board 70. Example SHM-A board 70 includes an ADC 74 embodied in the Quickfilter QF4A512 ADC, which is a versatile, 4-channel ADC and programmable signal conditioner with user-selectable sampling rates and programmable digital filters. An interface is provided via an SPI I/O 76 for interfacing the example sensor board with the sensor platform (e.g., Imote2) 40.

An example multi-axis accelerometer 78 for the sensor board is the ST Microelectronics LISL302AS4 capacitive-type MEMS accelerometer with DC to 1500 Hz measurement range. This type of accelerometer utilizes the motion of a proof mass to change the distance between internal capacitive plates, resulting in a change of output voltage in response to acceleration. This example accelerometer 78 provides 3 axes of acceleration on one chip. In other example embodiments, if lower noise characteristics are desired for a specific application, an accelerometer such as (but not limited to) the SD1221 (Silicon Design) or the Si-Flex SF1500S (Colibrys) can be incorporated into the sensor board 70 with appropriate measures to accommodate higher power requirements. The example ST Micro accelerometer 78 has high output impedance with a large margin of error in the specified resistor value. Thus, care should be taken to compensate for the high output impedance and avoid the introduction of error into the output signal.

Figure 8:
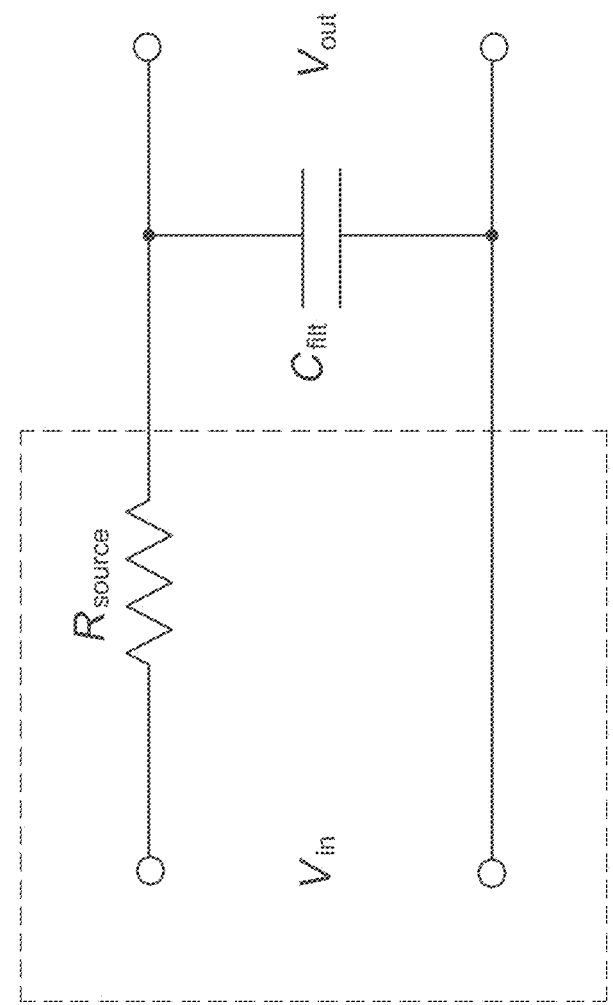
FIG. 8 shows an example RC filter created by an internal resistor and external capacitor at an interface of an accelerometer output.

An internal resistor on the LIS3L02AS4 accelerometer 78 is in series with an external user-selectable capacitor to form a single-pole low-pass RC filter 80, as shown in FIG. 8, at the interface of the accelerometer output. The minimum capacitor value that can be used corresponds to a cutoff frequency of approximately 1500 Hz. The cutoff frequency of the filter 80 is defined by the 3 dB roll-off point. This type of filter may be inadequate for some applications as an anti-aliasing filter because of its very slow roll-off (6 dB per octave). For example, the filter gain does not reach the level of the theoretical noise floor of the ADC (81 dB), until $f=11,000*f_c$ due to the very slow roll-off of the filter 80. If a measurement bandwidth of 20 Hz is desired, the data could be sampled at 2*11,000*20 Hz=440 kHz, to ensure that no higher frequency energy is aliased into the signal. Additionally, the filter 80 has non-linear phase distortion.

Beyond the limitations of a single-pole RC filter to act as an effective anti-aliasing filter, the accuracy of the amplitude and phase response is subject to the accuracy of the series resistor and capacitor that comprise the filter. The potential error in the accelerometer's 78 internal resistor (±20%) in an example embodiment can be addressed to avoid error in the signal amplitude and phase over the bandwidth of interest. Assuming that the capacitor is known precisely, the variation in the resistance can result in a variation in the cutoff frequency, which can range from −17% to +25% of the nominal value. The potential phase mismatch between channels at the 50-Hz cutoff frequency can be as high as 11.5 degrees. The maximum mismatch at 100 Hz for the 500-Hz nominal cutoff frequency is 4.9 degrees while the maximum mismatch at 100 Hz for the 1500-Hz cutoff frequency is 0.5 degrees.

To minimize phase and amplitude errors, the highest possible cutoff frequency should be selected for the example accelerometer 78. Nonlimiting example SHM-A sensor boards 70 allow a user to select between the 50 Hz and the 500 Hz cutoff frequency. Other example SHM-A sensor boards fix the cutoff frequency to the highest possible value (e.g., 1500 Hz).

A gain difference amplifier (e.g., AD628, Analog Devices) follows the accelerometer 78 and low-pass filter 80 to compensate for the high output impedance of the accelerometer. A high output impedance ($R_{source}$) can be problematic if the device that the output signal feeds into has a much lower input impedance ($R_{load}$) because the signal is attenuated as follows:

$$V_{load} = V_{source} \frac{R_{load}}{R_{load} + R_{source}}$$

where $V_{source}$ is the signal from the accelerometer 78 and $V_{load}$ is the attenuated signal. The output impedance of the accelerometer 78 is 110 k≠ while the input impedance of the subsequent ADC 74 is 10 kΩ. Without the amplifier 82, the amplitude of the resulting signal would be less than 10 percent of the original signal. The input impedance of the amplifier 82 is 100 kΩ, which results in the accelerometer signal being approximately cut in half.

Figure 9:
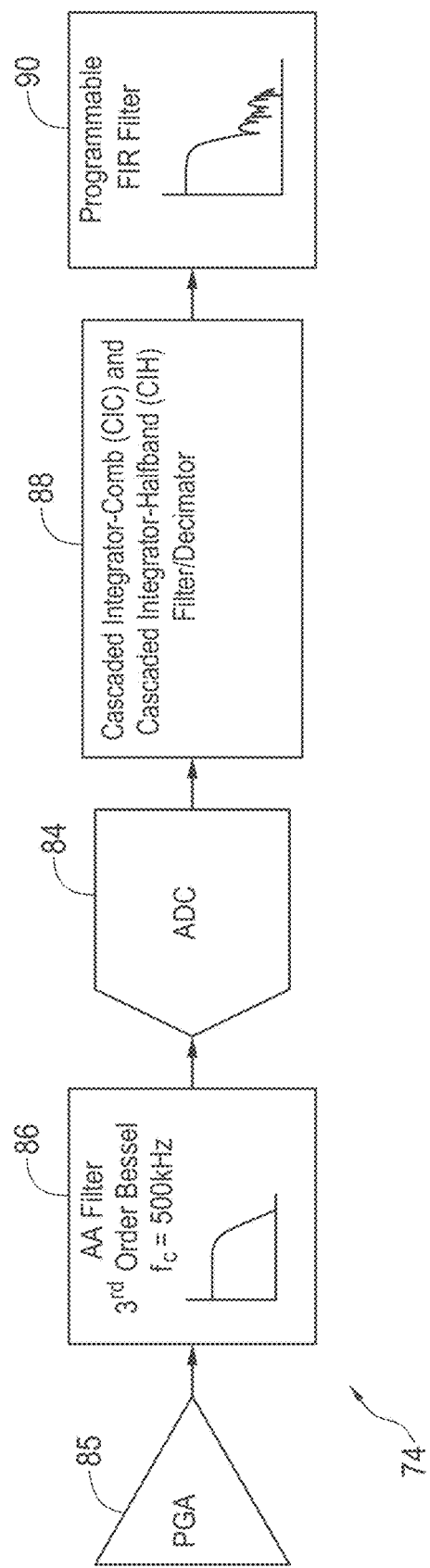
FIG. 9 shows components of an example programmable signal conditioner.

Components of a nonlimiting example signal conditioner 74, the QF4A512, are shown in FIG. 9. The QF4A512 74 employs a versatile 4-channel, 16-bit resolution ADC 84. Each channel has a selectable gain (up to 8×) 85, an analog anti-aliasing filter 86 with a 500-Hz cutoff frequency, individually selectable sampling frequencies 88, and individually programmable digital FIR filters (up to 512 filter coefficients) 90.

The example signal conditioner 74 performs oversampling, filtering, and decimation to achieve at least two purposes of the measured signal. One purpose of oversampling is to improve the resolution of the output by decreasing the noise from quantization error. The resolution of the ADC 84 dictates the smallest measurable increment that can be resolved. Quantization introduces a constant level of noise energy, which is uniformly distributed over the measured bandwidth. The higher the sampling frequency, the wider the frequency range over which the noise energy is distributed. Because the energy of the noise is constant, increasing the Nyquist frequency lowers the amplitude of the noise. When a digital decimation filter 88 is applied to the oversampled signal, the noise energy above the new Nyquist frequency is eliminated, thereby improving the resolution of the signal. A 4-times oversampling rate, for instance, lowers the quantization noise floor by 6 dB, or the equivalent of achieving one additional bit in resolution.

The QF4A512 74 provides variable anti-aliasing filters 86 by following the unaliased, oversampled signal with digital filtering and decimation. Analog anti-aliasing (AA) filters 86 include 3rd order Bessel filters with a cutoff frequency of 500 kHz. The digital decimation filters 88 in this example embodiment are Cascaded-Integrator-Comb (CIC) filters, working in combination with Cascaded-Integrator-Halfband (CIH) filters to ensure that the integrity of the signal is maintained upon decimation to the final user-specified sampling frequency. This example combination of filters provides excellent amplitude response, while preserving a linear phase response.

The gain, sampling rate, and user-designed FIR filters in an example sensor board 74 preferably can all be set with the user of the board software. In an example setting method, a user first selects the desired FIR filter 90 type. Nonlimiting example available filter types include Basic Parks-McClellan, Window Sync Blackman, and Window Sync Blackman-Harris, with low-pass, high-pass, band-pass, and band-stop options. The user then selects the final sampling rate and filter characteristics, such as by using an FIR editor. Example sampling rates can range from 6 Hz to over 100 kHz; however, the example sensor platform (Imote2) limits the maximum sampling rate to 5000 Hz. The results of the filter design and configuration can be exported to a header file. Multiple configuration files can be created and stored on the example sensor platform. When a sensing application runs, the sensor platform in an example method then loads the requested configuration file onto the example ADC.

A master clock of the QF4A512 uses an external signal provided by a surface mounted 20 MHz crystal oscillator 92 (e.g., Citizen HCM-49). A phase locked loop (PLL) circuit provides a control system to generate a clock signal that tracks (or locks into) the frequency provided by the oscillator. All internal clocks are derived from the master clock through the use of dividers. The example default PLL clock frequency is equal to the oscillator frequency divided by 10, or 200 MHz; the clocks that controls the ADC and FIR filters are derived from the PLL clock with additional dividers. The clock used to drive the example ADC has a default frequency of 100 MHz (divider=2) and the system clock, which runs the FIR filters, has a default frequency of 200 MHz (divider=1). The accuracy in the effective sampling rate of the output signal depends on the accuracy of the external crystal, which in an example is specified as ±30 ppm (0.003%). The processor clock on the Imote2 40 is independent of the QF4A512 clocks and runs at 3.25 MHz. During sensing, the example Imote2 40 clock only affects the time-stamps assigned to each data point coming from the QF4A512 and is assumed to be accurate, although it can also be a source of sampling error.

A nonlimiting example software driver for the SHM-A sensor board 70 is developed in TinyOS. The example driver controls the functions of the QF4A512, such as (but not limited to) loading the filter coefficients, allocating memory, timestamping, writing data, etc. The example driver first initializes the ADC 74 and triggers the sampling to start. A time delay may be present between the command to begin sampling and the actual start of sampling due to limitations in TinyOS. During sampling, the samples are released from the ADC 74 and written to the sensor platform buffers as two-byte integers (16-bit). Timestamping occurs at multiples of the sampling time. If timestamping is requested, the timestamps are written with the ADC data at this lower specified frequency (e.g., every 10 samples).

In an example operation, to calibrate each channel of the accelerometer 78, the sensor board 70 is placed on an accelerometer calibration frame, which ensures a level measurement surface. Measurements are taken with the board oriented so that signals corresponding to −1 g, 0 g, and +1 g are measured for each of the measurement axes. The results provide calibration constants (DC offset and scale) that can be directly implemented in an example sensing application.

The Quickfilter ADC 74 has a nominal resolution of 16 bits. The acceleration range of the ST Micro accelerometer 78 is ±2 g at a sensitivity of 0.66 V/g and a zero-g offset equivalent to half of the supply voltage. The gain difference amplifier in a nonlimiting example embodiment results in a halving of the output of the accelerometer; therefore, the full range is 2 g*0.66 V/g=1.33 V. Each channel input to the QF5A512 74 has two input pins. The input on each pin should be between 0.2 and 2.5V, and the difference between the pins should be between 0 and 1V. Series resistors directly prior to the input pins for each channel serve to shift and scale the input signals so that they satisfy these requirements. The values of the series resistors used in an example sensor board provide an accelerometer output (±2 g=4 g). Based on this example design, the theoretical nominal resolution of the output signal is 0.15 mg for a 40% of a 16-bit ADC. However, the signal-to-noise ratio (SNR) of the example ADC that results from noise within the device is given as 81 dB, which corresponds to 13.2 effective number of bits (ENOB). Using 40 percent of the 13.2 bit ADC range yields a resolution of 1.1 mg. The equation below gives the relationship between ENOB and the noise floor (in dB). Oversampling can result in an increase in the number of bits achieved beyond those realized in hardware.

$$ENOB = \frac{SNR - 1.76}{6.02}$$

Inherent noise is present in this example accelerometer 78 and other components, in addition to the noise resulting from the ADC quantization. The noise density of the accelerometer is given as 50 μg/√Hz. The relationship between the noise density, $N_d$ and the RMS noise level, $N_{RMS}$, measured for a particular measurement bandwidth (BW) is given in the equation below.

$$N_{RMS} = 0.707 \cdot N_d \sqrt{BW}$$

Over a 128-Hz bandwidth the specified accelerometer noise density corresponds to an RMS noise level of 0.4 mg. To improve the noise floor, one can eliminate the difference gain amplifier and replace it with an operational amplifier with a very high input impedance to reduce signal attenuate prior to the QF4A512. Further improvement can be provided by correctly sizing the series resistors on the input to the QF4A512 to take full advantage of the ADC range. Also, a different accelerometer with lower noise characteristics can be used.

Figure 10A:
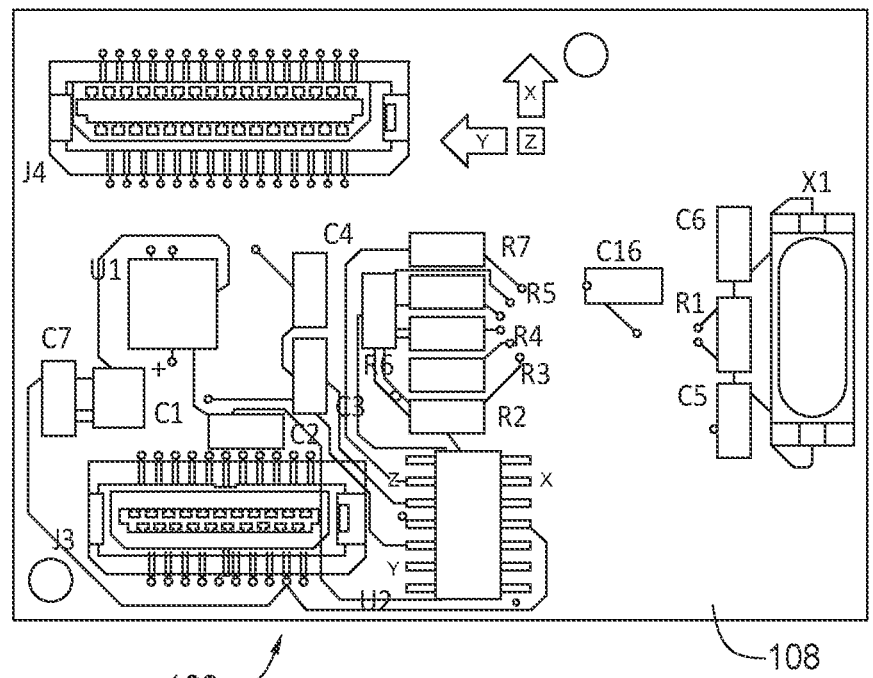
FIGS. 10A-10B show top and bottom views, respectively, of a sensor board according to another embodiment of the present invention.
Figure 10B:
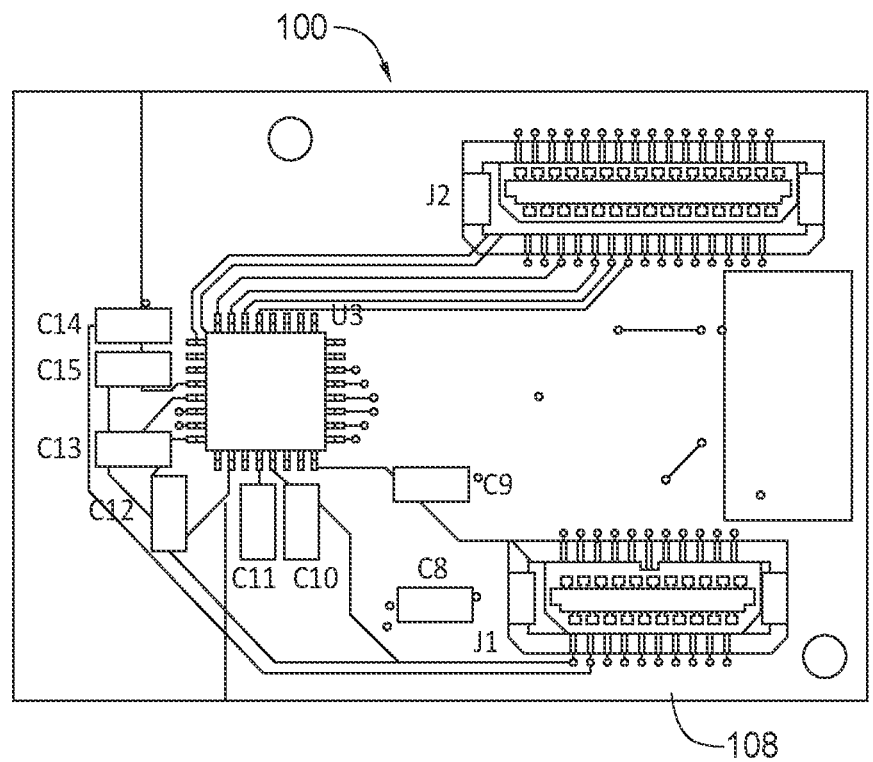
Figure 11:
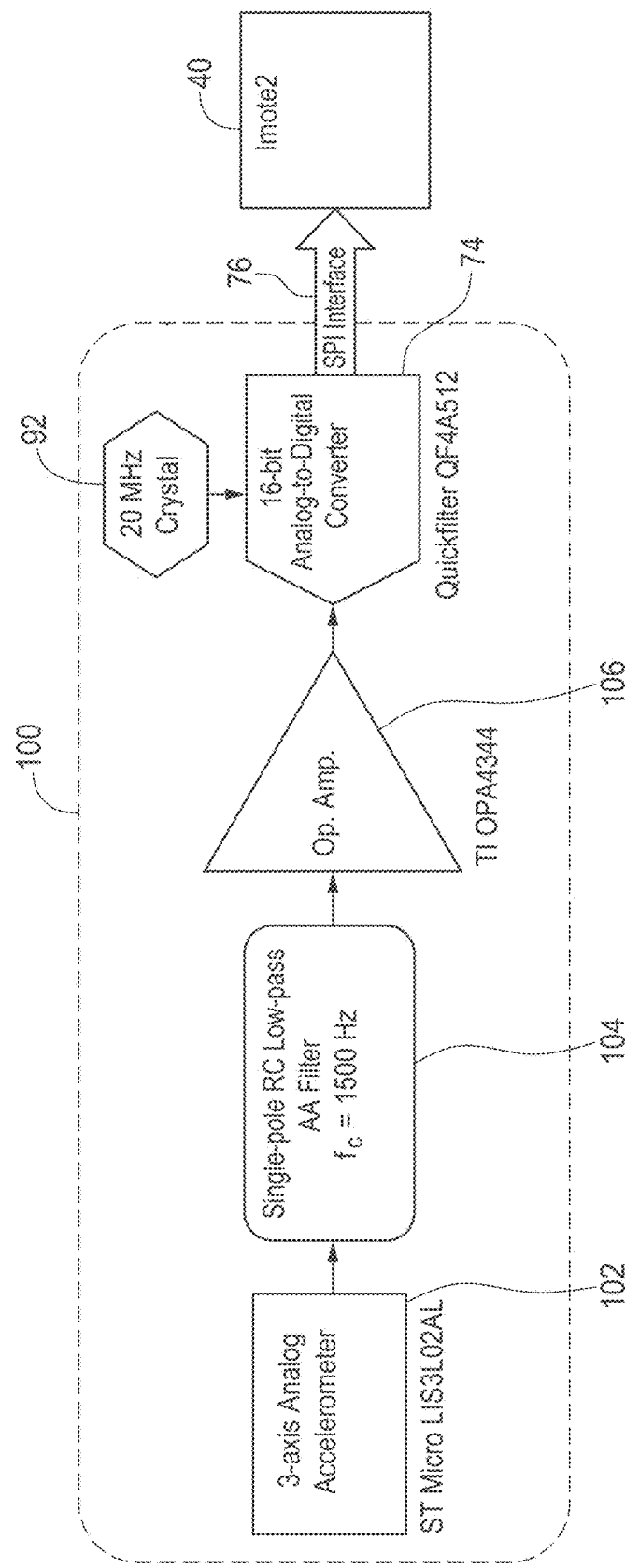
FIG. 11 shows components of the example sensor board of FIGS. 10A-10B.

A SHM-A sensor board 100 according to another embodiment of the invention, referred to herein for convenience as SHM-A2, is shown in FIGS. 10-11. This example embodiment 100 can achieve higher resolution, a lower signal-to-noise ratio, and a simpler design and layout. In the example SHM-A2 sensor board 100, the accelerometer 102 is provided by an LIS3L02AL (ST Microelectronics) accelerometer. Compared to the SHM-A board 70 provided above, an example of the SHM-A2 sensor board 100 eliminates the switches used to provide single-pole filters 104 with two possible cutoffs, and a capacitor puts the cutoff frequency at 1500 Hz, thereby limiting error associated with the filter. Further, the AD628 differential amplifier from the SHM-A sensor board is removed, and an operational amplifier (e.g., OPA4344, Texas Instruments) 106 is provided to eliminate signal attenuation and thereby improve resolution and noise performance.

In this additional example embodiment 100, the digital and analog components are separated on the circuit board 88, as shown in FIGS. 10A-B, avoiding ground loop interference and ensuring short and parallel digital traces, and reducing or minimizing noise. Though an example embodiment 100 uses a two-layer board 108 that does not separate power and ground planes (though this is also contemplated in other embodiments to further minimize signal noise and interference), the example embodiment 100 in FIGS. 10A-B provides a solid ground region on the bottom side of the circuit board 108 (FIG. 10B). All of the ground signals on the circuit board 108 connect directly to the ground region, which provides a clear path for the return current.

Further, the series resistors on the input to the ADC (e.g., QF4A512) 74 are sized in this example embodiment to take advantage of more of the range of the ADC. With the example input utilizing 90% of the ADC range and a theoretical noise floor of 81 dB, the expected RMS noise level of the acceleration is 0.48 mg. In example testing of the sensor board 100, LSB (with 1× PGA setting) is approximately 0.16 mg, and the RMS noise level over 500 Hz is approximately 0.5 mg. The resulting SNR is 13.0 ENOB, and the equivalent (not shown) SNR is 80 dB, which corresponds well to the predicted values.

Another embodiment SHM-A sensor board (not shown), referred to herein as SHM-A3, additionally provides environmental sensors to create a multimetric sensor board for use in a broad range of SHM applications. For example, temperature sensors can lend additional insight into the observed behavior of a structure. Humidity measurements are of interest on structures that are susceptible to corrosion due to environmental factors. The possibility of incorporating solar power options provides an example reason for providing light measurements.

Accordingly, the example SHM-A3 sensor board incorporates digital light, temperature, and humidity sensors to a board such as the previous SHM-A2 board 100 provided above. In a nonlimiting example, a light sensor is provided by a Texas Advanced Optoelectronic Solutions TSL2561 light-to-digital converter, which has low active power (~0.75 mW) and 16-bit digital I2C output. A nonlimiting example temperature and relative humidity sensor is provided by a Sensiron SHT11 Humidity and Temperature sensor with low power consumption (~30 mW), 14-bit temperature output, and 12-bit humidity output. Additional software configurations can be provided to allow commands to remotely read single points of light, temperature, and humidity, as well as continuous temperature measurements when acceleration data is collected.

Figure 12:
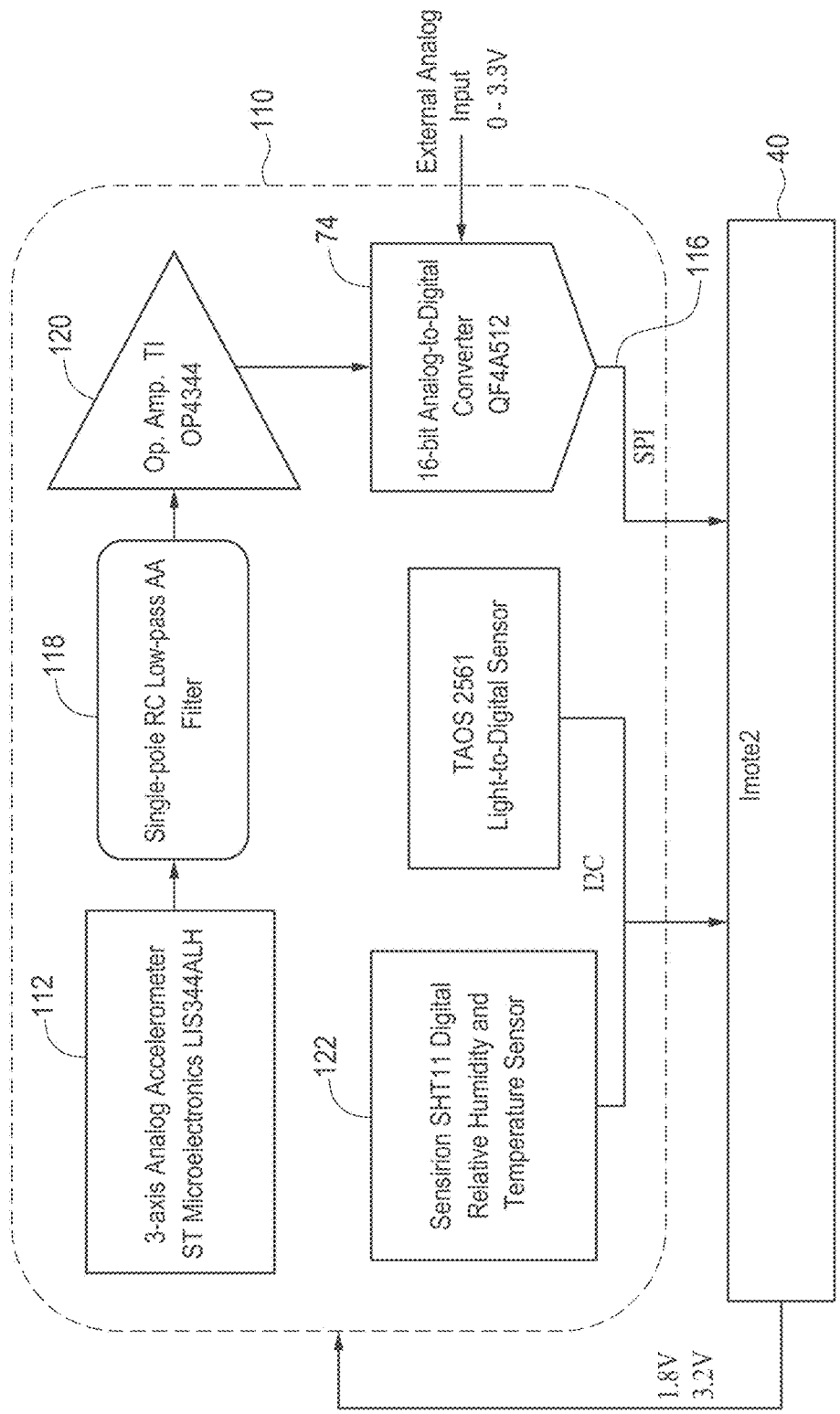
FIG. 12 shows components of another, multimetric sensor board according to another embodiment of the invention.
Figure 13B:
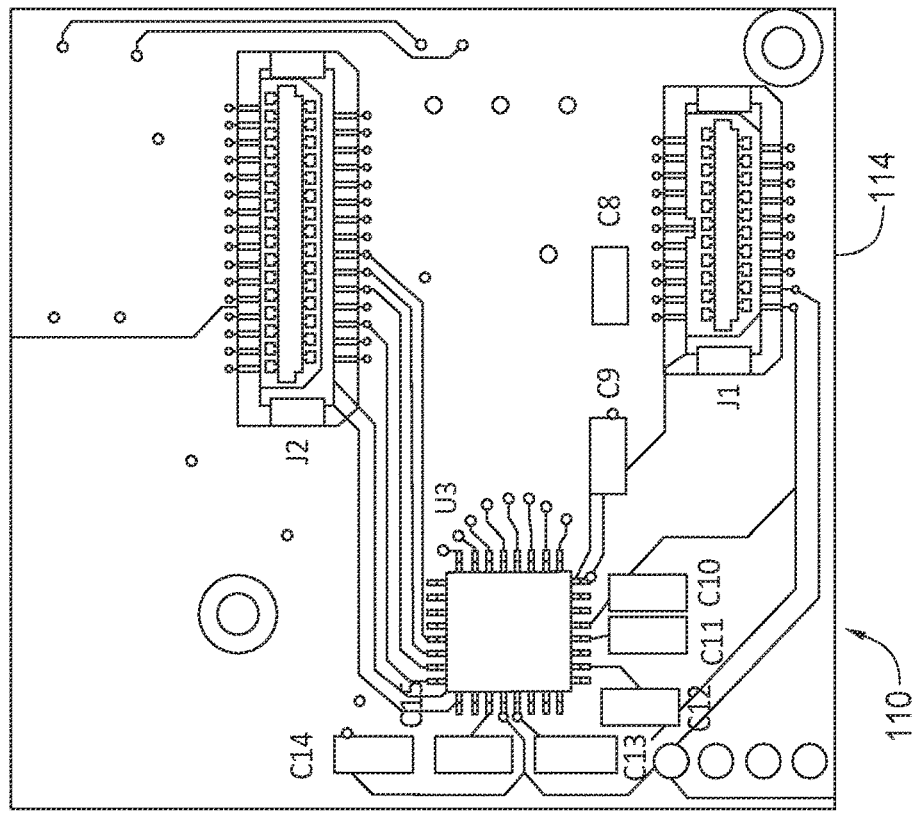
FIGS. 13A-13B show top and bottom views, respectively, of the sensor board of FIG. 12.
Figure 13A:
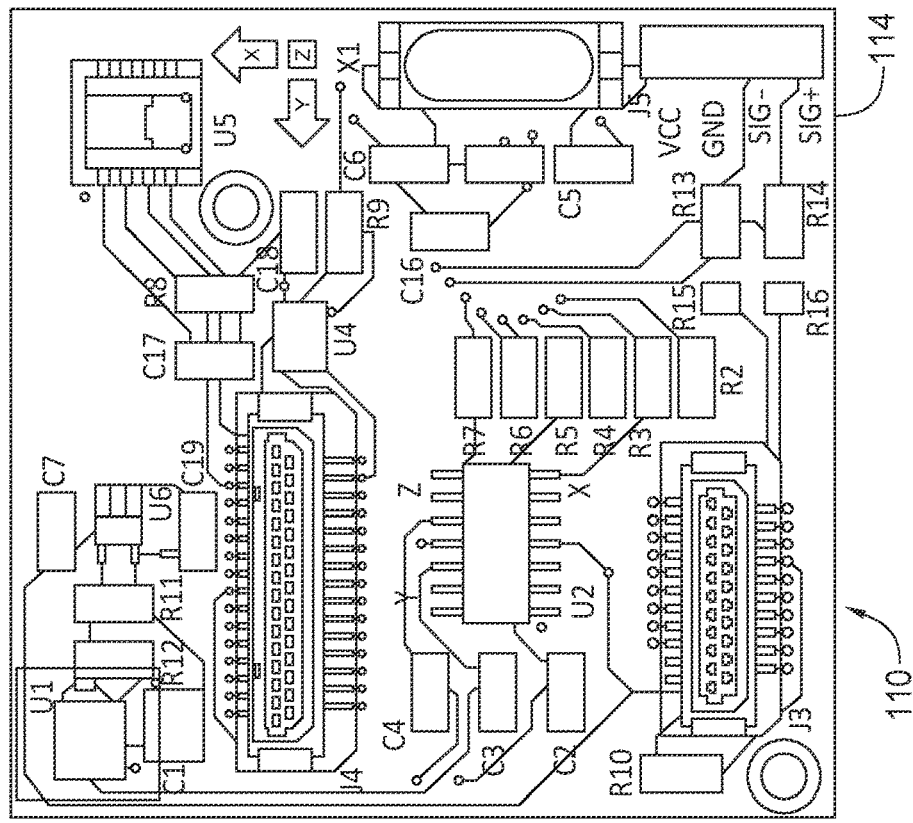

Yet another embodiment SHM-A board 110, referred to herein as SHM-A4, is shown in FIGS. 12 and 13A-13B. This example sensor board 110 incorporates features to minimize temperature effects on the mean value of the acceleration output and to expose external access to the remaining fourth channel of the 4-channel Quickfilter QF4A512 signal conditioner 74. Additionally, the scaling of the input to the ADC was configured to improve the sensitivity/noise performance of the sensor board.

An example accelerometer 112 for the SHM-A4 is an analog 3-axes accelerometer, a nonlimiting example of which is ST Micro LIS344ALH analog 3-axes accelerometer. The LIS344ALH 112 is more compact than the LIS3L02AL 102, and provides 0.66V/g sensitivity and 0.68 mA current consumption at 3.3 VDC power, ±2 g sensing range, and 50 μg/√Hz noise density. However, other accelerometers may be used. A dedicated voltage regulator is incorporated to ensure that the accelerometer power supply is kept constant.

An example ADC 74 for this sensor board is the Quickfilter QF4A512. The example sensor board 114 interfaces with the sensor platform (e.g., Imote2) 40 via SPI I/O 116 and has a 3-axes analog accelerometer 112 for vibration measurement. Each channel performs oversampling, filtering, and decimation, and can be individually programmed for the gain (e.g., via a programmable gate array (PGA)), anti-aliasing filter (AA filter) 118 cutoff frequency, ADC sampling frequency, and unique filter requirements. This functionality is accomplished in an example embodiment with four separate high-precision digital finite impulse response (FIR) filters.

Each channel of the example accelerometer 112 has an internal resistor (e.g., 110 KΩ) as part of an external low-pass filter. The example ADC 110 has an input impedance (e.g., 10 KΩ) for each channel to limit the input voltage levels to the ADC. This mismatch results in significant signal attenuation. In an example embodiment, a low noise and high sensitivity amplifier, which in a nonlimiting example is provided in an operational amplifier 120 (e.g., TI OPA4344) is employed to provide high impedance and eliminate signal attenuation. The amplifier 120 receives signals from the multi-axis accelerometer 112.

The effective number of bits (ENOB) of the example ADC 74 is 13.2 bit. With this example ENOB, the maximum resolution that the ADC 74 can achieve for a ±2 g sensing range is about 0.43 mg. Considering the average RMS noise of the example sensor board, 0.29 mg for the x- and y-axes, and 0.67 mg for the z-axis over a 20 Hz bandwidth, the actual resolution of the example sensor board 110 is 0.43 mg for x- and y-axes and 0.67 mg for the z-axis (0~20 Hz).

Figure 14:
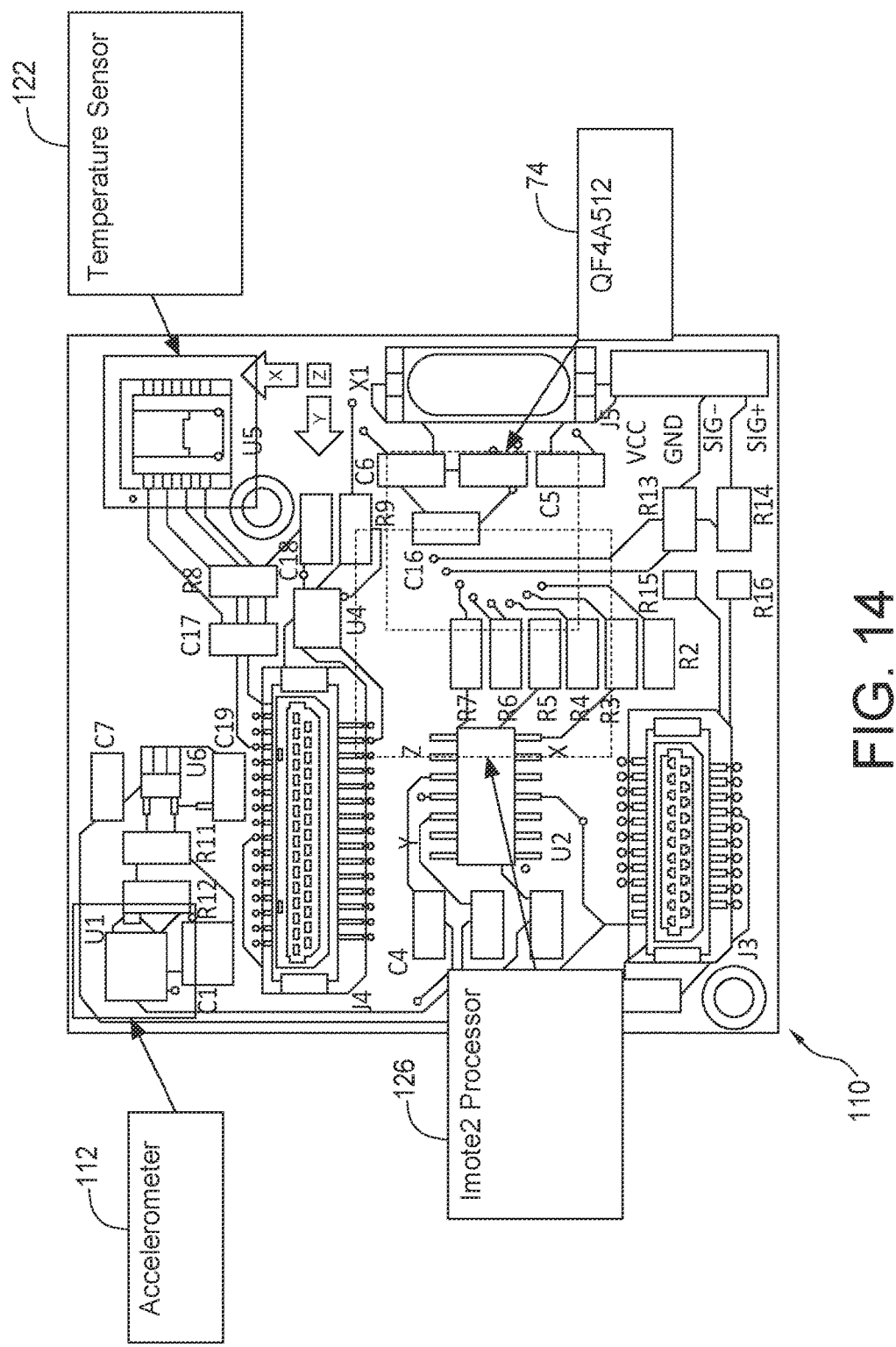
FIG. 14 shows a top view of the sensor board of FIG. 13A, in relation to other components.

To address the mean value drift of the accelerometer output resulting from temperature changes, example embodiments implement onboard temperature compensation in software. The availability of the onboard temperature sensor 122 in example embodiments allows the temperature to be measured simultaneously with the acceleration. The result is that the direct relationship between the self-heating of the board and the accelerometer can be determined. In a nonlimiting example embodiment, the accelerometer and the temperature sensor are located similar distances from the most heat-generating components (the QF4A512 74 and the Imote2 processor 126) as shown by example in FIG. 14 so that the temperature sensor can read temperatures very similar to those experienced by the accelerometer.

Figure 15A:
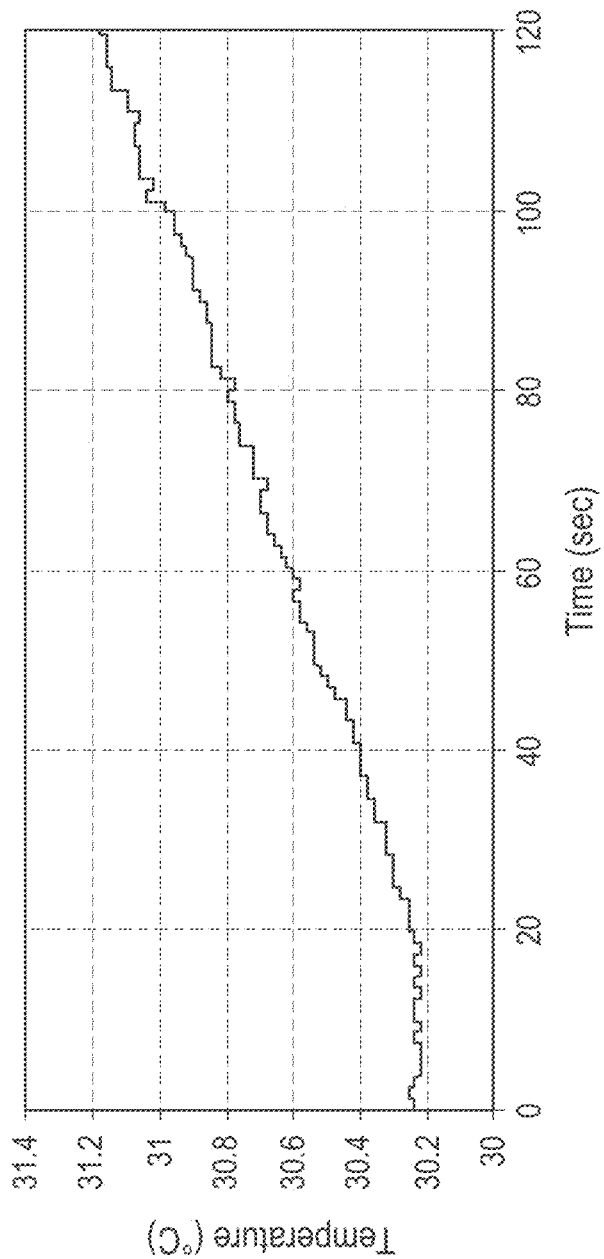
FIG. 15A shows an example temperature measured on board the sensor board of FIGS. 12-14.
Figure 15B:
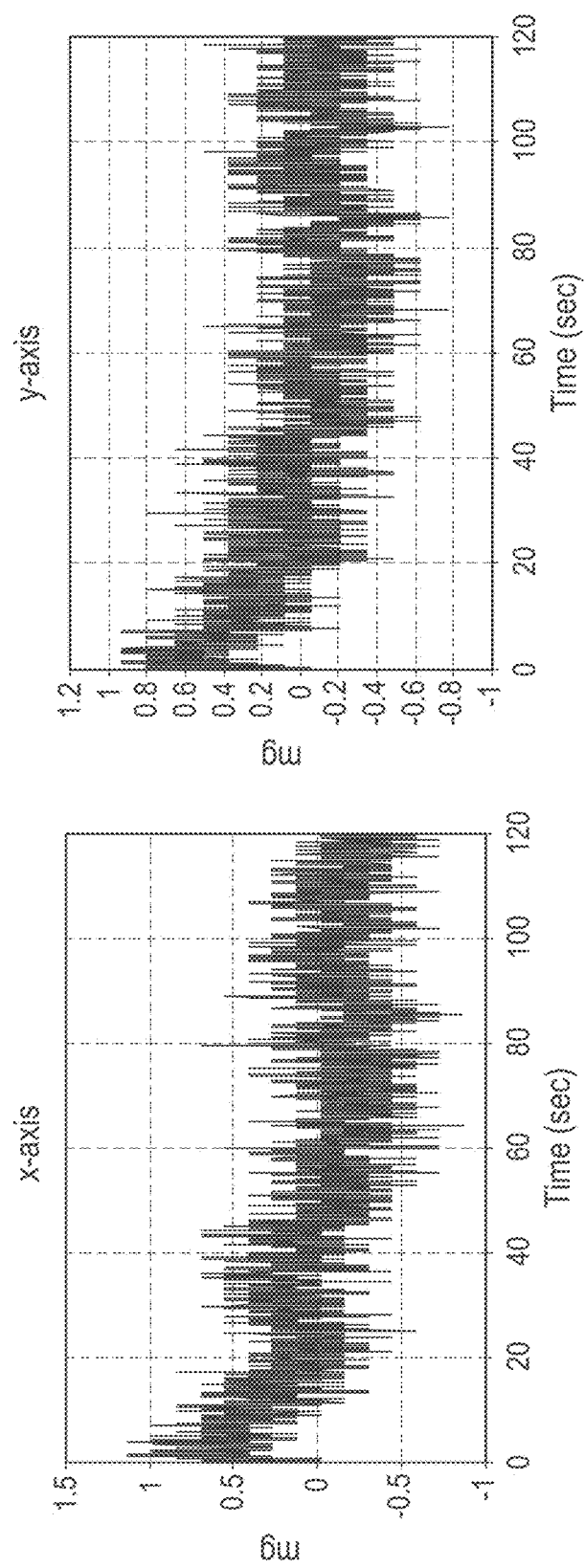
FIG. 15B shows the drift in mean value of x- and y-axes, respectively.
Figure 15C:
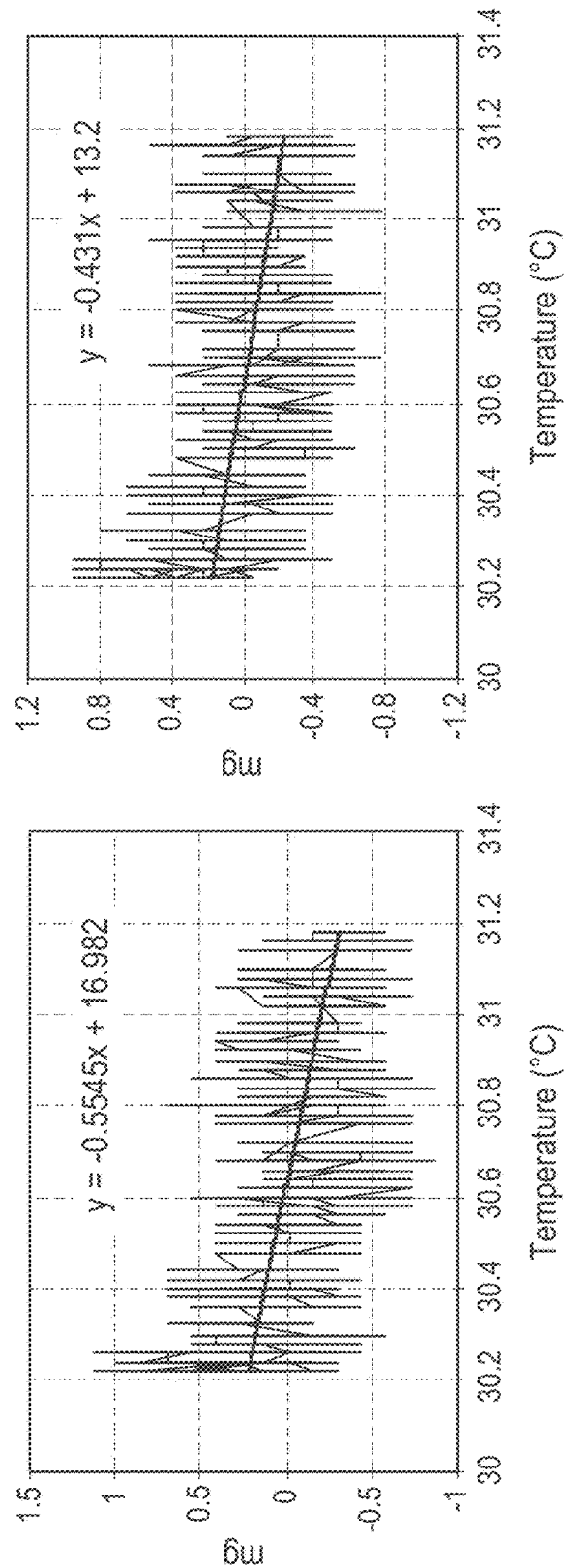
FIG. 15C shows a correlation between temperature and zero-g drift (mean value) for x- and y-axes, respectively.

FIG. 15A shows an example of the temperature measured on board the example SHM-A4 sensor board 110 over a 2-minute period. In this case, the temperature increases by 2° C. FIG. 15B shows the drift in the mean value of the x- and y-axes over the same time period. As the temperature increases, the mean value of the acceleration decreases. The correlation between the temperature and the zero-g drift (mean value) can be determined by plotting the mean value versus temperature and using linear regression to fit a line to the data as shown in FIG. 15C. The slope of the line, a, is the zero-g offset drift as a function of temperature. In example data for the SHM-A4 sensor board the x-axis mean value temperature sensitivity, $\alpha_x$, is 0.55 mg/° C., and the y-axis mean value temperature sensitivity, $\alpha_y$, is 0.43 mg/° C.

Figure 16:
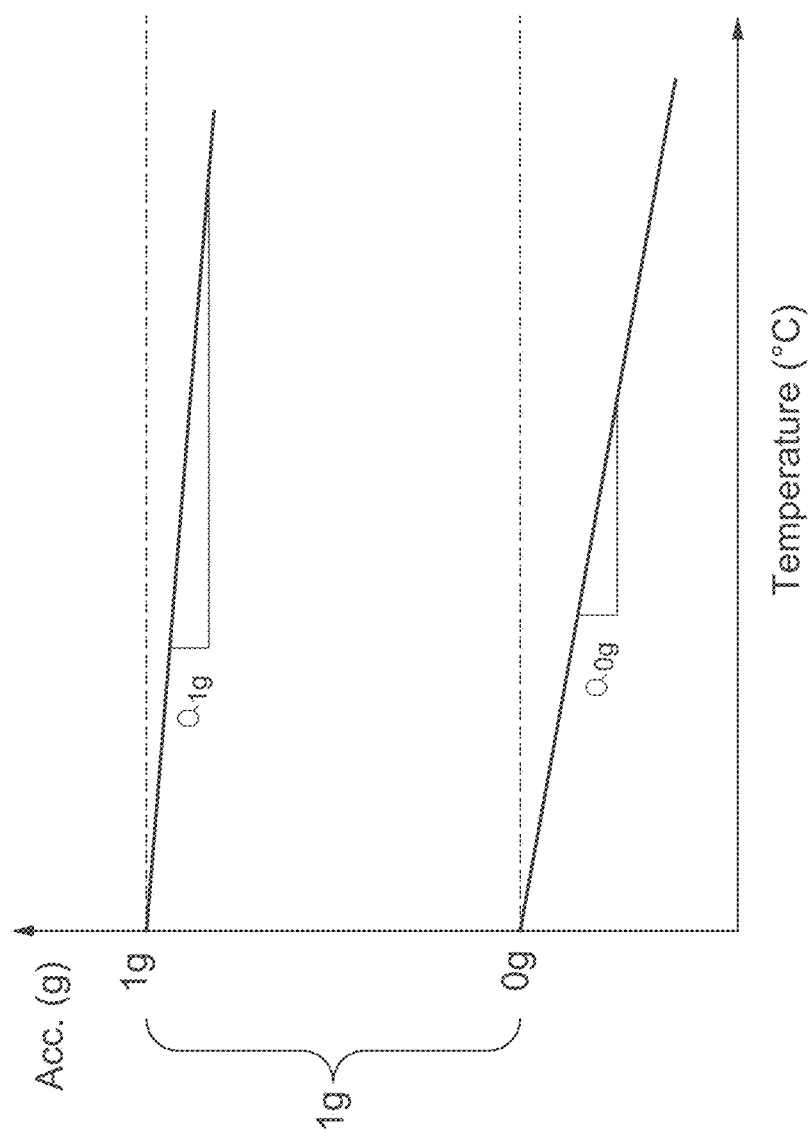
FIG. 16 shows an example determination of acceleration amplitude sensitivity in an example test for the sensor board of FIGS. 12-14.

A mean value temperature sensitivity, α, in mg/° C., was determined by a linear relationship between a measured mean value of acceleration measurement at zero g and temperatures for each of a plurality of temperature test points. An amplitude sensitivity, β, expressed as a percentage, is determined by the difference in the mean value temperature sensitivities measured at zero g and 1 g divided by 1 g as shown in the equation below and in FIG. 16.

$$\beta = \frac{(\alpha_{1g} - \alpha_{0g})}{1g}$$

Though the amplitude temperature sensitivity can be neglected in some example embodiments, the measured mean values preferably are accounted for by correction using measured temperature data. An example method of using the temperature measured on the sensor board 110 to correct the acceleration data follows a two-part approach: determine the mean value temperature sensitivity of each channel on the sensor board 110; and implement onboard correction in software with the sensitivity coefficient. In an example embodiment a utility, referred to herein as TempCal, is used to address the first part, and temperature correction functionality is added to the sensor board driver for the sensor board for the second part.

Figure 17A:
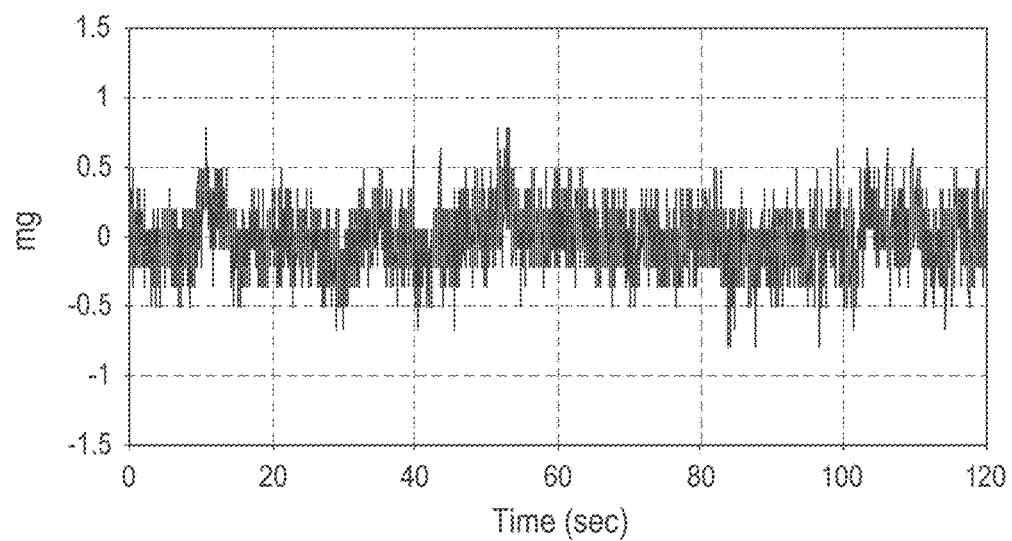
FIGS. 17A-17B show measured acceleration data after correction using mean value temperature constants for x- and y-axes, respectively.
Figure 17B:
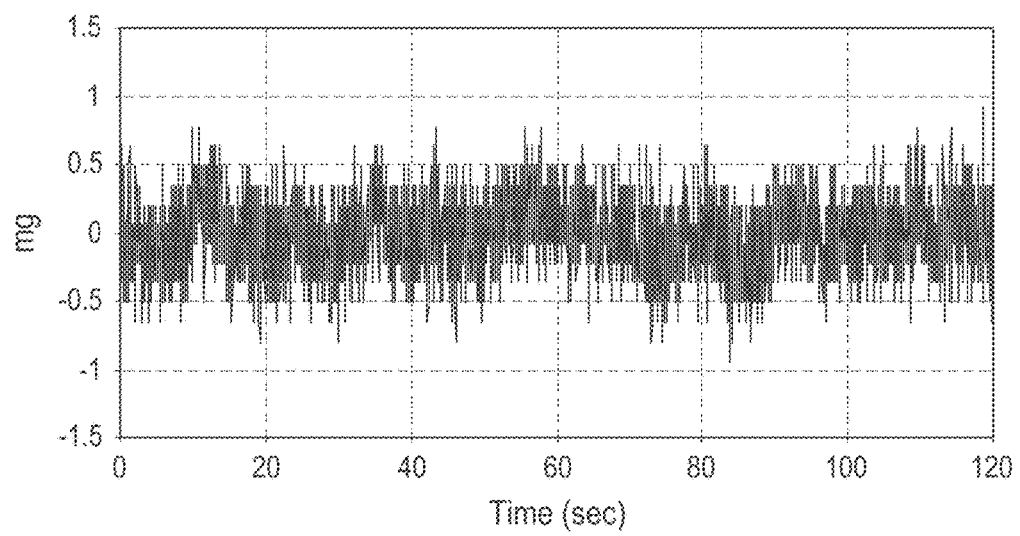

An example TempCal utility can be run on (for example) up to 40 remote nodes at one time, facilitating efficient calibration constant determination for each channel on many sensor boards. To run an example calibration utility, the sensors 110 are placed on a still surface at room temperature. When the command is sent to the remote nodes, sensing is initiated on each of the (e.g., three) accelerometer channels. Once a period of time (e.g., 5 minutes) of acceleration and temperature data are collected, the linear relationship, ST, between the change in temperature and the change in the mean acceleration value is estimated according to the following equation:

$$S_T = \frac{\sum_{i=1}^{n} \frac{a_i - a_{init}}{T_i - T_{init}}}{n}$$

where n is the number of measured data points, $\alpha_i$ is the ith accelerometer measurement, $\alpha_{init}$ is the mean value of the first 10 data accelerometer data points, $T_i$ is the ith temperature measurement, and $T_{init}$ is the mean value of the first 10 temperature data points. If the calibration utility is run more than once, the results may vary slightly from test to test due to inherent signal noise and temperature measurement error (e.g., up to ±0.4° C.) so the sensitivity values returned by the example utility are approximate. FIGS. 17A-B show the measured acceleration data after the mean value temperature sensitivity constants are added to the software and the onboard temperature correction integrated into the driver. These figures show that the mean values of the example SHM-A4 sensor board 110 output do not drift in time when the temperature correction is applied.

Ambient vibration is generated due to a variety of random excitation sources such as nearby traffic, normal wind-loading, machinery inside the structures, etc. Ambient vibration data can be useful for vibration-based SHM. However, usually the vibration level is too small to capture with commercially available sensor boards for wireless sensors. The nominal resolution of an example SHM-A4 board 110 is 0.43~0.67 mg. However, this may not always be able to measure the ambient vibration levels of less than 1 mg that are produced by most civil structures.

Efforts to include the data quality from the sensor board involve the consideration of several factors. The noise floor of the sensor and other electrical components should be sufficiently low. Additionally, the sensitivity of the sensor, which is the relationship between the physical phenomena and output of the sensor, should be sufficiently high. As another factor, the resolution at which the analog signal is digitized by the ADC should be fine enough.

Figure 18:
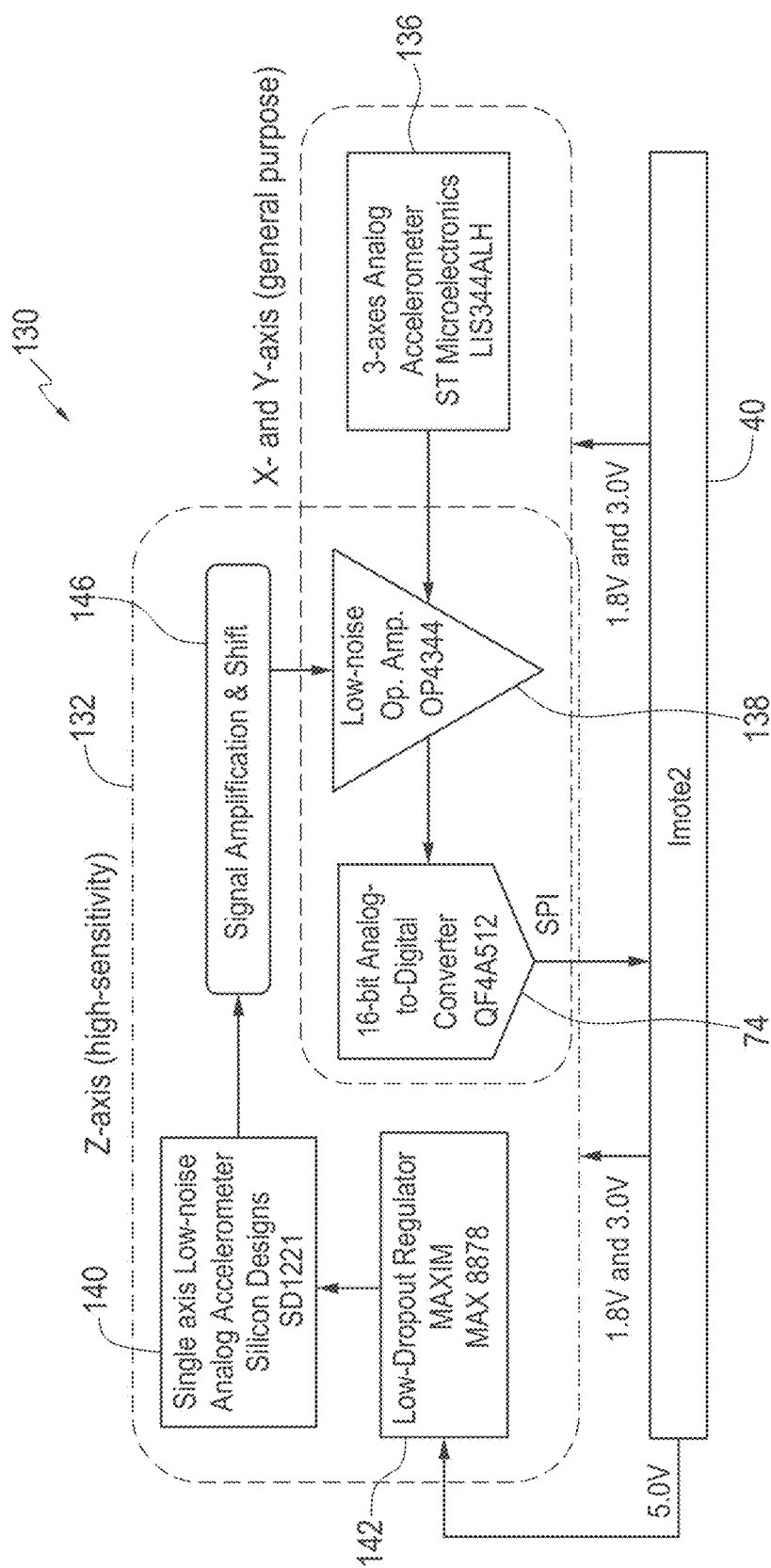
FIG. 18 shows components of another multimetric sensor board according to another embodiment of the invention.

FIG. 18 shows a sensor board 130 according to another embodiment of the invention, referred to herein as an SHM-H sensor board. The example SHM-H board 130 is suitable for measuring low-level vibrations of structures. As with the example SHM-A sensor boards 70, 100, 110, an example embodiment SHM-H sensor board 130 employs a Quickfilter ADC 74. However, the example embodiment SHM-H sensor board 130 replaces the z-axis sensor, which typically has the highest noise among the three axes, with a low-noise and high-sensitivity sensor 132. In addition, the example sensor board 134 reduces the span of the ADC, which improves the resolution of the ADC.

Figures 19A, 19B:
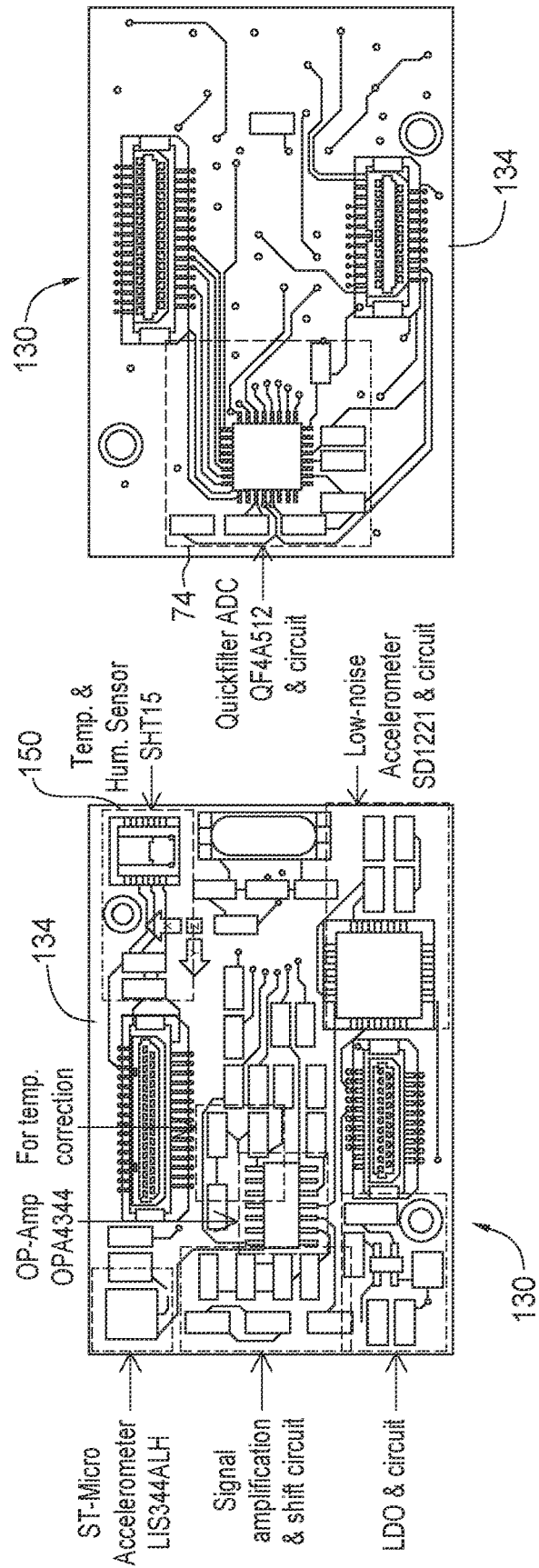
FIGS. 19A-19B show top and bottom views, respectively, of the sensor board of FIG. 18, showing separation of digital and analog signals and a solid ground plane in FIG. 19B.

As shown in FIGS. 19A-B, the example SHM-H board 130, which interfaces with the sensor platform (e.g., Imote2 sensor platform 40) via a suitable interface such as an SPI, includes x- and y-axes (general purpose) sensors, which in this example are embodied in a 3-axes analog accelerometer 136 (e.g., ST Microelectronics LIS344ALH) and circuit, a low-noise op-amp 138 (e.g., OPA4344), and a 16-bit ADC (e.g., QF4A512) 74. A z-axis (high-sensitivity) sensor 132 includes a single-axis low-noise analog accelerometer (e.g., Silicon Designs SD1221) 140 regulated by a low-dropout (LDO) regulator 142 (e.g., MAXIM MAX 8878), and further includes a signal amplification and shift circuit 146. The z-axis sensor 132 in this example embodiment shares the ADC 74 and low-noise op-amp 138 with the x- and y-axes sensor. Also provided are a temperature and humidity sensor (e.g., SHT15) 150 and a circuit for temperature correction.

In the example SHM-H high-sensitivity acceleration sensor board 130, a Silicon Designs SD1221L-002 low-noise accelerometer is used. This accelerometer 140 is a micro-machined capacitive-type sensor with ±2 g and DC to 400 Hz sensing range. In particular, the 2 g version has a noise density of 5 μg/√Hz and a sensitivity of 2000 mV/g with the differential analog outputs. The SD1221 140 contains a temperature dependent current source that is useful for measuring the internal temperature of the accelerometer so that any previously characterized bias and scale factor temperature dependence can be corrected. Some features of the SD1221 are given in the table below. In another example embodiment, the low-noise accelerometer is provided by a MEMS accelerometer SF1500SA (Colibrys).

| Parameter | Value |
|---|---|
| Input Range | ±2 g |
| Frequency Response | 0~400 Hz |
| Sensitivity (Differential) | 2000 mV/g |
| Output Noise Differential, RMS | 5 μg/√Hz (10 μV/√Hz) |
| Bias Temperature Shift | 0.4 mg/° C. (max 1.2 mg/° C. |
| Scale Factor Temperature Shift | -1~+1 mg/° C. |
| Output Impedance | 90 Ohms |
| Operating Voltage | Typ. 5 Volts (4.75~5.25 Volts) |
| Operating Current | Typ. 8 mA (max 10 mA) |

A stable and clean power supply is highly desirable for a low-noise sensor. Because the output signal of the SD1221 140 is ratiometric to the 5V power supply, if the power supply is noisy, then the output signal also is noisy. The Power Management Integrate Circuit (PMIC) of the Imote2 sensor platform 40 provides regulated 1.8V and 3.0V for powering sensor boards and also provides a 5V power source. However, because the 5V is generated by a voltage booster used in a USB host controller on the Imote2 40, it does not provide a power supply that is adequate for the low-noise sensor. In addition, the SD1221 140 requires a limited power supply range of 4.75~5.25V. To achieve a clean power supply within the required range, the 5V power supply from the Imote2 40 is regulated using the MAX 8878 low-noise and low-dropout linear regulator 142. The output noise of the regulator 142 is only 30 μV$_{rms}$ over 10 Hz to 100 KHz (approx. 0.1 μV/√Hz), and the dropout is only 55 mV at 50 mA output.

The SNR of the example Quickfilter ADC 74 is given as 81 dB, which corresponds to 13.2 effective number of bits (ENOB). The equation below gives the relation between ENOB (in bits) and SNR (in dB).

$$ENOB = \frac{SNR - 1.76}{6.02}$$

If the full scale of the SD1221L-002, ±2 g, is used, the resolution that the example ADC 74 can achieve is only 4000 mg/$(2^{13.2}-1)$=0.43 mg with the ENOB of the ADC. For the ambient vibration of 1 mg level, the resolution of 0.43 mg is not sufficient. By limiting the measurement range of the sensor to +0.2 g for horizontal acceleration or +0.8 g~+1.2 g for vertical acceleration, a maximum resolution of 400 mg/$(2^{13.2}-1)$=0.043 mg is achieved, which is sufficient to capture low-level acceleration in the range of 1~2 mg.

Figure 20:
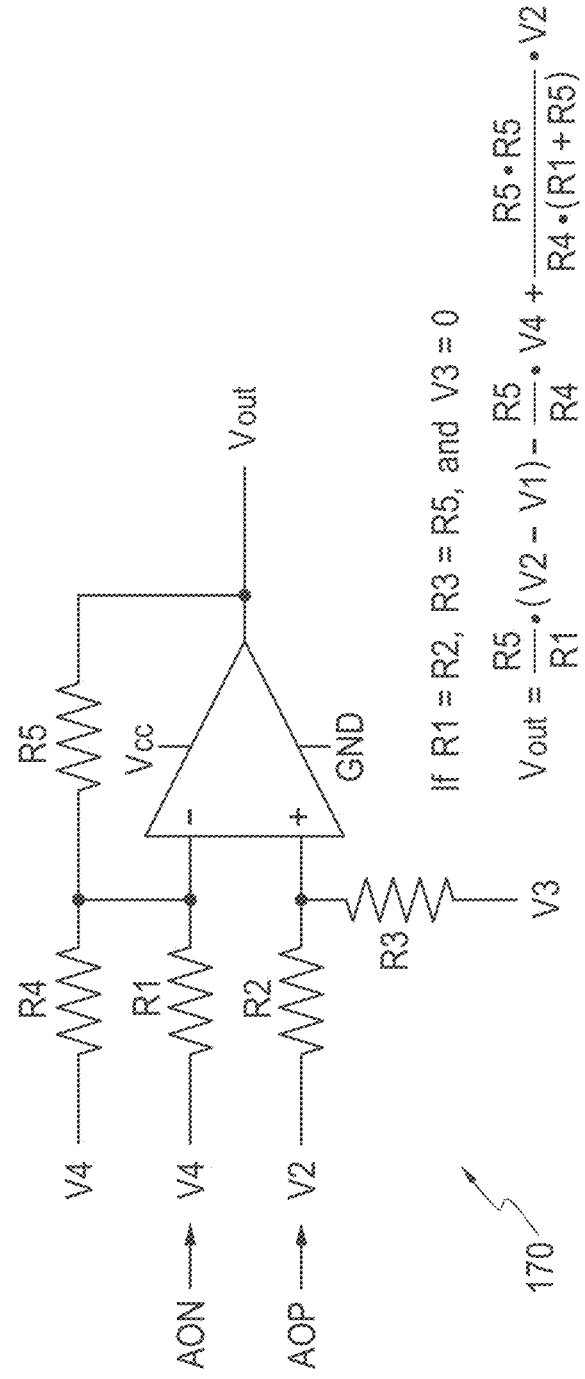
FIG. 20 shows an example OP-Amp circuit for amplification and shift of a signal for the sensor board of FIGS. 18-19A-19B.

To reduce the sensing range, the output signal preferably is amplified and shifted. Using the example OP-Amp circuit 170 shown in FIG. 20, the differential output signals from the accelerometer 140 can be easily controlled. The raw output signals from the example SD1221 140 are amplified and shifted by the OP-Amp circuit 170 shown in FIG. 20 to achieve improved ADC resolution. The noise from the OP-Amp 138 also should be limited. To estimate the OP-Amp noise effects on the signal, the interaction between OP-Amp voltage noise ($e_n$), OP-Amp current noise ($I_n$), and resistor noise ($r_n$) is considered. The total input referred noise ($e_t$) of an OP-Amp is given by the equation below:

$$e_t = [e_n^2 + r_n^2 + (I_n R_{eq})^2]^{1/2}$$

Where, Req is the total equivalent source resistance at the two inputs, and $$r_n = \sqrt{4kTR_{eq}} = 0.13\sqrt{R_{eq}} \text{ (in nV/}\sqrt{\text{Hz}}\text{ at 25° C.)}$$

$k = 1.38 \times 10^{-23}$ J/K (Boltzmann's constant)

For the TI OPA4344, the voltage noise is $e_n = 30$ nV/$\sqrt{\text{Hz}}$, and the current noise is $I_n = 0.5$ fA/$\sqrt{\text{Hz}}$ over 10 KHz. The resulting total noise is $e_t = 31.4$ nV/$\sqrt{\text{Hz}}$ with Req=5.2KΩ, which is the equivalent resistance of the example SHM-H sensor board's OP-Amp circuit. In comparison with the output noise of SD1221, the OP-Amp noise $e_t = 31.4$ nV/$\sqrt{\text{Hz}}$ is negligible.

The example SHM-H sensor board provides separation of the analog and digital sections of the printed circuit board to keep the noisy digital signals away from the low level analog signals as shown in FIGS. 19A-B. Further, the example SHM-H board 130 has a mostly solid ground plane on the bottom side, which is split between the digital and the analog ground plane. The digital signal lines are on the digital plane, and the analog signal lines are over the analog ground plane. The analog ground and the digital ground preferably are connected together at the ADC 74. This allows a quick return for the ground currents as the analog and digital portions of the example sensor board communicate. The bridge to connect two ground planes in the example sensor board is just below the ADC 74. In tests, an example sensor board exhibited a noise density of 13.4 μg/$\sqrt{\text{Hz}}$, and the RMS noise over a 20 Hz bandwidth was 0.06 mg.

A capacitive type sensor is susceptible to mean value drift of the signal due to the temperature change inside the sensor. The example SD1221 accelerometer 140 also experiences this drift effect; according to the SD1221 datasheet, the bias temperature drift is about 0.4 mg/° C. Usually, there is no need to consider this issue when measuring relatively short periods of data, because the temperature change inside the sensor is not that significant. However, long data records will exhibit drift in the constant acceleration voltage. A time history of a constant acceleration signal for a nonlimiting example board over 2000 seconds may show a signal drift from −1 mg~+2.5 mg. Although this drift usually does not affect the frequency content of the original signal, it is significant to consider the drift in the case that the magnitude of the acceleration is important.

Figure 21:
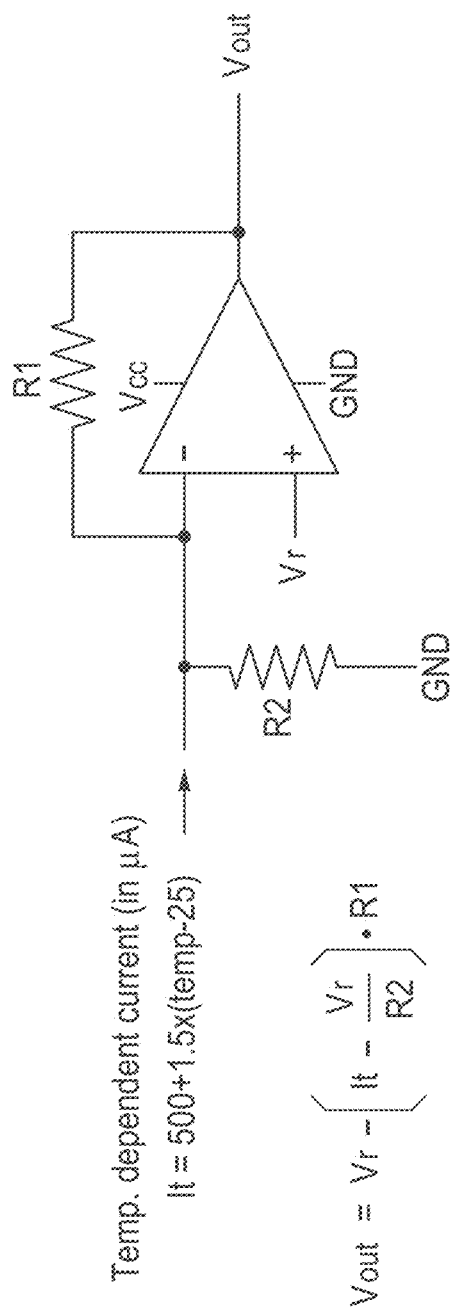
FIG. 21 shows an example OP-Amp circuit for signal converting (current→voltage)

The SD1221 140 provides a temperature-dependent current source output. This temperature-dependent current is useful for the estimation of the temperature inside the sensor so that the associated drift can be corrected. The nominal output current at 25° C. is approx. 500 μA and nominal sensitivity is 1.5 μA/° C. The current signal, however, should be converted to voltage signal that the example ADC can read. In an example embodiment, the 4th channel of the ADC in the example SHM-H board 130 is used to measure this temperature dependent voltage signal. FIG. 21 shows an example OP-Amp circuit 174 for converting the current signal to the voltage signal. For the temperature range of −15° C.~+85° C., the default setting of the example circuit (R1=20 k, R2=3.6 k, and $V_r$=1.8V) provides the voltage signal change of 3V~0V.

Figure 22A:
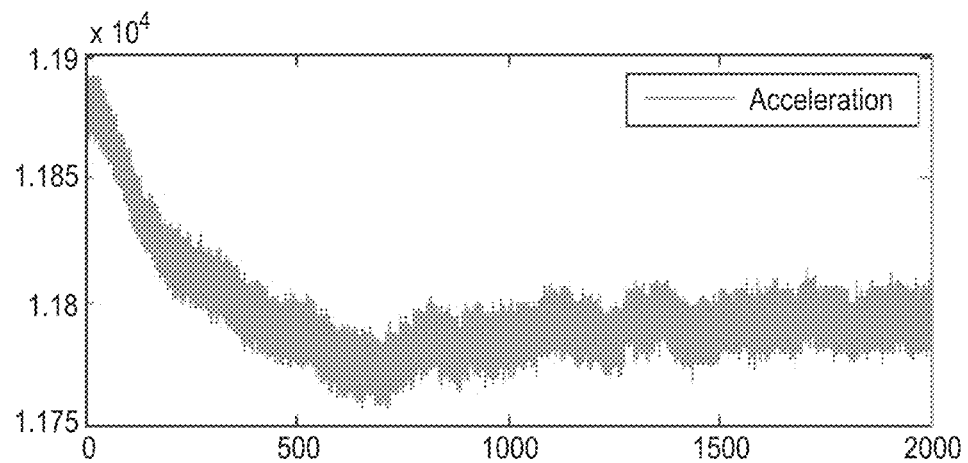
FIGS. 22A-22D show relation between mean-value drift in acceleration signal and inside temperature for raw acceleration data from ADC (FIG. 22A), raw temperature data from ADC (FIG. 22B), linear relation between the acceleration and the internal temperature (FIG. 22C), and scaled- and scaled-smoothed temperature signal (FIG. 22D)
Figure 22B:
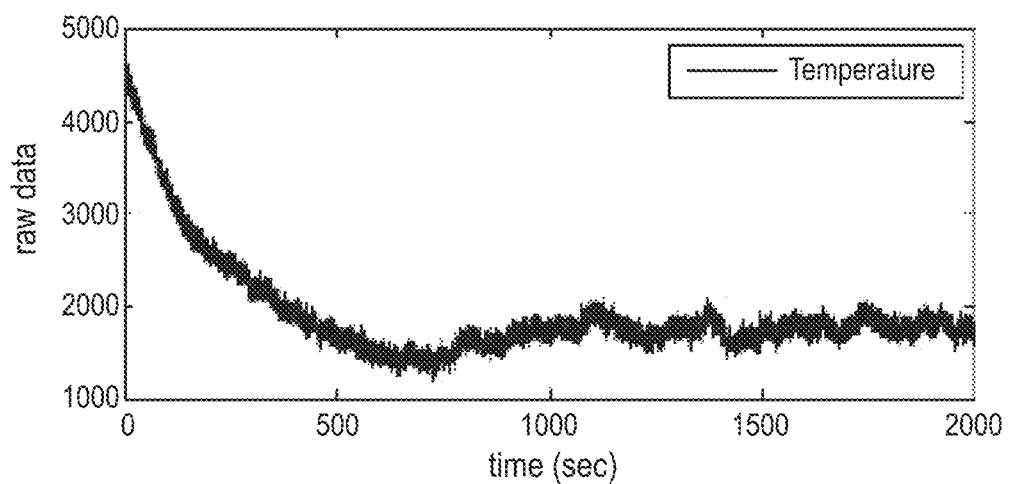
Figure 22C:
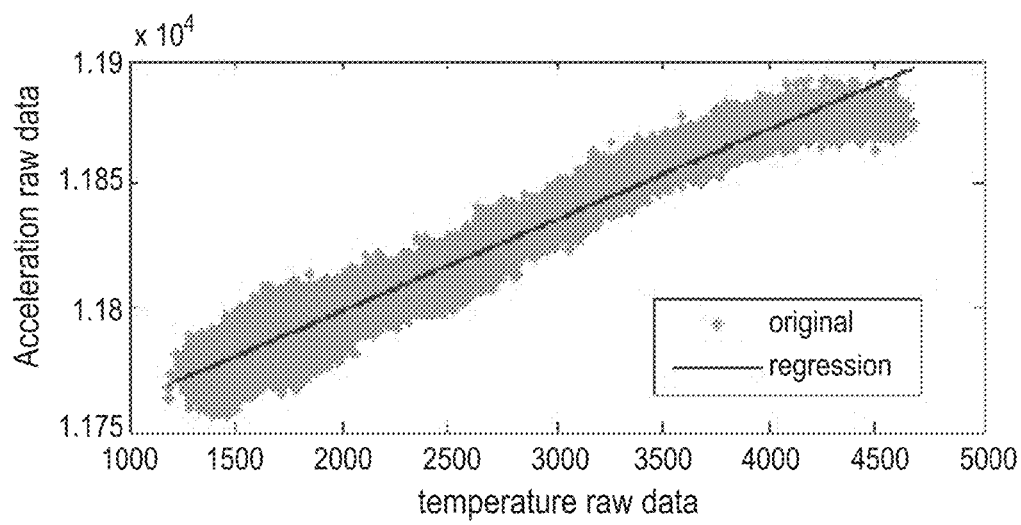
Figure 22D:
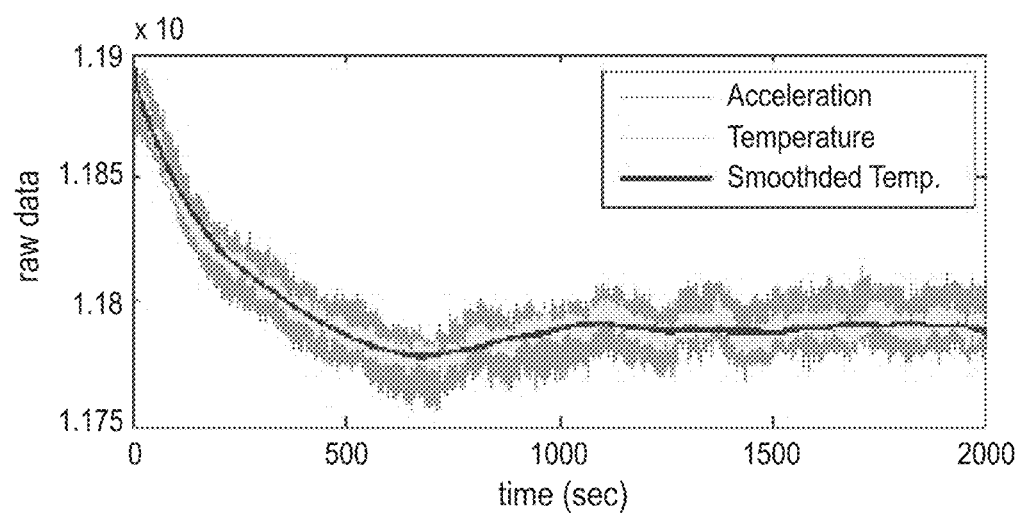
Figure 23A:
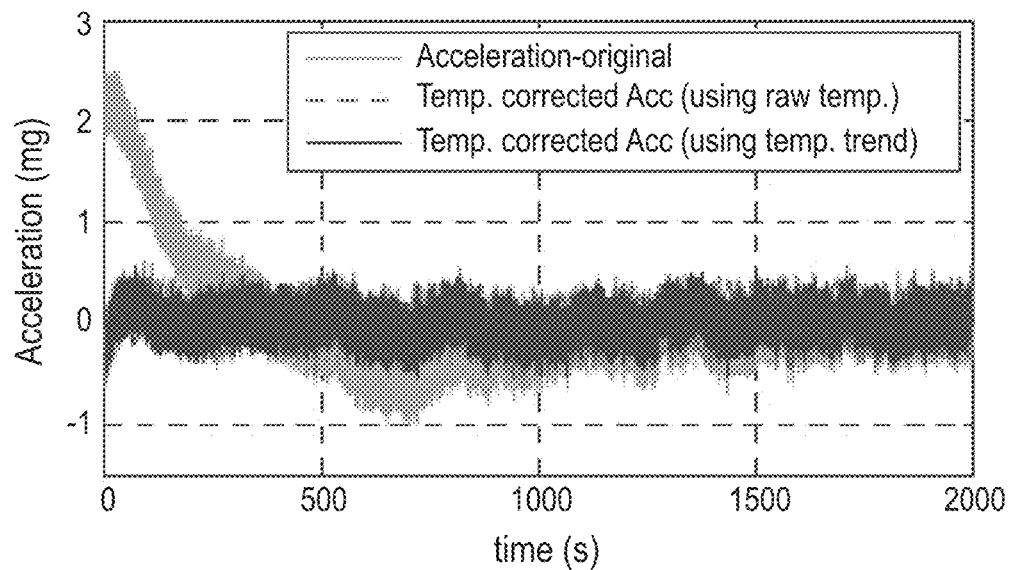
FIGS. 23A-23B show time history (FIG. 23A) and power spectral density (PSD) (FIG. 23B) of temperature corrected acceleration.
Figure 23B:
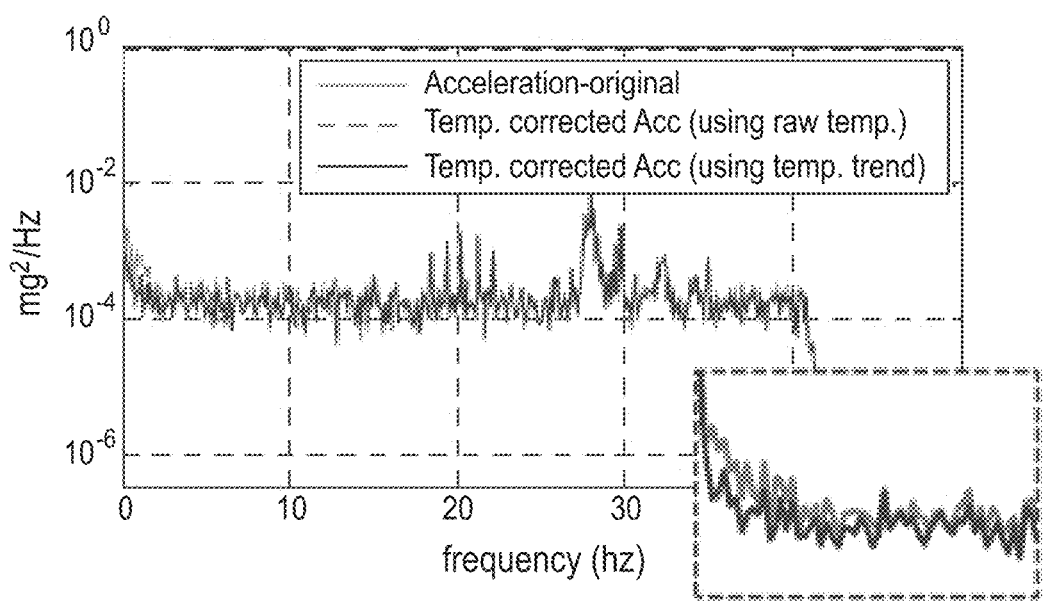

FIG. 22B shows raw data of temperature using the example OP-Amp circuit 174. As is observed, the temperature signal has quite similar shape with the drifted acceleration signal shown in FIG. 22A; the linear relation is clearly apparent in FIG. 22C. Using the scaled temperature signal shown in FIG. 22D, the drifted acceleration signal can be corrected. The temperature corrected acceleration signal and its power spectrum are shown in FIGS. 23A-B. The use of the scaled-smoothed temperature signal, which is temperature change trend, gives better correction than the use of merely scale raw temperature signal. Because the temperature signal itself can have some noise, it can add noise on the corrected acceleration signal. FIG. 23B shows that the temperature correction using the scaled temperature data itself increases the noise level little in the low frequency range (as shown in the dotted box in the power spectral density (PSD), while the scaled-smoothed temperature trend does not affect the PSD.

An example application of the SHM-H board 130 (or other example sensor boards herein) is to effectively measure a low-level ambient vibration. A nonlimiting ultimate noise density of the example SHM-H board 130 is approximately 13.4 μg/$\sqrt{\text{Hz}}$ (RMS noise over 20 Hz bandwidth: 0.06 mg), which is small enough for measuring the ambient response of a structure (<1 mg). A nonlimiting example application incorporates a plurality of sensor platforms with example sensor boards in a truss structure, in which ambient excitations generated by nearby facilities and people walking are transferred to the truss through supports at both ends of the structure.

Another example application of the SHM-H board (or other example sensor boards herein) is that it can be used as a reference sensor in a sensor network. As a nonlimiting example, if more expensive components are provided on the SHM-H board 130, the number of such boards in an overall sensor network can be reduced by using the SHM-H board as a reference sensor. The combined use of conventional wired sensors and smart sensors can improve the data quality of the entire sensor network. If the signal measured by a particular sensor is assumed to be composed of the pure signal plus sensor noise, and the noise and the pure signal are not correlated, the cross-correlation (or cross-spectrum) of the quality signal from a high-sensitivity sensor and the noisy signal from a smart sensor node can eliminate the noise included terms as shown below:

$x_m = x_s + x_n$ (from wireless smart sensors, high noise)

$y_m = y_s + y_n$ (from wired conventional sensors, low noise)

$E[X_m Y_m] = E[X_s Y_s] + E[X_s Y_n] + E[X_n Y_s] + E[X_n Y_n] \approx E[X_s Y_s]$ where, $(\ )_m$: measurement, $(\ )_s$: signal, and $(\ )_n$: noise Thus, even if a particular sensor board cannot capture some of the peaks that appear in the PSD of the example SHM-H sensor board data, the cross power spectrum of the other board data and the example SHM-H board 130 can eliminate part of the noise in the measurements of the other board. In this way the peaks can be captured the same way as they are captured in the PSD of the example SHM-H sensor output.

In addition to the sensor boards provided in example embodiments herein, other boards are possible for integrating with a sensor platform in a sensor node. For example, a strain sensing board could be provided as a second board that interfaces with the SHM-A or SHM-H type board utilizing a single channel analog input that may be available. Examples for the strain sensing element include quick-mounting strain transducers. The analog strain voltage can be converted by the ADC (e.g., the QF4A512 in the same way as the accelerometer channel, though a different gain, sampling rate, and/or digital filter may be applied.

In other example embodiments, the digital interface (e.g., the I2C digital interface) can accommodate several sensors on a single digital bus, allowing a highly multimetric sensor design. Alternative sensing options include: pressure, air/water quality, GPS, and/or electrical resistance for corrosion monitoring. Given example sensor frameworks, these signals can be captured in a synchronized manner, along with existing sensors, to gain a more complete picture of environmental and structural conditions. As yet another example, a very low-power sensor could be provided that runs on a separate power supply that remains powered on at all times and interfaces with an alarm pin (such as the alarm pin of the Imote2 sensor platform) so that an extreme event is sensed even during initiation of other sensor nodes prior to normal data acquisition. This separate alert system could provide timestamped data, and time synchronization could be provided to correct the timestamps and allow data to be resampled to achieve a synchronized data record in response to an extreme loading event.

The battery board can also be configured according to embodiments of the present invention to improve power efficiency. For example, a power interface board can be provided to improve efficiency in systems that utilize sleep/wake cycles with intermittent periods of high current draw states. As another example, the battery board can have a voltage regulator that is only active when battery voltage is below a certain threshold.

An example flexible software development framework for a sensor board and platform will now be described. SHM applications implemented on wireless smart sensor networks (WSSN) require complex programming, ranging from network functionality to algorithm implementation. Software development is made even more difficult by the fact that many smart sensor platforms employ special-purpose operating systems without support for common programming environments. The extensive expertise required to develop SHM applications has severely limited the use of smart sensing technology for monitoring of civil infrastructure.

A common approach to the issue of software complexity is to divide the software system into smaller, more manageable components. Service-oriented architecture (SOA) is a possible way to use this design philosophy in building dynamic, heterogeneous distributed applications. SOA design principles are focused on how services are defined and the manner in which data is passed from service to service. Services, in SOA terminology, are self-describing software components in an open or modifiable distributed system. The description of a service, called a contract, lists its inputs and outputs, explains the provided functionality, and describes non-functional aspects of execution (timeliness, resource consumption, cost, etc.). Data is passed among the services in a common format. An example application built using SOA includes a composition of a number of linked services within a middleware runtime system that provides communication and coordination among them. Services do not need to know who provides the required input data or from where it comes. Different applications can be built from the same set of services, depending on how they are linked and on the execution context. This example approach provides support for dynamic, highly adaptive applications without the need to revisit and adapt the implementation of each service in a particular application context.

Smart sensor networks typically include numerous independent nodes, each an embedded computing platform with a processor, memory, and a radio transmitter. As such, WSSN applications are by definition distributed and thus require communication and coordination for parts of the application running on different nodes. Building an application from a set of well-defined services moves much of the complexity associated with embedded distributed computing to the underlying middleware. This approach also fosters reuse and adaptability, as services for a given application can be employed by many other applications.

Another attractive aspect of SOA is that it provides a separation of concerns in application development. Application designers can focus on the high-level logic of their application, service programmers can concentrate on the implementation of the services in their application domain, and systems programmers can provide middleware services (reliable communication, time synchronization, data aggregation, etc.) that enable the services to interact. In sensor networks, the application designer may be the user of the application as well, having expertise in SHM applications and the desired output of the network, but limited knowledge on network programming and the hardware-software interface. This situation makes it especially important for the less complex high-level design of the application and the domain-specific algorithms used by the services to be separated from the often more complex low-level infrastructure necessary to make the system work. SOA in WSSNs makes it possible to compose and deploy, on-the-fly, complex applications through a web-based user interface suitable for non-programmers. User-driven WSSN programming can lower the barriers to entry in sensor network application development and accelerate their use in structural health monitoring applications.

Accordingly, an example framework according to embodiments of the present invention provides a suite of services implementing key middleware infrastructure necessary to provide high-quality sensor data and to transport it reliably across the sensor network, as well as a broad array of numerical algorithms. By leveraging this framework, attention can be focused on the advancement of SHM approaches and the development of SHM systems without concern with low-level networking, communication and numerical sub-routines.

An example service-based software framework along with a rich array of tools, utilities, and algorithms is provided in example embodiments to enable efficient development of robust, extensible, and flexible structural health monitoring applications on WSSNs. Additional services that enable autonomous network operation have also been provided.

The components of an example service-based framework can be divided into three primary categories: (1) foundation services, (2) application services, and (3) tools and utilities. In addition, a library of supporting numerical functions that are common to many SHM algorithms is provided including fast Fourier transform (FFT), singular value decomposition, Eigenvalue analysis, etc.

Foundation Services:

In SOA terminology, services are high level, self-describing building blocks for distributed computing applications. The foundation services implement functionality for supporting the application and other services. This includes gathering synchronized sensor data, reliably communicating both commands and long data records, and providing accurate and precise timestamps to collected data. When used together, one of the primary purposes of these services is to be used by applications to achieve synchronized sensing from a network of sensors. The following paragraphs provide more detail on each of the foundation services.

A Time Synchronization service provides consistent, network-wide global timestamps for sensor data, making it possible to meaningfully compare data collected from multiple sensors.

A Unified Sensing service provides a convenient, general-purpose application programming interface, replacing the standard TinyOS sensing interface for the Imote2 and extending its functionality to include precise time-stamping of the data and providing transparent support for a variety of sensor boards. The TinyOS sensing interface does not support the collection of data from remote nodes and is difficult to modify for a variety of sensing parameters. In the example Unified Sensing service, data for all sensor channels, together with a single set of associated timestamps, is returned to the application in a single, shared data structure. A compact data representation format is used, which encapsulates all information necessary to recreate the sensor values, yet is memory-efficient for storage and transportation across the wireless network. This complete and self-contained data representation makes it easy to pass around and modify the data without hard-coding connections between components that use only parts of this data. This approach facilitates data being passed directly to the application services described below.

Since sensor data loss is intrinsic to wireless systems and undermines the ability to perform system identification and detect damage, a Reliable Communication service, which eliminates data loss, is employed for sending commands and data between sensor nodes. The ReliableComm service employs four distinct reliable communication protocols, preferably chosen automatically based on the type of communication, to eliminate data loss in an efficient manner.

Application Services:

These services provide the numerical algorithms necessary for implementing SHM applications on the Imote2s and may also be used independently. Example application services include:

SyncSensing: Resamples timestamped sensor data from a node in a synchronized sensor network (e.g., provided by the Unified Sensing application service) so that the output for each node in the network has a common sampling rate with a common start time. The service takes raw sensor data and a sparse set of associated global timestamps as arguments and applies the resampling filter. This resampling is accomplished in a memory-efficient way by applying the filter to the data one block of at a time so that additional memory requirements for the service are independent of the size of the input data.

CFE: Returns the Correlation Function Estimate (CFE) via FFT calculation. CFE takes two synchronized discrete-time signal vectors as input and outputs their CFE employing a user-specified number of FFT points and spectral window.

ERA: Performs an Eigensystem Realization Algorithm (ERA). This time-domain system identification service uses the impulse-response function, or in the case of a NExT algorithm, the correlation functions, to determine the modal characteristics of the structure (damped natural frequencies, damping ratios, mode shapes, modal participation factors, EMAC values and the state-space matrices defining the identified model of the structure).

SSI: Performs a covariance-driven Stochastic Subspace Identification (SSI) algorithm. This time-domain system identification method uses the cross correlation functions to determine the modal characteristics of the structure (damped natural frequencies, damping ratios, mode shapes, and the matrices which define the state-space model of the structure).

SDLV: Performs output-only, model-based damage detection using the Stochastic Damage Locating Vector (SDLV) method. The inputs of SDLV are the modal characteristics determined by one of the system identification service.

FDD: Performs a Frequency Domain Decomposition (FDD) algorithm. This frequency-domain system identification method uses the cross spectra to determine the modal characteristics of the structure (damped natural frequencies and mode shapes). Because the natural frequencies are selected by a peak-picking method, some modes may not be reliably found.

Tools and Utilities:

Application tools and utilities are also provided in example embodiments for basic testing and debugging. These tools and utilities are useful in any large scale or long-term WSSN deployments to evaluate the network conditions at the structure, determine appropriate values of adjustable system parameters, and assess power consumption and longevity issues. Included are utilities for resetting nodes remotely, listing the nodes within communication range of the local node, and changing the radio channel and power for local and remote nodes.

The application tools can be categorized as either those operating on a single node or those operate on multiple nodes distributed in the network. Single node application tools include:

LocalSensing: This tool allows sensor data to be collected while a single Imote2 is connected directly to the PC (i.e., no radio communication is required). It allows developers to test the functionality of sensor boards and develop driver software for new boards.

imote2comm: A basic terminal program for interfacing with the Imote2 through the Imote2 Interface Board's USB port. It uses the serial port UART interface to open a telnet-like connection with the mote.

TestServices: A numerical service that combines application services: CFE, ERA, and SDLV. It uses acceleration signals as input in the CFE service to calculate the correlation functions that is used in the ERA service. The estimated modal characteristics of the structure are then used in the SDLV service to identify potential damage locations.

The application tools that involve multiple nodes are given below. The distributed nature of these tools requires careful scheduling and coordination of network tasks and is therefore more susceptible to the failure if any of the nodes in the network malfunctions. For this reason, significant effort has been made to ensure that the applications continue to operate even when one or more of the nodes in the network exhibits unexpected behavior.

TestRadio: Tests the raw bidirectional communication between a sender node and a group of receiving nodes, and outputs the packet loss rate (in each direction, and round-trip).

RemoteSensing: A network-wide distributed application, this example tool is used to collect sensor data from multiple sensors and provides the basis for most distributed SHM applications. RemoteSensing provides a high level of flexibility in the choice of network and sensing parameters. The first step in the application is network synchronization followed by sensing with concurrent collection of timestamps. Depending on the command that is given at run time, this service can output either the raw timestamped data or resampled synchronized data. If the resampling option is selected, the data is resampled locally using the SyncSensing service to account for any jitter or non-uniform delay in the start of sensing for each node. All data and commands in RemoteSensing are sent between nodes using the ReliableComm service, eliminating data loss.

DecentralizedDataAggregation: This sample application illustrates use of the framework for data acquisition and processing in a decentralized, hierarchical sensor network. This application supports multiple sensor clusters, in which data processing is conducted independently to other clusters. The main outputs of the application are sensor data and their correlation functions in each sensor cluster.

Figure 24:
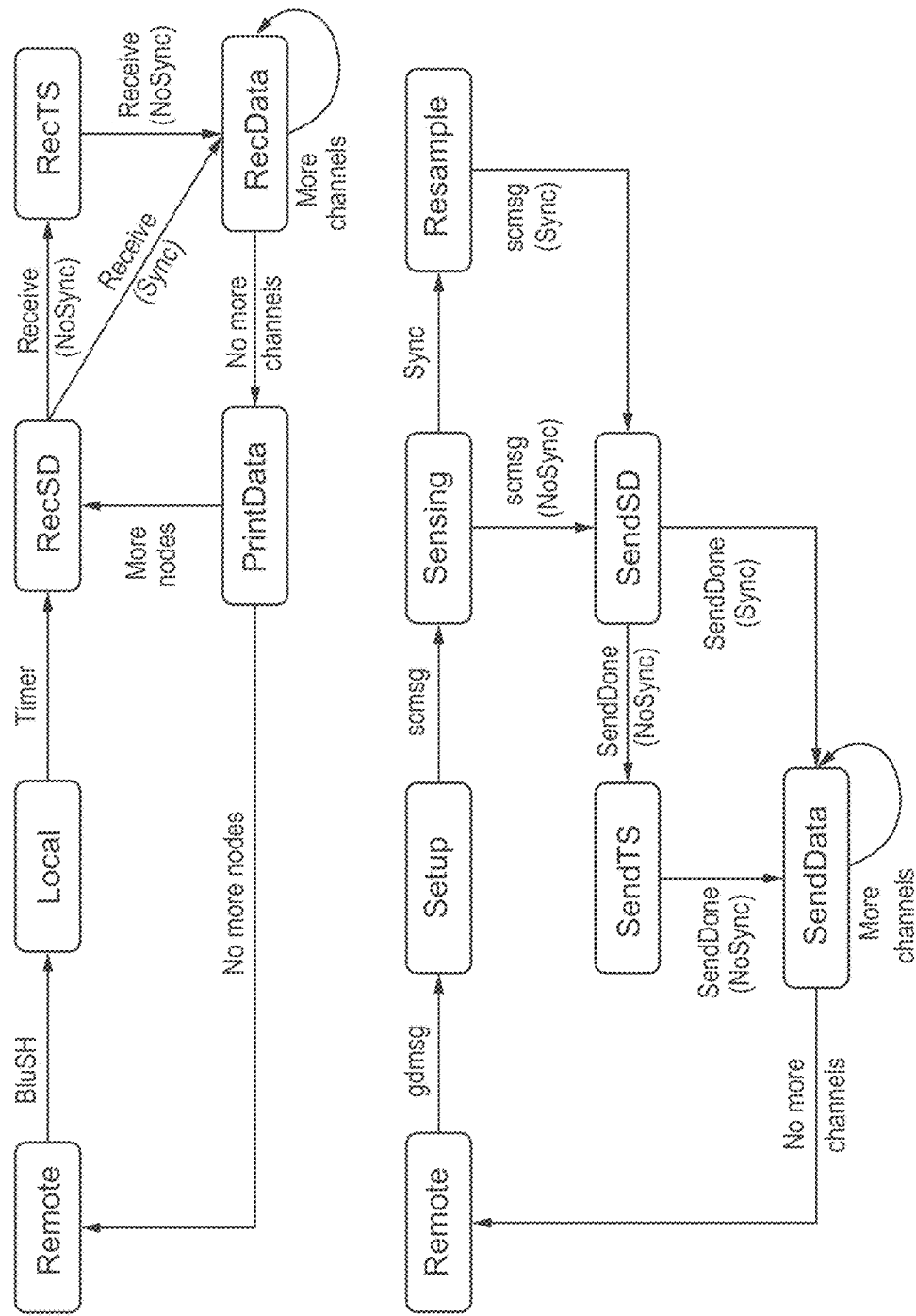
FIG. 24 shows an example RemoteSensing state machine for a local node (top) and remote nodes (bottom), where boxes represent states, arrows represent transitions, and arrow labels indicate conditions or actions needed for the transition to occur, according to an embodiment of the present invention.

The RemoteSensing and DecentralizedDataAggregation application tools employ a distributed state machine to determine the timing and control flow of the application across a network of sensors. A state machine is a formal method for defining how an application behaves or responds when it is in a particular state and the transitions required to move between states. The flowchart given in FIG. 24 illustrates the state machine for the RemoteSensing application. The table below summarizes each state and transition associated with RemoteSensing.

| | Description |
|---|---|
| State | |
| Remote | Initial state |
| Local | Initial local node state |
| Setup | Receive and store sensing parameters |
| Sensing | Data acquisition |
| Resample | Resample of acquired data based on timestamps and initial delay |
| SendSD | Send sensor data structure |
| RecSD | Receive sensor data structure |
| SendTS | Send timestamps (if data is not resampled) |
| RecTS | Receive timestamps (if data is not resampled) |
| SendData | Send sensor data |
| RecData | Receive sensor data |
| PrintData | Write data to PC |
| Transition | |
| BluSH | Application initialized by user through the Blue Shell interface |
| gdmsg | GetData message containing sensing parameters received |
| Timer | Timer set to wait for remote node(s) to acquire data |
| scmsg | StartCollection or request for data message received |
| Sync | Resampling flag set |
| NoSync | Resampling flag not set |
| sendDone | Previous message sent successfully |
| Receive | Data successfully received |

Figure 25:
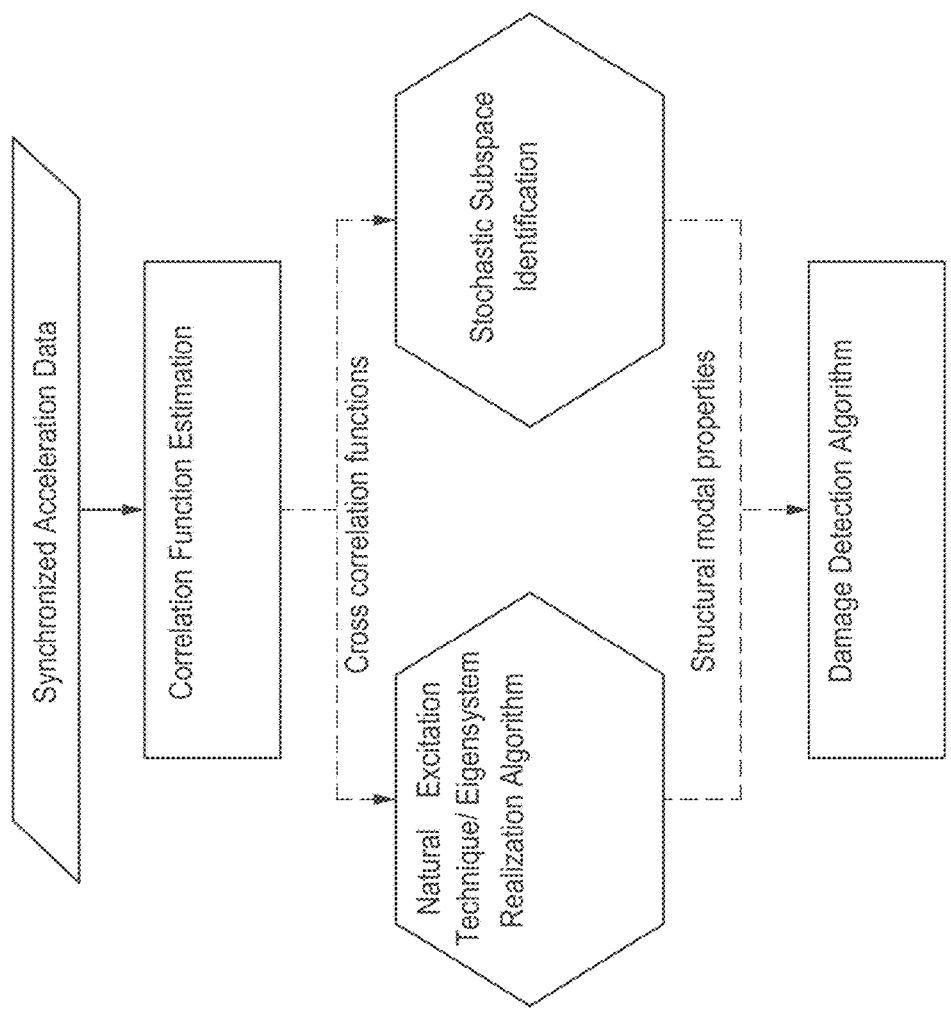
FIG. 25 shows example alternate services for SHM application development.

Extensibility: The modularity and flexibility of the components of the service-oriented architecture described above lend themselves to the exploration of new approaches to solve specific problems. As a simple example, FIG. 25 illustrates how the system identification method can be swapped out in an example SHM application. In keeping with the SOA framework, these interchangeable services share the same input and output parameters. Other application examples that can benefit from the modular services provided in the framework include distributed damage detection algorithms that rely only on the parameters derived from the correlation function estimates or methods for distributed modal parameter estimation in a WSSN.

An example software development framework receives the code necessary to interconnect the services and tools in a way that makes sense for their applications. In general terms, this example code serves the following functions:
Run service X at node A
Send a control message to node B to run service Y
Send results from B to A
Run service Z taking as inputs the outputs of services X and Y One or more of the services described above can be configured by users via control logic, graphical user interface (GUI), drag-and-drop programming via dynamic macroprogramming, or in other ways as will be appreciated by those in the art. Further, in addition to the example services presented herein, services can be provided that enable autonomous network operation with limited user interaction.

Three significant deployment issues drive the following smart sensor software further according to particular example embodiments of the invention: 1) Continuous and autonomous monitoring, 2) efficient power management, and 3) data inundation mitigation. While these may appear to be conflicting goals, careful application design can meet the requirements for all three. An example solution is a network that is only minimally active during non-critical structural response, but becomes fully active to measure higher response levels. Ideally, full-scale smart sensor network deployments should require minimal external interaction. After some initialization involving the establishment of network operation parameters, the network should run autonomously unless instructed otherwise by the network administrator. Care should be taken in the configuration of the application software to provide a continuous and autonomous operating scenario while maintaining power efficiency. These measures can be divided into three general categories: schedule-based operations, trigger-based operations, and safe-guard features.

Sleep Cycling:

In a traditional wired sensor implementation, power management is of little concern. The sensors can remain active at all times and thus they have the ability to be interrogated at any time to acquire data. Unlike such wired systems, a significant of a successful WSSN deployment is the implementation of careful power management strategies. The Imote2, for example, allows the processor to be put into a deep sleep mode, whereby only the clock component of the processor is supplied power; all other components are powered down. The deep sleep mode lasts for a set period of time (thus the need for the clock to be powered) and results in significantly reduced power consumption. When the node is in the deep sleep state it cannot send data or receive via the radio or the serial ports and the LEDs do not function. Effectively, the node has no power until the sleep time expires.

Figure 26:
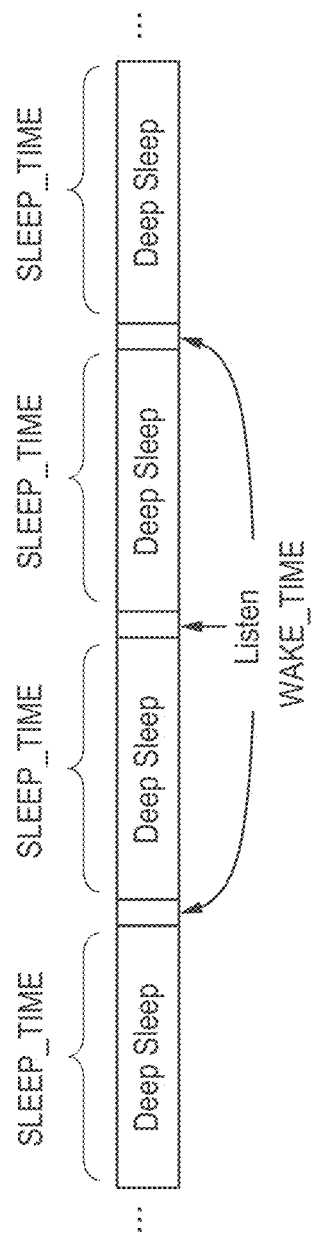
FIG. 26 shows an example timing for a SnoozeAlarm cycle service, according to an embodiment of the present invention.

While it may seem advantageous to keep the nodes in the deep sleep mode for extended periods of time to save power, this approach limits the ability of the base station node to access the network at random to send inquiries or initiate network operations. To take advantage of the power savings of the deep sleep mode, while still allowing the base station node access to the remote nodes, an example sleep/wake cycle service called SnoozeAlarm has been developed. When SnoozeAlarm is operating on the remote nodes (i.e. they are in the SnoozeAlarm mode), they sleep for a period of time, SLEEP_TIME and then wake up for a short period of time, WAKE_TIME, during which they can listen and receive message. This process is illustrated in FIG. 26. The ratio between WAKE_TIME and the sum of WAKE_TIME and SLEEP_TIME is the SnoozeAlarm duty cycle. The duty cycle preferably is minimized while still allowing the listen time to be long enough to receive and process commands (e.g., >500 ms).

SnoozeAlarm provides three interfaces in an example application:

SnoozeAlarm.wakeup(targets, tcount): Command given to local node to wake up targets (tcount is the number of targets).

SnoozeAlarm.awake(targets, tcount): Event signaled on local node with the node IDs and number successfully woken up nodes.

SnoozeAlarm.stayawake(): Command given on remote node to stay awake (i.e. stop wakeTimer).

Figure 27:
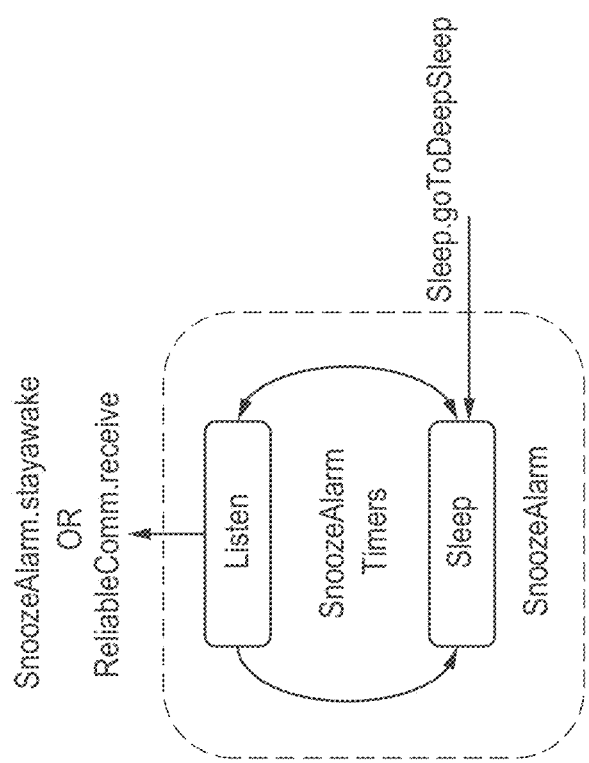
FIG. 27 shows example interfaces and operation for a remote node SnoozeAlarm.

If a message is received during the wake period, the remote node stays awake until it is placed back in the sleep/wake cycle. SnoozeAlarm leverages the fact that ReliableComm continuously resends packets to the destination node until it receives an acknowledgement packet, thus allowing the base station node to send a wake up (or other command) to the remote node, even if it is in the deep sleep mode. ReliableComm will continue to send the message until the remote node wakes up or the message is withdrawn. Upon reception of the command, the remote node stops its wake timer, sends an acknowledgement packet, and awaits the next command. The node resumes the SnoozeAlarm cycle upon being put back to sleep or being reset (either by software or a hard reset). FIG. 27 illustrates how SnoozeAlarm operates on the remote nodes.

Figure 28:
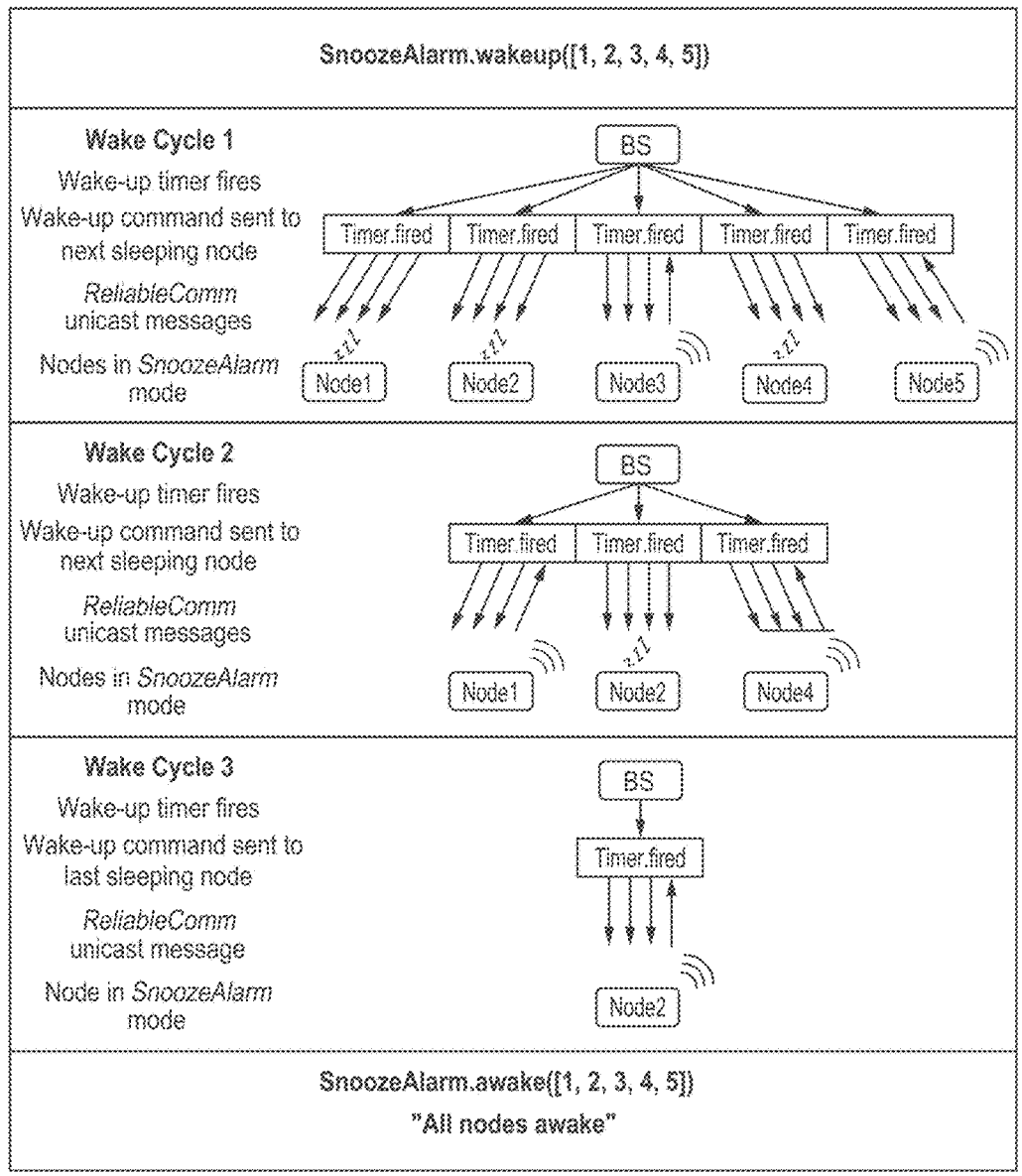
FIG. 28 shows an example SnoozeAlarm mode wakeup command, according to an embodiment of the present invention.

The example SnoozeAlarm.wakeup command provides an efficient method for waking a network of nodes in SnoozeAlarm mode. The example ReliableComm protocol for broadcasting messages to a group of nodes is only successful if all of the destination nodes respond with an acknowledgement in a set period of time, thus limiting its use for waking the network. Instead, the network is woken in a serial manner using successive unicast commands from the base station node to individual nodes in the network. The example base station node cycles through the list of sleeping nodes, sending a wakeup command to one node in the list each time the wakeup timer fires. When a node sends back an acknowledgement, thus indicating it received the message and is remaining awake, it is removed from the list of nodes to wake up and added to the list of nodes that have been successfully woken up. This process continues until all nodes are awake or until a time-out timer expires. In both cases, a list of the nodes successfully woken up is signaled in the SnoozeAlarm.awake event. The wake up process is illustrated in FIG. 28.

Threshold Triggering:

The example ThresholdSentry tool allows a subset of the network to act as "sentry" nodes that are woken up periodically to sense data for a short period of time, determine if a set threshold has been exceeded in the measured data, and send a flag back to the base station. The base station node signals a ThresholdSentry.exceeded event upon reception of a flag indicating the threshold has been exceeded. This event can be used by the higher level application to make decisions on whether to wake the network and initiate network sensing or distributed modal analysis, etc. The current implementation of ThresholdSentry utilizes acceleration measurements; however triggers, such as strain levels or wind speed, could be incorporated into the application.

Figure 29:
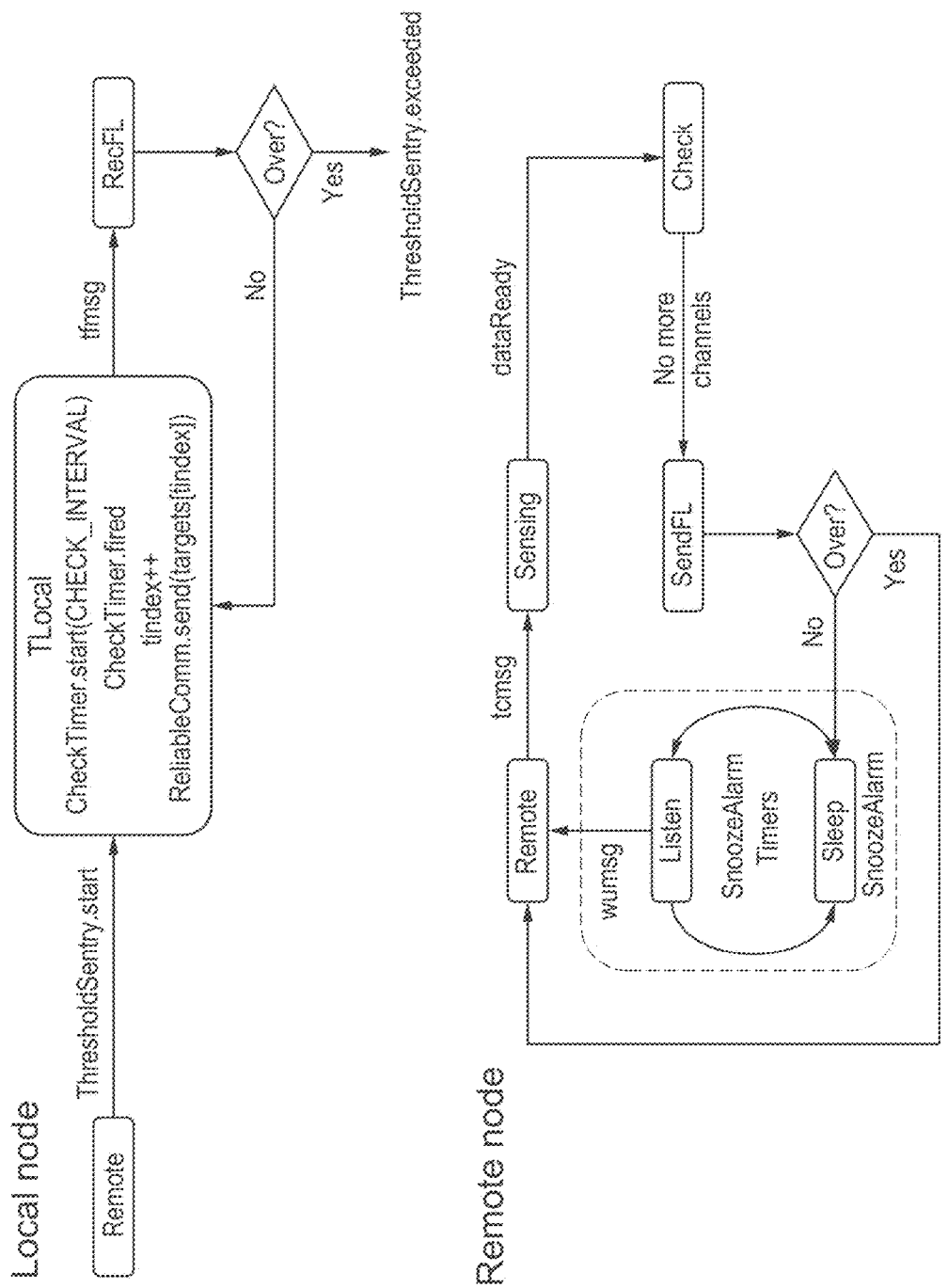
FIG. 29 shows an example ThresholdSentry operation on local node and remote nodes with SnoozeAlarm, according to an embodiment of the present invention.

ThresholdSentry is setup on an example base station node by specifying the nodes that comprise the sentry network, the interval at which they will be asked to sense data, the duration of the data check on each sentry node, the sampling parameters for the data check, and the threshold value used for comparison in the data check. Once ThresholdSentry is initiated, a timer is started that fires after the check interval is reached. When this timer fires, the base station node sends a wakeup command and sentry request to the first node in the list of sentry nodes. Upon reception of the sentry request, the remote node senses for the prescribed period of time. When the data collection is complete, the remote node checks the absolute maximum normalized value for each channel that collected data. The maximum peak of all the channels is then compared to the threshold value. If the threshold is exceeded, the remote node sends a flag, with the peak measured value, back to the base station and remains awake to wait for the next command. If the base station receives the flag indicating the threshold has been exceeded, it signals the ThresholdSentry.exceeded event. If the threshold is not exceeded on the sentry node, it sends a message back that indicates the threshold was not exceeded and puts itself back into SnoozeAlarm mode. If the base station node receives a message that says that the threshold was not exceeded, the base station node restarts the check timer and moves on to the next sentry node in the queue. ThresholdSentry operation on the local and remote nodes is illustrated in FIG. 29 and the states and transitions are described in the table below.

| | Description |
|---|---|
| State | |
| Remote | Initial state |
| TLocal | Initial local node state |
| Sensing | Data acquisition |
| Check | Calculation of maximum value of normalized sensed data |
| SendFL | Send threshold flag |
| RecFL | Receive threshold flag |
| Transition | |
| ThresholdSentry.start | Application initialized by user |
| tcmsg | Threshold check message sent to next sentry node in queue |
| dataReady | Sensing on sentry node is complete |
| no more Channels | Peak for all channels calculated and checked against threshold |
| tfmsg | Threshold flag message sent from sentry node to remote node |

The selection of the threshold value and the sentry nodes within the network should be made such that the threshold is exceeded often enough for adequate structural monitoring, but not an excessive number of times at the risk of data inundation and higher power consumption levels. Because a single threshold value is used for all sentry nodes, the example nodes selected as sentry nodes should measure similar levels of vibration to ensure consistency in the events that trigger the network. For example, on a long-span bridge, the nodes located near the support piers are expected to experience much lower vibration levels than those near the mid-span of the bridge. Sentry nodes in each of these locations would exceed the threshold under very different loading circumstances. Because of additional sensing duties, sentry nodes will consume more power than non-sentry nodes. However, if more nodes make up the sentry network, the burden of increased power consumption on each sentry node will decrease because the base station will call on each sentry node fewer times within a day. If only a few sentry nodes are selected, a larger power source may be required for those nodes. Also, the check time interval should be carefully selected so that important events are captured, while power management is still considered.

Several safeguards have been built into an example ThresholdSentry method to ensure its continuous operation in spite of potentially unexpected network behavior. When a sentry request is sent to a sentry node, a timer is started on the local node. If the sentry node does not respond before the time expires, the sentry node prints a message that the node was not responsive and moves onto the next sentry node. This measure ensures that if a sentry node dies or becomes unavailable for some reason, the example application will continue. Carefully monitoring the debug output is important to diagnose problems within the network. A node that is consistently skipped indicates that it requires attention.

On the remote sentry nodes, timers are also implemented to reset the node if it does not carry out its duty within the time allotted. This measure ensures that a node does not stay awake in an unexpected state for a long period of time draining power. In the case that the reset does take effect, a Watchdog timer will ultimately reset the node, thus ensuring that no remote node hangs indefinitely.

A nonlimiting example of ThresholdSentry used in conjunction with RemoteSensing allows the network to record the response of longer-duration, lower-frequency events such as high wind; however, it may not support capturing short-term, transient events such as an earthquake. The time required to wake the network and perform time synchronization prior to the collection of data would cause such events to be missed. To address this, the network wakeup time could be reduced in an alternative embodiment using a propagating wakeup message with optimized communication parameters and the order of data collection and synchronization could be switched to facilitate faster initiation of sensing.

Watchdog Timer:

The issue of network stability is one that has plagued long-term applications of wireless sensor networks. Nodes within a network can fail due to power depletion, physical damage, and a number of other known and unknown reasons. At times, an otherwise "healthy" node may become hung-up during its operation and can only resume operation upon being reset. The reset can come in the form of some type of software reset or a hard reset where power is temporarily removed from the node. The network should continue to function even with the loss of one or more nodes or in cases when the expected operations stall.

Figure 30:
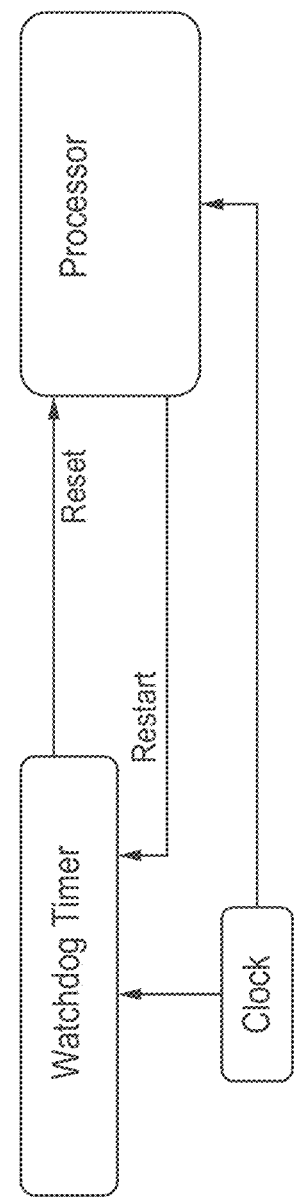
FIG. 30 shows an example Watchdog Timer (WDT) implementation on a sensor node, according to an embodiment of the present invention.

One approach to limiting network hang-ups is to implement a Watchdog timer (WDT) on the sensor nodes. Such a system triggers the node to reset in the case that it behaves unexpectedly (hangs) or does not receive an external signal (i.e. from the base station) within a given timeframe. As illustrated in FIG. 30, an example processor (controlled by a higher level application) periodically restarts the WDT. If the WDT is allowed to expire; i.e., it does not get restarted by the processor (due to a command from the application), it resets the processor. This process ensures that if the processor gets hung up, it will eventually be reset and return to a refreshed/operable state. A TinyOS WDT module has been adapted in an example method for a network of sensor platforms (e.g., Imote2s). In addition to the example WDT, the network can be designed to automatically preemptively reset on a timer.

Autonomous Operation:

Achieving an autonomous SHM implementation on a network of smart sensors preferably includes a high-level application to coordinate each of its components in response to various events. AutoMonitor has been developed in an example embodiment to provide this functionality.

AutoMonitor is present on the example base station node and coordinates the following primary tasks:

Define the RemoteSensing network and sensing parameters

Define the ThresholdSentry sentry network

Setup the ThresholdSentry parameters

Start the ThresholdSentry component

Wakeup the network and initiate RemoteSensing when the threshold value has been exceeded on a sentry node Automatically generate data files when RemoteSensing occurs Automatically generate log files of the local node debug output Enforce the maximum number of allowed network sensing events in a specified time period.

AutoMonitor is initiated via an input file that sets the parameters for each of the tasks it coordinates. Once started, it requires no additional input from the user. AutoMonitor can be stopped via a BluSH command (AutoMonitorStop) at which point RemoteSensing or other network operations can be carried out manually (with BluSH commands). AutoMonitor is restarted again with the input file. The input parameters are defined in the table below. The selection of most of these parameters is highly application-dependent and likely take a period of adjustment and refinement to optimize for each case in implementation. Further, many of these parameters may have power consumption implications.

| Input Line | Input Line Description | Argument | Description |
|---|---|---|---|
| RSSSetup | Remote synchronized sensing setup | nodeIDs | Node IDs of nodes in entire network |
| GDSetup | Sensing parameters for RemoteSensing | channelMask | channels involved in network-wide sensing |
| | | numSamples | number of samples requested in network-wide sensing |
| | | samplingRate | sampling rate for network-wide sensing |
| Sentry Setup | Setup for ThresholdSentry | channelMask | channels involved in threshold check on sentry node |
| | | samplingRate | sampling rate for threshold check on sentry node |

| Input Line | Input Line Description | Argument | Description |
|---|---|---|---|
| | | checkTime | duration of sensing for threshold check on remote node |
| | | checkInterval | time between sentry checks |
| | | threshold | value checked against in ThresholdSentry (in mg) |
| | | rsmax | maximum number of RemoteSensing events allowed in a given time period |
| | | period | time period outputting a debug log and resetting the number of sensing events |
| THSentry Start | Start of ThresholdSentry timer | nodeIDs | Node IDs of sentry nodes |

Figure 31:
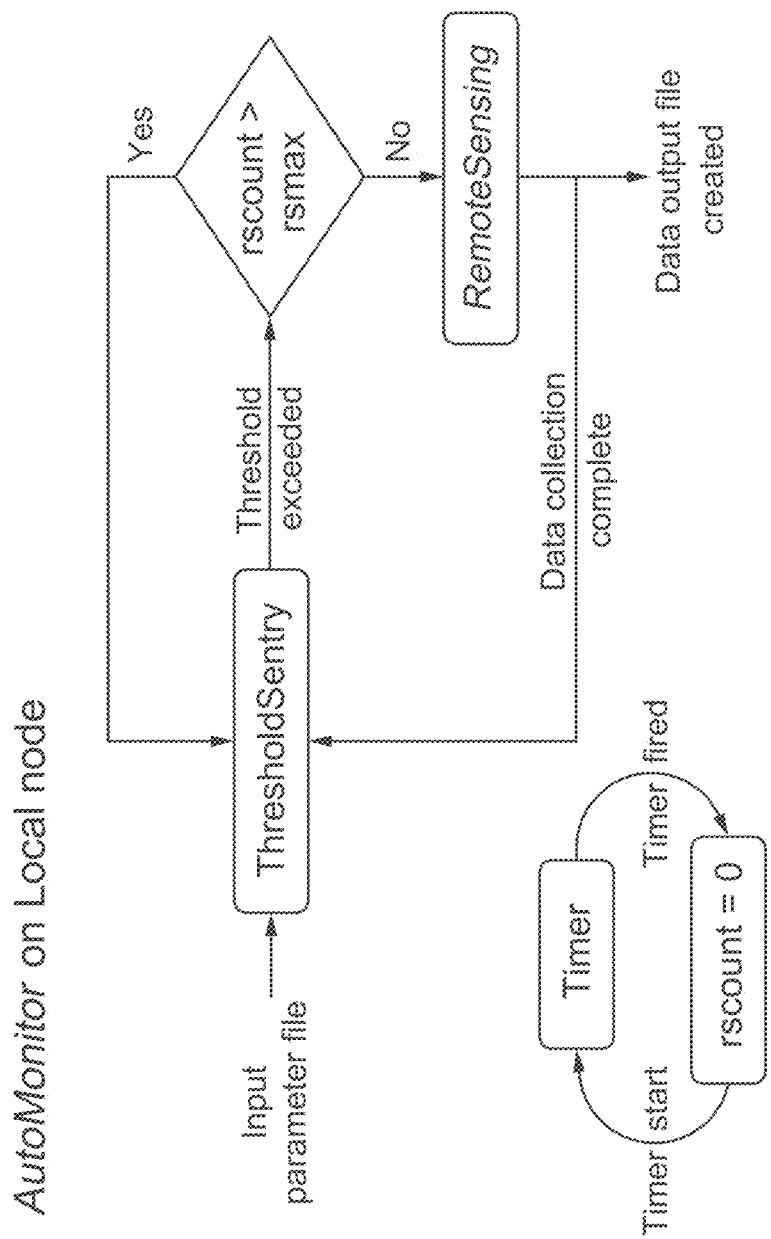
FIG. 31 shows an example AutoMonitor operation on a base station node (local node), according to an embodiment of the present invention.

FIG. 31 provides a simple illustration of how the local node manages network operations in AutoMonitor. After the input file containing all of the parameters listed in the previous table is read, AutoMonitor initiates ThresholdSentry. ThresholdSentry continues operating (moving through the list of sentry nodes at the specified interval, checkTime) until the threshold is exceeded on one of the sentry nodes. When the example base station node receives the flag that the threshold has been exceeded, it first checks whether the maximum number of RemoteSensing events, rsmax, in a set time period has been reached. If rsmax has been reached, ThresholdSentry is resumed. Otherwise, AutoMonitor sends a command to wake the network. Once all nodes are awake, or the wakeup command times out, AutoMonitor initiates RemoteSensing with the successfully woken nodes. After RemoteSensing completes, when all data is finished being written, ThresholdSentry is reinitiated. A timer runs in the background to keep track of the set time period specified in the input file. When this time period has elapsed, the count of RemoteSensing events, rscount, is set back to zero and the debug output for the last time period is saved to a file. For example, the application may be limited to two RemoteSensing events within 24 hours, with the debug output being written to a file once a day.

One of the safeguards built into the AutoMonitor applications takes advantage of the SnoozeAlarm.awake event. This event is signaled after the SnoozeAlarm.wakeup command is executed. The arguments of the awake event are the nodes that were successfully woken up. AutoMonitor initiates network sensing with the nodes that were responsive to the wakeup command, ensuring greater probability of successful network sensing. In this way, the wakeup command acts to establish the nodes that should be included in network-wide operations.

A second safeguard feature of the example AutoMonitor application is that the periodic node reset associated with the WDT has been disabled. It is not desirable for the base station node to periodically reset as it must maintain the input parameters in volatile memory throughout its operation. For example, if the time interval between ThresholdSentry checks is 20 minutes, the base station node will be idle during that time, not sending or receiving any messages. The example WDT is only reset by the application when a task is performed or the node sends or receives messages. If the example WDT is set to an interval less than 20 minutes, it will reset the node between the sentry check events, causing all of the network parameters to be lost and AutoMonitor to halt operation until it can be restarted again externally.

Various considerations in addition to the software applications above can be made for providing a smart sensor network for autonomous implementation. For example, a large-scale implementation may introduce challenges associated with communication quality/range and power consumption.

A nonlimiting example radio chip used in an example remote sensing platform is the Chipcon CC2420 2.4 GHz IEEE 802.15.4 RF transmitter. The chip is a byte-level radio ideal for low-voltage, low-power wireless applications. The example radio supports multiple transmission options that can be tailored to the application to optimize network performance. The selection of the appropriate transmission frequency is significant when other wireless devices operating in a similar frequency band are within range of the sensor network. The selection of the transmission power is significant to power management. Higher transmission power allows the sensors to achieve longer communication distances but results in higher current consumption on the sensor node. Limiting the current consumption will reduce the amount of battery power used by RF communication over the life of the network.

The onboard antenna included on the Imote2 is the Antenova Mica 2.4 GHz SMD. The antenna is designed to use the board to which it is mounted as a ground plane; thus, the entire board acts as the antenna. The example antenna offers a peak gain of 1.8 dBi (a measure of the gain of the antenna with respect to a hypothetical isotropic antenna with a 0 dB gain). An optional external antenna is the Antenova Titanis 2.4 GHz Swivel SMA antenna. The half-wave dipole antenna has a peak gain of 2.2 dBi. One advantage is that the blade of this antenna can rotate 360° for optimal antenna orientation. An enclosure may be provided for the stacked boards, power supply (e.g., batteries) and antenna (either external or internal) during implementation.

Within the example embedded software, the data to be communicated and its routing information are placed in packets. Communication on the Imote2 implements a fixed payload scheme where the number of bytes in a packet does not change. The example packet size is 28 bytes, including a 4-byte header and 24 bytes for data. Numerous packets are preferably used to send long data records.

Prior to transmission, the example radio chip adds a preamble and cyclic redundancy check (CRC) to each packet. The CRCs characterize the packet and are used for error detection after transmission. The radio packet is then separated and transmitted byte-by-byte. Similarly, in receiving mode, the radio chip receives the transmitted data byte-by-byte, which it places into the radio packet based on the preamble. Upon successful packet reception, the operating system (e.g., TinyOS) processes the packet to determine whether it should be retained or dropped, based on whether any error exists. If the CRC does not respond with the received packet then error has occurred and the packet is dropped.

Figure 32:
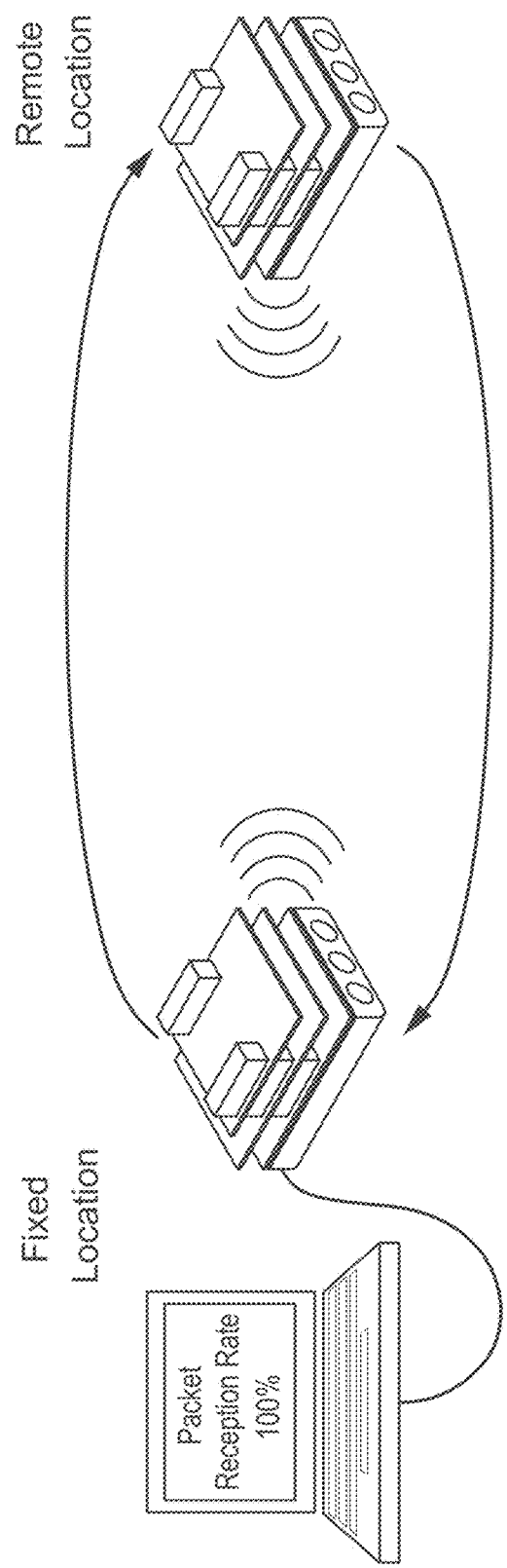
FIG. 32 shows an example loopback test set-up for determining a communication range, according to an embodiment of the present invention.

Environmental factors may influence sensor reception. Nonlimiting example factors include building environments and materials, other wireless networks (e.g., wireless Internet networks), etc. To test a proper communication by assessing packet loss associated with single-hop communication, an example testing protocol uses loopback tests along with variations in (1) power levels, (2) communication channel, (3) sensor and antenna orientation, and (4) environmental factors. Loopback tests, illustrated by an example setup in FIG. 32, can be used to verify the communication effectiveness under varying circumstances. A loopback test includes sending a set number of packets from the sender node to a remote node. The remote node records the number of packets it receives and sends this information along with all of its received packets back to the sender. Finally, the sender records the number of packets it receives from the remote node. The results of the example loopback test are: (1) the number and percentage of packets that made it to the remote node, and (2) the number and percentage of packets that made the complete round-trip back to the fixed sender. For each set of test parameters, an example loopback test is repeated at least five times to obtain an average packet reception rate. This testing method may also be used to verify failing nodes within a network.

Figure 33:
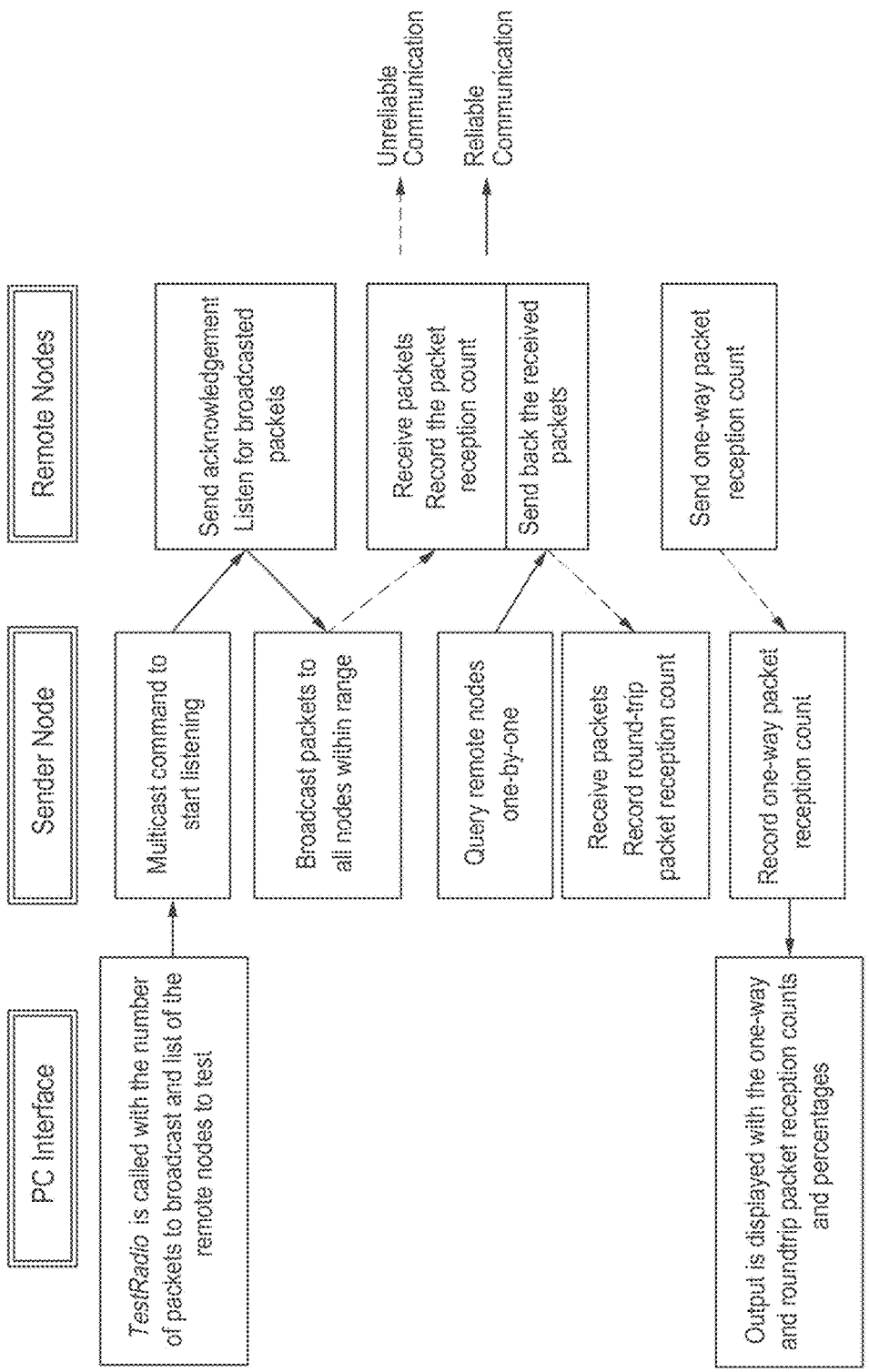
FIG. 33 shows an example loopback test set-up implementation.

Loopback tests were run on the example Imote2 sensor platform in an example method using the TestRadio test application. FIG. 33 shows a flow chart of how TestRadio is used to perform the loopback tests. At the start of the test, the user specifies the transmission channel, transmission power, the ID of the remote node(s) (in a nonlimiting example, up to 10 remote nodes may be tested at one time) and the number of packets to send. All of the command packets used to perform the tests are sent using a reliable communication protocol, while the packets sent to test the communication performance are sent only once. This approach ensures that the command packets are received, and the test application can run to completion even when there is poor communication performance indicated by the results achieved in the loopback test. When the communication distance becomes too great, even the command packets being sent reliably will not reach their intended target, resulting in a test failure.

Beyond the example testing program, the antenna orientation and environmental setting can be adjusted as desired. In a nonlimiting example embodiment, two variables are kept constant throughout all tests: 1) the sensors are kept at a constant height, and 2) the same number of packets is sent between nodes. The quantitative measurement of packet delivery performance used in example tests is the packet reception rate. This value refers to number of packets that were received out of the number of packets that were sent. The complementary measurement of packet reception rate is packet loss, which is the number of packets lost out of the number of packets that were sent.

Figure 34:
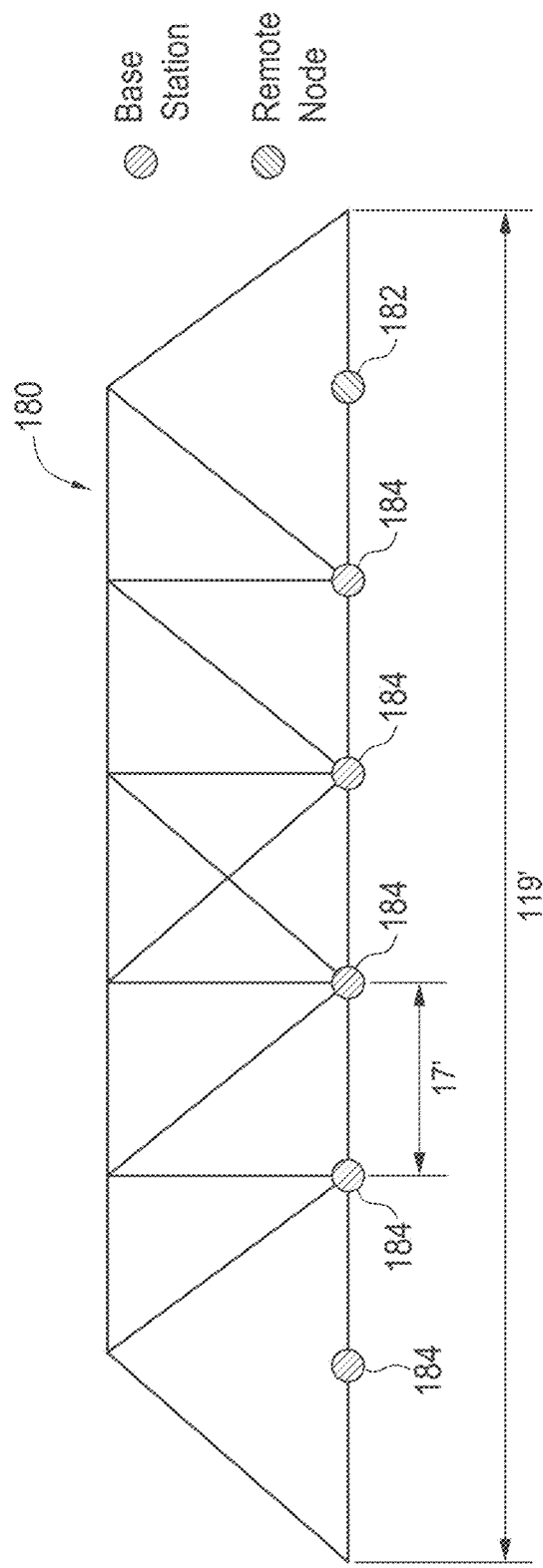
FIG. 34 shows an example bridge testing layout for remote sensor nodes and a base station, according to an embodiment of the present invention.

FIG. 34 shows a nonlimiting example sensor network deployment on a structure, which in this example is a bridge 180. The sensor network includes a base station 182 (more than one is possible) and a plurality of sensor nodes 184, which in a nonlimiting example include the Imote2 sensor platform and the multimetric SHM-A4 sensor board 110 design, along with a battery board, a power supply, and an environmentally hardened enclosure (as a nonlimiting example, a rectangular PVC enclosure). The base station 182 is placed underneath the bridge on the girder closest to the north support (on the right in FIG. 34), and the nodes 184 are located in various girders underneath the bridge. Other possible locations for the sensor nodes 18 include on cables, pylons, near a deck, and many others. A base station 182 can include and/or be coupled to a processor (as a nonlimiting example, a computer) for data collection and analysis. The example Imote2 sensor platforms in this deployment include external antennas. Network connections can vary. A nonlimiting example network configuration between the base station and sensor nodes is a peer-to-peer network.

Given the dipole behavior of the example antenna, placing the nodes and the base station such that the antennas are parallel to one-another and the board (which radiates as well) is preferable to reduce interference while limiting power consumption. Other arrangements are possible, and may be configured depending on particular components and/or environments.

A significant issue in achieving a long-term smart sensor SHM implementation is careful power management. Power management should be addressed from both sides of the equation: power supply and power consumption. The amount of power that a smart sensor consumes depends on the power consumption of each of its components and how they are used at any given time. The Imote2's processor, the PXA271, can run at varying speeds based on application requirements, resulting in varying current consumption. In addition, the sensor board draws a certain amount of current when it is running and when it is idle. Example sensor nodes can be loaded with appropriate software for operation and power management including but not limited to Remote-Sensing, SnoozeAlarm, and AutoMonitor. For the applications presented above, there are five primary power consumption states of the example Imote2 implementation with the sensor board attached:

1) Deep sleep mode
2) Startup—initial state when Imote2 is turned on or wakes from deep sleep mode
3) Imote2 processor @ 13 MHz (lowest operating speed)
4) Imote2 processor @104 MHz (intermediate operating speed)
5) Sensing with the Imote2 processor @ 104 MHz The current draw in each of the four states depends on the hardware used, in particular the battery board and the sensor board. The battery board used will determine the current draw in deep sleep mode; the current draw is the sum of the deep sleep mode of the Imote2 plus any idle current draw of the battery board. Nonlimiting example types of battery boards used in embodiments are an Intel battery board, a first generation battery board, and a Crossbow battery board (IBB2400CA). The fundamental difference between the battery boards is that the Intel board has a buck-boost regulator on board to regulate the power from the batteries to the Imote2 at ~3.2V, while the Crossbow battery board does not. The implications of this difference are that the Intel battery board can operate over a wider range of battery voltages without affecting the performance of the Imote2 but it consumes more power when the Imote2 is asleep; the Crossbow battery board is limited to a smaller range of battery voltages, but it consumes no power when it is idle.

When first switched on or after waking from the deep sleep mode, the Imote2 experiences an initial high current draw that lasts less than a second. If the Imote2 is put into deep sleep mode for four seconds, the current will spike during the last 0.67 seconds before it settles to the idle/listening mode. While the spike is only a short increase in the current level, its effects will compound if the Imote2 is in a sleep-wake cycle during most of its life.

The sensor board used determines the power consumption in the non-sleep states. The greatest impact of the power consumption of the sensor board is during sensing, because power consumption in that state is the sum of the power consumed by the active sensor board and the power consumed by the Imote2 operating at 104 MHz. In addition, if all portions of the sensor board are powered when the Imote2 is powered, the power consumption is increased, even in the non-sensing power states. The example SHM-A sensor board draws approximately double the amount of current as the ITS400CA (basic sensor board) during sensing; however, in the non-sensing states, the power to most portions of the SHM-A board is cut-off, while the ITS400CA is powered all the time the Imote2 is not in the deep sleep mode.

Figure 35:
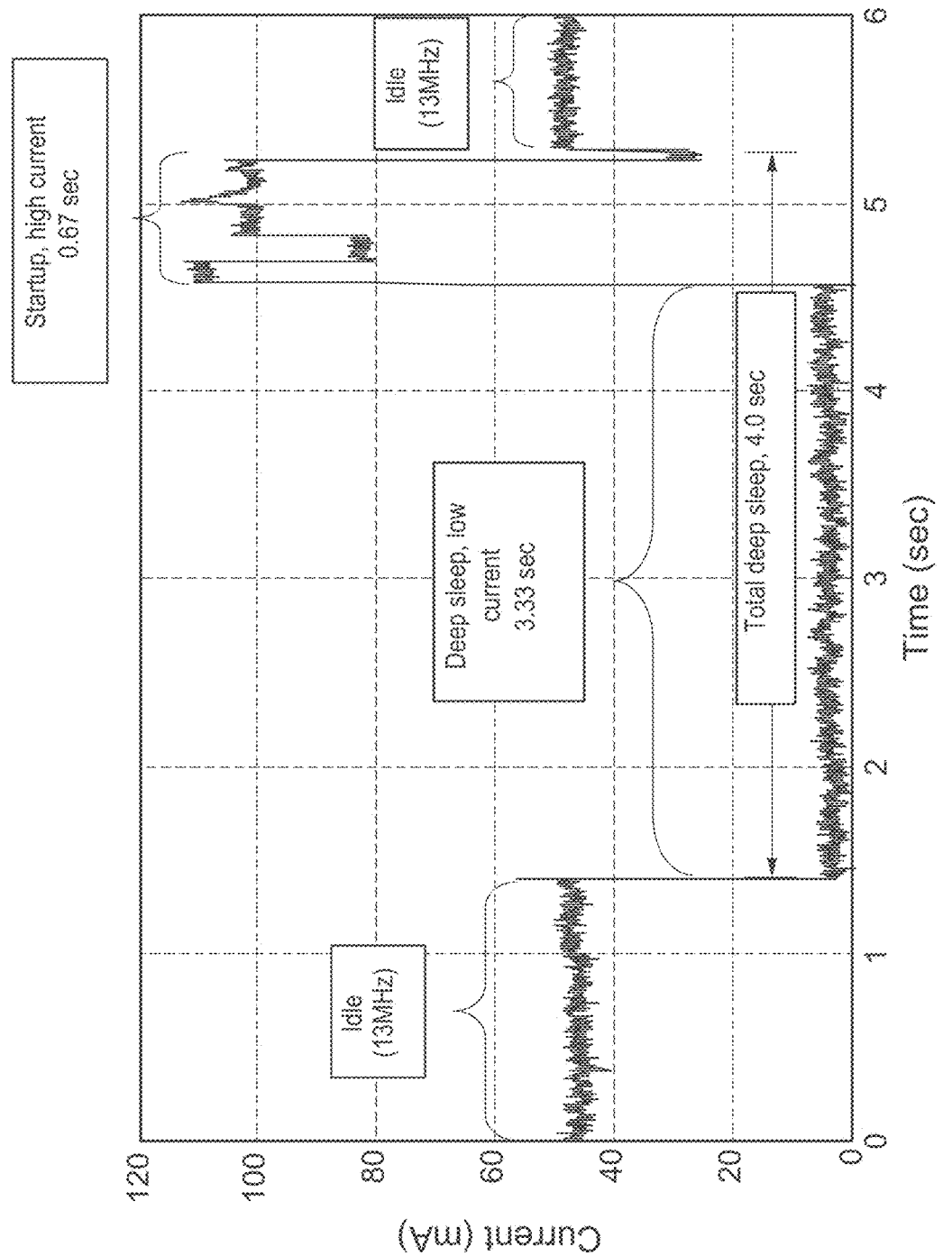
FIG. 35 shows example deep sleep power states according to an embodiment of the present invention.

During each phase of the ThresholdSentry/AutoMonitor application, the remote nodes are in one of the five power states described above. The current draw from three D-cell batteries during each state has been determined experimentally for both battery boards and both sensor boards. FIG. 35 shows the approximate values measured for each state with different hardware configurations. These current values may be used to assess the relative impact of the various application parameters on the overall power consumption at each node. In addition, a large number of software/application parameters that can be considered when optimizing power consumption and network performance. Some parameters are application constants that are not expected to change significantly by most users, while other parameters are expected to change significantly based on the needs of the applications. The parameters are summarized in the table below.

| Power management optimization parameters | | |
| --- | --- | --- |
| Category | Parameter | Description |
| Network parameters | Network size | Number of nodes in network |
| | Sentry network size | Number of nodes involved in |
| Sensing parameters | Sampling rate | RemoteSensing sampling rate |
| | Number of points | Number of data points in RemoteSensing |
| | Number of channels | Number of channels measured in RemoteSensing |
| | Number of RemoteSensing events | Number of RemoteSensing events per day |
| RemoteSensing wait times | Synchronization wait time | Time before sensing starts to synchronize the network |
| | Extra wait time | Extra time added to the total time the base station node waits between sending the sensing command and requesting data |
| | Extra sensing delay per node | Additional extra wait time per node to account for longer communication times in larger network |
| SnoozeAlarm times | Sleep interval | Sleep interval in SnoozeAlarm mode |
| | Listen interval | Short wake/listen time in SnoozeAlarm mode |
| ThresholdSentry times | Check interval | Time between sentry node checks |
| | Check sensing time | Time sentry node senses when checking data |

Considering an average current draw, $I_{avg}$, as the relative measure of the node's power consumption, the parameters listed in the above table can be varied to determine their effect on this value. To conserve limited power resources and/or balance the output with performance goals, appropriate selection of such parameters by a network designer, along with awareness of the network environment, is useful. By varying one or more of these parameters and assessing the effect of average current draw, a sensor network and operation can be configured for particular power consumption ranges.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

The invention claimed is:

1. A high sensitivity structural health monitoring network, the network comprising:
   a plurality of sensor nodes disposed apart from each other and communicating through one or more sensor channels, each sensor node comprising a smart sensor circuit board, the sensor board comprising:
      an interface to a wireless smart sensor board platform;
      a multi-axis accelerometer having a sensitivity that can measure ambient structural vibrations resulting from non-catastrophic routine environmental factors;
      an analog to digital converter (ADC) for converting signals from the multi-axis accelerometer, the ADC having a plurality of individual channels, each channel including being individually programmable for signal conditioning for providing data to said interface;
   a network framework providing network services for the plurality of sensor nodes through the one or more sensor channels, the network framework including a time synchronization service with network-wide global synchronization for sensor data and a unified sensing service that supports collection of data for all sensor channels from all nodes together.

2. The network of claim 1, wherein the unified sensing service combines data for all of the one or more sensor channels together with a single set of associated time stamps in a single unified, shared data structure.

3. The network of claim 1, wherein the network framework is provided by a base station node of the plurality of sensor nodes.

4. The network of claim 3, wherein the synchronization service comprises a synchronization of the base station node with remote nodes of the plurality of sensor nodes following by sensing with a concurrent collection of timestamps.

5. The network of claim 3, further comprising the base node locally resampling synchronized data received from the remote nodes to account for jitter or non-uniform delay in the start of sensing for each one of the remote nodes.

6. The network of claim 3, wherein the synchronization service comprises the base node applying a resampling filter to adjust data from the remote nodes such that each of the remote nodes has a common sampling rate with a common start time.

7. The network of claim 1, wherein the synchronization service comprises one of the plurality of sensor nodes receiving timestamps and data from other ones of the plurality of sensor nodes and resampling the data to a common timestamp.

8. The network of claim 7, wherein the resampling comprises the one of the plurality of sensor nodes applying a resampling filter to adjust data from the other ones of the plurality of sensor nodes such that each of the remote nodes has a common sampling rate with a common start time.

9. The network of claim 1, wherein the network services comprise correlation to a reference sensor node in the plurality of sensor nodes to eliminate noise terms in other ones of the plurality of sensor nodes.

10. The network of claim 9, wherein the reference sensor comprises a wired sensor node and at least other ones of the plurality of sensor nodes comprises wireless sensor nodes.

11. The network of claim 1, wherein the network services comprise directing running different services on multiple ones of the plurality of sensor nodes and directing the communication of results of services from one to another of the plurality of sensor nodes.

12. The network of claim 11, wherein the network services comprise running a service to accept the results of other services from multiple ones of the plurality of sensor nodes.

13. The network of claim 1, wherein at least some of the plurality of sensor channels comprise wireless channels.

14. The network of claim 13, wherein the network services comprise a snooze alarm sleep mode that sets the at least some of the plurality of sensor nodes in a snooze alarm duty cycle have a period listen time mode that is long enough to receive and process commands.

15. The network of claim 1, wherein the network services comprise a sentry service that sets one or more of the plurality of sensor nodes to act as sentry nodes that are woken up periodically to sense data for a short period of time, determine if a set threshold has been exceeded in the measured data, and send a flag back.

16. The network of claim 1, wherein at least some of the plurality of sensors are installed on a bridge to monitor structure health of the bridge.

17. A high sensitivity structural health monitoring network, the network comprising:
   a plurality of sensor nodes disposed apart from each other and communicating through one or more sensor channels, each sensor node comprising a smart sensor circuit board, the sensor board comprising:
      an interface to a wireless smart sensor board platform;
      a multi-axis accelerometer having a sensitivity that can measure ambient structural vibrations resulting from non-catastrophic routine environmental factors;
      an analog to digital converter (ADC) for converting signals from the multi-axis accelerometer, the ADC having a plurality of individual channels, each channel including being individually programmable for signal conditioning for providing data to said interface;
   network service means for managing synchronization and collection of data from the plurality of sensor nodes.

18. The network of claim 17, wherein said network services means comprise reference node means for setting a reference node and using the reference node to correct data from other ones of the plurality of sensor nodes.

19. The network of claim 17, wherein said network services means comprise sentry node means for setting a sentry node to periodically monitory for structural events.

* * * * *